US012567404B1

(12) United States Patent　　　　(10) Patent No.:　　US 12,567,404 B1

Greenberg et al.　　　　　　　　　　(45) Date of Patent:　　　　Mar. 3, 2026

(54) TUNABLE CONFIDENCE INTERVALS FOR ON-DEVICE NATURAL LANGUAGE UNDERSTANDING MODELS

(71) Applicant: Meta Platforms, Inc., Menlo Park, CA (US)

(72) Inventors: Michael Greenberg, Oakland, CA (US); Aaron Jackson, Snohomish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 554 days.

(21) Appl. No.: 18/050,041

(22) Filed: Oct. 26, 2022

Related U.S. Application Data

(60) Provisional application No. 63/272,621, filed on Oct. 27, 2021.

(51) Int. Cl.
　　*G10L 15/18*　　　　(2013.01)
　　*G10L 15/187*　　　(2013.01)
　　　　　　(Continued)

(52) U.S. Cl.
　　CPC ........ *G10L 15/1815* (2013.01); *G10L 15/187* (2013.01); *G10L 15/22* (2013.01); *G10L 2015/223* (2013.01); *G10L 15/30* (2013.01)

(58) Field of Classification Search
　　CPC . G10L 15/1815; G10L 15/183; G10L 15/187; G10L 15/22; G10L 15/30;
　　　　　　(Continued)

(56) References Cited

U.S. PATENT DOCUMENTS 5,926,537 A　　7/1999　Birze
6,014,439 A　　1/2000　Walker et al.
　　　　　(Continued)

FOREIGN PATENT DOCUMENTS

CN　　106104677 B　　10/2019
EP　　　3869503 A1　　8/2021
　　　　　(Continued)

OTHER PUBLICATIONS

US 11,388,247 B1, 07/2022, Khemka et al. (withdrawn)
　　　　　(Continued)

*Primary Examiner* — Md S Elahee
(74) *Attorney, Agent, or Firm* — Morgan, Lewis & Bockius LLP

(57)　　　　ABSTRACT

In one embodiment, a method includes receiving, from an extended reality (XR) display device by one or more computing systems, an audio input of a user of the XR display device, wherein the audio input includes a voice command of several voice commands associated with a first application, wherein the several voice commands are executable by a natural-language understanding (NLU) model, determining a context of the user with respect to an extended reality (XR) environment, determining, based on the context, a tunable confidence interval for the NLU model to match the audio input to the first voice command, where the tunable confidence interval varies based on user context, and where the tunable confidence interval is set to a first tunable confidence level based on the context of the user, determining, by the NLU model, whether the audio input matches the voice command based on the first tunable confidence level.

20 Claims, 26 Drawing Sheets

500A

Headset 504

User 502

Controller 506

Computer 508

(51) Int. Cl.
    *G10L 15/22*        (2006.01)
    *G10L 15/30*        (2013.01)

(58) Field of Classification Search
    CPC ........ G10L 2015/088; G10L 2015/223; G06Q
                              30/0242; G06F 16/26
    USPC ........................................................ 704/257
    See application file for complete search history.

(56)                 References Cited

U.S. PATENT DOCUMENTS

| | | |
|---|---|---|
| 7,124,123 B1 | 10/2006 | Roskind et al. |
| 7,158,678 B2 | 1/2007 | Nagel et al. |
| 7,397,912 B2 | 7/2008 | Aasman et al. |
| 7,613,287 B1 | 11/2009 | Stifelman et al. |
| 7,889,853 B2 | 2/2011 | Sutcliffe |
| 8,027,451 B2 | 9/2011 | Arendsen et al. |
| 8,204,200 B2 | 6/2012 | Wang et al. |
| 8,296,151 B2 | 10/2012 | Klein et al. |
| 8,560,564 B1 | 10/2013 | Hoelzle et al. |
| 8,660,247 B1 | 2/2014 | Brown |
| 8,677,377 B2 | 3/2014 | Cheyer et al. |
| 8,935,192 B1 | 1/2015 | Ventilla et al. |
| 8,983,383 B1 | 3/2015 | Haskin |
| 9,154,739 B1 | 10/2015 | Nicolaou et al. |
| 9,251,471 B2 | 2/2016 | Pinckney et al. |
| 9,299,059 B1 | 3/2016 | Marra et al. |
| 9,304,736 B1 | 4/2016 | Whiteley et al. |
| 9,338,242 B1 | 5/2016 | Suchland et al. |
| 9,338,493 B2 | 5/2016 | Van et al. |
| 9,377,852 B1 | 6/2016 | Shapiro et al. |
| 9,390,724 B2 | 7/2016 | List |
| 9,418,658 B1 | 8/2016 | David et al. |
| 9,472,206 B2 | 10/2016 | Ady |
| 9,479,931 B2 | 10/2016 | Ortiz, Jr. et al. |
| 9,576,574 B2 | 2/2017 | Van Os |
| 9,613,624 B1 | 4/2017 | Kramer et al. |
| 9,639,608 B2 | 5/2017 | Freeman |
| 9,659,577 B1 | 5/2017 | Langhammer |
| 9,720,955 B1 | 8/2017 | Cao et al. |
| 9,747,895 B1 | 8/2017 | Jansche et al. |
| 9,792,281 B2 | 10/2017 | Sarikaya |
| 9,858,925 B2 | 1/2018 | Gruber et al. |
| 9,865,260 B1 | 1/2018 | Vuskovic et al. |
| 9,875,233 B1 | 1/2018 | Tomkins et al. |
| 9,875,741 B2 | 1/2018 | Gelfenbeyn et al. |
| 9,881,077 B1 | 1/2018 | Alfonseca et al. |
| 9,886,953 B2 | 2/2018 | Lemay et al. |
| 9,990,591 B2 | 6/2018 | Gelfenbeyn et al. |
| 10,027,662 B1 | 7/2018 | Mutagi et al. |
| 10,042,032 B2 | 8/2018 | Scott et al. |
| 10,127,220 B2 | 11/2018 | Bellegarda et al. |
| 10,134,395 B2 | 11/2018 | Typrin |
| 10,162,886 B2 | 12/2018 | Wang et al. |
| 10,199,051 B2 | 2/2019 | Binder et al. |
| 10,241,752 B2 | 3/2019 | Lemay et al. |
| 10,271,093 B1 | 4/2019 | Jobanputra et al. |
| 10,276,170 B2 | 4/2019 | Gruber et al. |
| 10,387,464 B2 | 8/2019 | Weston et al. |
| 10,388,274 B1 | 8/2019 | Hoffmeister |
| 10,462,422 B1 | 10/2019 | Harrison et al. |
| 10,482,904 B1 | 11/2019 | Hardie et al. |
| D868,793 S | 12/2019 | Germe |
| 10,511,808 B2 | 12/2019 | Harrison et al. |
| 10,579,688 B2 | 3/2020 | Green |
| D881,883 S | 4/2020 | Germe |
| D882,567 S | 4/2020 | Parfitt |
| D882,570 S | 4/2020 | Germe |
| 10,719,786 B1 | 7/2020 | Treseler et al. |
| 10,782,986 B2 | 9/2020 | Martin |
| 10,803,050 B1 | 10/2020 | Salkola |
| 10,827,024 B1 | 11/2020 | Schissel et al. |
| 10,838,954 B1 | 11/2020 | Santos et al. |
| 10,841,249 B2 | 11/2020 | Lim et al. |
| 10,854,206 B1 | 12/2020 | Liu et al. |
| 10,855,485 B1 | 12/2020 | Zhou et al. |
| 10,896,295 B1 | 1/2021 | Shenoy |
| 10,949,616 B1 | 3/2021 | Shenoy et al. |
| 10,957,329 B1 | 3/2021 | Liu et al. |
| 10,958,599 B1 | 3/2021 | Penov et al. |
| 10,977,258 B1 | 4/2021 | Liu et al. |
| 10,978,056 B1 | 4/2021 | Challa et al. |
| 11,003,669 B1 | 5/2021 | Nelson et al. |
| 11,010,436 B1 | 5/2021 | Peng et al. |
| 11,038,934 B1 | 6/2021 | Hansen et al. |
| 11,038,974 B1 | 6/2021 | Koukoumidis et al. |
| 11,042,554 B1 | 6/2021 | Balakrishnan et al. |
| 11,086,858 B1 | 8/2021 | Koukoumidis et al. |
| 11,087,756 B1 | 8/2021 | Presant et al. |
| 11,093,551 B1 | 8/2021 | Vivek et al. |
| 11,100,179 B1 | 8/2021 | Zheng et al. |
| 11,107,467 B2 | 8/2021 | Lee et al. |
| 11,115,410 B1 | 9/2021 | Michael et al. |
| 11,127,405 B1 | 9/2021 | Antos et al. |
| 11,132,509 B1 | 9/2021 | Pasko et al. |
| 11,146,522 B1 | 10/2021 | Rao et al. |
| 11,205,420 B1 | 12/2021 | Fu et al. |
| 11,245,646 B1 | 2/2022 | Koukoumidis |
| 11,257,494 B1 | 2/2022 | Zhong et al. |
| 11,301,521 B1 | 4/2022 | Schissel et al. |
| 11,308,169 B1 | 4/2022 | Koukoumidis et al. |
| 11,308,284 B2 | 4/2022 | Huang et al. |
| 11,341,335 B1 | 5/2022 | Crook et al. |
| 11,368,420 B1 | 6/2022 | Crook et al. |
| 11,410,659 B1 | 8/2022 | Singh et al. |
| 11,429,649 B2 | 8/2022 | Yu et al. |
| 11,442,992 B1 | 9/2022 | Moon et al. |
| 11,443,120 B2 | 9/2022 | Poddar et al. |
| 11,508,372 B1 | 11/2022 | Schwartz et al. |
| 11,521,635 B1 | 12/2022 | Chhetri et al. |
| 11,528,274 B1 | 12/2022 | Krishnamoorthy et al. |
| 11,657,094 B2 | 5/2023 | Moon et al. |
| 11,869,490 B1 * | 1/2024 | Gupta ................. G10L 15/1822 |
| 2006/0167696 A1 | 7/2006 | Chaar et al. |
| 2008/0114603 A1 | 5/2008 | Desrochers |
| 2008/0240379 A1 | 10/2008 | Maislos et al. |
| 2008/0300884 A1 | 12/2008 | Smith |
| 2009/0177520 A1 * | 7/2009 | Bateni ..................... G06F 16/26 |
| | | 705/7.31 |
| 2009/0282033 A1 | 11/2009 | Alshawi |
| 2011/0246383 A1 | 10/2011 | Gibson et al. |
| 2012/0245944 A1 | 9/2012 | Gruber et al. |
| 2012/0246191 A1 | 9/2012 | Xiong |
| 2012/0265528 A1 | 10/2012 | Gruber et al. |
| 2012/0311126 A1 | 12/2012 | Jadallah et al. |
| 2013/0035930 A1 | 2/2013 | Ferrucci et al. |
| 2013/0194164 A1 | 8/2013 | Sugden et al. |
| 2013/0218572 A1 | 8/2013 | Cho et al. |
| 2013/0268839 A1 | 10/2013 | Lefebvre et al. |
| 2013/0275138 A1 | 10/2013 | Gruber et al. |
| 2013/0275164 A1 | 10/2013 | Gruber et al. |
| 2014/0012926 A1 | 1/2014 | Narayanan et al. |
| 2014/0032659 A1 | 1/2014 | Marini et al. |
| 2014/0074483 A1 | 3/2014 | Van Os |
| 2014/0081623 A1 | 3/2014 | Bretschneider et al. |
| 2014/0129266 A1 | 5/2014 | Perl et al. |
| 2014/0164506 A1 | 6/2014 | Tesch et al. |
| 2014/0184550 A1 | 7/2014 | Hennessey et al. |
| 2014/0244712 A1 | 8/2014 | Walters et al. |
| 2014/0280017 A1 | 9/2014 | Indarapu et al. |
| 2014/0297284 A1 | 10/2014 | Gruber et al. |
| 2015/0039305 A1 | 2/2015 | Huang |
| 2015/0081674 A1 | 3/2015 | Ali et al. |
| 2015/0106085 A1 | 4/2015 | Lindahl |
| 2015/0142420 A1 | 5/2015 | Sarikaya et al. |
| 2015/0142704 A1 | 5/2015 | London |
| 2015/0169284 A1 | 6/2015 | Quast et al. |
| 2015/0169744 A1 | 6/2015 | Walkingshaw et al. |
| 2015/0179168 A1 | 6/2015 | Hakkani-Tur et al. |
| 2015/0186156 A1 | 7/2015 | Brown et al. |
| 2015/0207765 A1 | 7/2015 | Brantingham et al. |
| 2015/0220888 A1 | 8/2015 | Iyer |
| 2015/0279352 A1 | 10/2015 | Willett et al. |
| 2015/0347375 A1 | 12/2015 | Tremblay et al. |

(56) References Cited

U.S. PATENT DOCUMENTS

| | | |
|---|---|---|
| 2016/0019290 A1 | 1/2016 | Ratnaparkhi et al. |
| 2016/0037311 A1 | 2/2016 | Cho |
| 2016/0063118 A1 | 3/2016 | Campbell et al. |
| 2016/0188150 A1 | 6/2016 | Abida et al. |
| 2016/0189717 A1 | 6/2016 | Kannan et al. |
| 2016/0196491 A1 | 7/2016 | Chandrasekaran et al. |
| 2016/0225370 A1 | 8/2016 | Kannan et al. |
| 2016/0255082 A1 | 9/2016 | Rathod |
| 2016/0306505 A1 | 10/2016 | Vigneras et al. |
| 2016/0308799 A1 | 10/2016 | Schubert et al. |
| 2016/0328096 A1 | 11/2016 | Tran et al. |
| 2016/0378849 A1 | 12/2016 | Myslinski |
| 2016/0378861 A1 | 12/2016 | Eledath et al. |
| 2017/0026318 A1 | 1/2017 | Daniel et al. |
| 2017/0091168 A1 | 3/2017 | Bellegarda et al. |
| 2017/0092264 A1 | 3/2017 | Hakkani-Tur et al. |
| 2017/0132019 A1 | 5/2017 | Karashchuk et al. |
| 2017/0193390 A1 | 7/2017 | Weston et al. |
| 2017/0256260 A1 | 9/2017 | Jeong |
| 2017/0262051 A1 | 9/2017 | Tall et al. |
| 2017/0286401 A1 | 10/2017 | He et al. |
| 2017/0330555 A1 | 11/2017 | Kawano et al. |
| 2017/0345420 A1 | 11/2017 | Barnett, Jr. |
| 2017/0353469 A1 | 12/2017 | Selekman et al. |
| 2017/0358304 A1 | 12/2017 | Castillo Sanchez et al. |
| 2017/0359707 A1 | 12/2017 | Diaconu et al. |
| 2018/0004481 A1* | 1/2018 | Fallon ..................... G10L 15/22 |
| 2018/0013699 A1 | 1/2018 | Sapoznik et al. |
| 2018/0018562 A1 | 1/2018 | Jung |
| 2018/0018987 A1 | 1/2018 | Zass |
| 2018/0040020 A1 | 2/2018 | Kurian et al. |
| 2018/0052824 A1 | 2/2018 | Ferrydiansyah et al. |
| 2018/0054523 A1 | 2/2018 | Zhang et al. |
| 2018/0068474 A1 | 3/2018 | Mowatt |
| 2018/0075659 A1 | 3/2018 | Browy et al. |
| 2018/0096071 A1 | 4/2018 | Green |
| 2018/0096072 A1 | 4/2018 | He et al. |
| 2018/0107917 A1 | 4/2018 | Hewavitharana et al. |
| 2018/0121508 A1 | 5/2018 | Halstvedt |
| 2018/0143802 A1 | 5/2018 | Jang |
| 2018/0189629 A1 | 7/2018 | Yatziv et al. |
| 2018/0210874 A1 | 7/2018 | Fuxman et al. |
| 2018/0233135 A1 | 8/2018 | Talwar et al. |
| 2018/0293484 A1 | 10/2018 | Wang et al. |
| 2018/0308480 A1 | 10/2018 | Jang et al. |
| 2018/0329998 A1 | 11/2018 | Thomson et al. |
| 2018/0336885 A1 | 11/2018 | Mukherjee et al. |
| 2018/0374482 A1 | 12/2018 | Woo et al. |
| 2019/0035390 A1 | 1/2019 | Howard et al. |
| 2019/0066672 A1 | 2/2019 | Wood et al. |
| 2019/0080698 A1 | 3/2019 | Miller |
| 2019/0082221 A1 | 3/2019 | Jain et al. |
| 2019/0087491 A1 | 3/2019 | Bax |
| 2019/0130904 A1 | 5/2019 | Homma et al. |
| 2019/0132265 A1 | 5/2019 | Nowak-Przygodzki et al. |
| 2019/0139150 A1 | 5/2019 | Brownhill et al. |
| 2019/0171762 A1 | 6/2019 | Luke et al. |
| 2019/0213490 A1 | 7/2019 | White et al. |
| 2019/0221039 A1 | 7/2019 | Korkin et al. |
| 2019/0279620 A1 | 9/2019 | Talwar et al. |
| 2019/0311036 A1 | 10/2019 | Shanmugam et al. |
| 2019/0311394 A1* | 10/2019 | Kveton ............. G06Q 30/0242 |
| 2019/0324527 A1 | 10/2019 | Presant et al. |
| 2019/0324553 A1 | 10/2019 | Liu et al. |
| 2019/0324780 A1 | 10/2019 | Zhu et al. |
| 2019/0325042 A1 | 10/2019 | Yu et al. |
| 2019/0325080 A1 | 10/2019 | Natarajan et al. |
| 2019/0325081 A1 | 10/2019 | Liu et al. |
| 2019/0325084 A1 | 10/2019 | Peng et al. |
| 2019/0325864 A1 | 10/2019 | Anders et al. |
| 2019/0327330 A1 | 10/2019 | Natarajan et al. |
| 2019/0327331 A1 | 10/2019 | Natarajan et al. |
| 2019/0332400 A1 | 10/2019 | Spoor et al. |
| 2019/0348033 A1 | 11/2019 | Chen et al. |
| 2019/0361408 A1 | 11/2019 | Tokuchi |
| 2020/0038749 A1 | 2/2020 | Penello et al. |
| 2020/0051563 A1 | 2/2020 | Oh et al. |
| 2020/0120396 A1 | 4/2020 | Jamal et al. |
| 2020/0151392 A1 | 5/2020 | Crabtree et al. |
| 2020/0193976 A1 | 6/2020 | Cartwright et al. |
| 2020/0202847 A1 | 6/2020 | Mukherjee et al. |
| 2020/0286628 A1 | 9/2020 | Helmer |
| 2020/0380985 A1 | 12/2020 | Gada et al. |
| 2020/0410012 A1 | 12/2020 | Moon et al. |
| 2021/0050018 A1 | 2/2021 | Kim et al. |
| 2021/0090575 A1 | 3/2021 | Mahmood et al. |
| 2021/0104236 A1 | 4/2021 | Doggett et al. |
| 2021/0117214 A1 | 4/2021 | Presant et al. |
| 2021/0117479 A1 | 4/2021 | Liu et al. |
| 2021/0117623 A1 | 4/2021 | Aly et al. |
| 2021/0117624 A1 | 4/2021 | Aghajanyan et al. |
| 2021/0117681 A1 | 4/2021 | Poddar et al. |
| 2021/0117780 A1 | 4/2021 | Malik et al. |
| 2021/0118440 A1 | 4/2021 | Peng et al. |
| 2021/0118442 A1 | 4/2021 | Poddar et al. |
| 2021/0119955 A1 | 4/2021 | Penov et al. |
| 2021/0120206 A1 | 4/2021 | Liu et al. |
| 2021/0183366 A1 | 6/2021 | Reinspach et al. |
| 2021/0193116 A1 | 6/2021 | Geramifard et al. |
| 2021/0249009 A1 | 8/2021 | Manjunath et al. |
| 2021/0281950 A1 | 9/2021 | Park, IV et al. |
| 2021/0295833 A1 | 9/2021 | Rastrow et al. |
| 2021/0295835 A1 | 9/2021 | Kim et al. |
| 2021/0304744 A1 | 9/2021 | Pawar et al. |
| 2021/0314523 A1 | 10/2021 | Kamisetty et al. |
| 2021/0327140 A1 | 10/2021 | Rothkopf et al. |
| 2021/0335340 A1 | 10/2021 | Gowayyed et al. |
| 2021/0375267 A1 | 12/2021 | Patil et al. |
| 2021/0383479 A1 | 12/2021 | Syed et al. |
| 2021/0383796 A1 | 12/2021 | Coucke et al. |
| 2021/0409234 A1 | 12/2021 | Behar |
| 2022/0005474 A1 | 1/2022 | Bai et al. |
| 2022/0028377 A1 | 1/2022 | Shin et al. |
| 2022/0036889 A1 | 2/2022 | Borja Jaramillo |
| 2022/0036892 A1 | 2/2022 | Hertschuh et al. |
| 2022/0050696 A1 | 2/2022 | Presant et al. |
| 2022/0068264 A1 | 3/2022 | Akel |
| 2022/0115016 A1 | 4/2022 | Whalin |
| 2022/0116485 A1 | 4/2022 | Gandhi et al. |
| 2022/0121275 A1 | 4/2022 | Balaji et al. |
| 2022/0122583 A1 | 4/2022 | Bates |
| 2022/0129556 A1 | 4/2022 | Chen et al. |
| 2022/0148592 A1 | 5/2022 | Maury et al. |
| 2022/0188361 A1 | 6/2022 | Botros et al. |
| 2022/0199079 A1 | 6/2022 | Hanson et al. |
| 2022/0210111 A1 | 6/2022 | Greenberg et al. |
| 2022/0215630 A1 | 7/2022 | Solanki et al. |
| 2022/0223151 A1 | 7/2022 | Lee et al. |
| 2022/0269870 A1 | 8/2022 | Goel et al. |
| 2022/0284904 A1 | 9/2022 | Pu et al. |
| 2022/0310094 A1 | 9/2022 | Nguyen et al. |
| 2022/0319522 A1 | 10/2022 | Guevara et al. |
| 2022/0366911 A1 | 11/2022 | Carbune et al. |
| 2022/0374605 A1 | 11/2022 | Sethi et al. |
| 2022/0383869 A1 | 12/2022 | Yabas et al. |
| 2022/0383872 A1 | 12/2022 | Li et al. |
| 2022/0406305 A1 | 12/2022 | Salarian et al. |
| 2023/0055477 A1 | 2/2023 | Mohajer et al. |
| 2023/0079969 A1 | 3/2023 | Kobayashi |
| 2023/0080686 A1 | 3/2023 | Gupta et al. |
| 2023/0081605 A1 | 3/2023 | O'Mara et al. |
| 2023/0115475 A1 | 4/2023 | Alsumail et al. |
| 2023/0128422 A1 | 4/2023 | Li et al. |
| 2023/0130308 A1 | 4/2023 | Tranquill et al. |
| 2023/0137920 A1 | 5/2023 | Klein et al. |
| 2023/0197077 A1 | 6/2023 | Lee et al. |
| 2023/0245649 A1 | 8/2023 | Singh et al. |
| 2024/0045704 A1 | 2/2024 | Khorshid |

(56) References Cited

U.S. PATENT DOCUMENTS

| 2024/0070251 A1 | 2/2024 | Maizels et al. |
| 2024/0112674 A1 | 4/2024 | Nguyen |

FOREIGN PATENT DOCUMENTS

| GB | 2580755 A | 7/2020 |
| WO | 2012116241 A2 | 8/2012 |
| WO | 2019203866 A1 | 10/2019 |
| WO | 2022203731 A1 | 9/2022 |

OTHER PUBLICATIONS

Co-pending U.S. Appl. No. 15/953,957, inventors Moujahid; Kemal El et al., filed Apr. 16, 2018.
Co-pending U.S. Appl. No. 15/967,193, inventors Testuggine; Davide et al., filed Apr. 30, 2018.
Co-pending U.S. Appl. No. 16/025,317, inventors Gupta; Sonal et al., filed Jul. 2, 2018.
Co-pending U.S. Appl. No. 16/048,072, inventor Salkola; Markku, filed Jul. 27, 2018.
Co-pending U.S. Appl. No. 16/048,101, inventor Salkola; Markku, filed Jul. 27, 2018.
Co-pending U.S. Appl. No. 16/057,414, inventors Kahn; Jeremy Gillmor et al., filed Aug. 7, 2018.
Co-pending U.S. Appl. No. 16/121,393, inventors Zhou; Zheng et al., filed Sep. 4, 2018.
Co-pending U.S. Appl. No. 16/135,752, inventors LIU; Xiaohu et al., filed on Sep. 19, 2018.
Co-pending U.S. Appl. No. 16/168,536, inventors Dumoulin; Benoit F. et al., filed Oct. 23, 2018.
Co-pending U.S. Appl. No. 16/376,832, inventors Liu; Honglei et al., filed Apr. 5, 2019.
Co-pending U.S. Appl. No. 16/389,738, inventors Peng; Fuchun et al., filed Apr. 19, 2019.
Co-pending U.S. Appl. No. 16/389,769, inventors Liu; Honglei et al., filed Apr. 19, 2019.
Co-pending U.S. Appl. No. 16/434,010, inventors Dogaru; Sergiu et al., filed Jun. 6, 2019.
Co-pending U.S. Appl. No. 16/659,070, inventors Huang; Lisa Xiaoyi et al., filed Oct. 21, 2019.
Co-pending U.S. Appl. No. 16/659,203, inventors Huang; Lisa Xiaoyi et al., filed Oct. 21, 2019.
Co-pending U.S. Appl. No. 16/659,419, inventors Huang; Lisa Xiaoyi et al., filed Oct. 21, 2019.
Co-pending U.S. Appl. No. 16/742,769, inventors Liu; Xiaohu et al., filed Jan. 14, 2020.
Co-pending U.S. Appl. No. 16/790,497, inventors Gao; Yang et al., filed Feb. 13, 2020.
Co-pending U.S. Appl. No. 16/815,960, inventors Malik; Kshitiz et al., filed Mar. 11, 2020.
Co-pending U.S. Appl. No. 16/917,664, inventors Liu; Xiaohu et al., filed Jun. 30, 2020.
Co-pending U.S. Appl. No. 16/921,665, inventors Liu; Honglei et al., filed Jul. 6, 2020.
Co-pending U.S. Appl. No. 17/009,542, inventor Kottur; Satwik, filed Sep. 1, 2020.
Co-pending U.S. Appl. No. 17/139,363, inventors Cheng; Daniel Manhon et al., filed Dec. 31, 2020.
Co-pending U.S. Appl. No. 17/186,459, inventors Liu; Bing et al., filed Feb. 26, 2021.
Co-pending U.S. Appl. No. 17/336,716, inventors Chaland; Christophe et al., filed Jun. 2, 2021.
Co-pending U.S. Appl. No. 17/351,501, inventors Sethi; Pooja et al., filed Jun. 18, 2021.
Co-pending U.S. Appl. No. 17/391,765, inventors Pu; Yiming et al., filed Aug. 2, 2021.
Co-pending U.S. Appl. No. 17/394,096, inventors Wang; Emily et al., filed Aug. 4, 2021.
Co-pending U.S. Appl. No. 17/394,159, inventors Santoro; Elizabeth Kelsey et al., filed Aug. 4, 2021.
Co-pending U.S. Appl. No. 17/504,276, inventors Kottur; Satwik et al., filed Oct. 18, 2021.
Co-pending U.S. Appl. No. 17/512,508, inventors Vincent; Joshuah et al., filed Oct. 27, 2021.
Co-pending U.S. Appl. No. 17/521,623, inventors Martinson; Leif Haven et al., filed Nov. 8, 2021.
Co-pending U.S. Appl. No. 17/525,510, inventors Shrivastava; Akshat et al., filed Nov. 12, 2021.
Co-pending U.S. Appl. No. 17/543,178, inventors Desai; Shrey et al., filed Dec. 6, 2021.
Co-pending U.S. Appl. No. 17/725,540, inventors Surkov; Alexey Gennadyevich et al., filed Apr. 20, 2022.
Co-pending U.S. Appl. No. 17/732,104, inventors Bi; Sheng et al., filed Apr. 28, 2022.
Co-pending U.S. Appl. No. 17/747,345, inventors Desai; Shrey et al., filed May 18, 2022.
Co-pending U.S. Appl. No. 17/877,568, inventor Khorshid; Mokhtar Mohamed, filed Jul. 29, 2022.
Co-pending U.S. Appl. No. 17/877,595, inventors Khorshid; Mokhtar Mohamed et al., filed Jul. 29, 2022.
Co-pending U.S. Appl. No. 17/934,898, inventor Nguyen; Katherina, filed Sep. 23, 2022.
Co-pending U.S. Appl. No. 17/935,029, inventors Shi; Yangyang et al., filed Sep. 23, 2022.
Co-pending U.S. Appl. No. 18/050,037, inventors Li; Mengxi et al., filed Oct. 26, 2022.
Co-pending U.S. Appl. No. 18/050,038, inventors Jackson; Aaron et al., filed Oct. 26, 2022.
Co-pending U.S. Appl. No. 18/050,039, inventors Yang; Fang-Yu et al., filed Oct. 26, 2022.
Final Office Action mailed Sep. 3, 2025 for U.S. Appl. No. 18/050,038, filed Oct. 26, 2022, 28 pages.
Final Office Action mailed Apr. 23, 2025 for U.S. Appl. No. 18/050,039, filed Oct. 26, 2022, 17 pages.

* cited by examiner

600

600

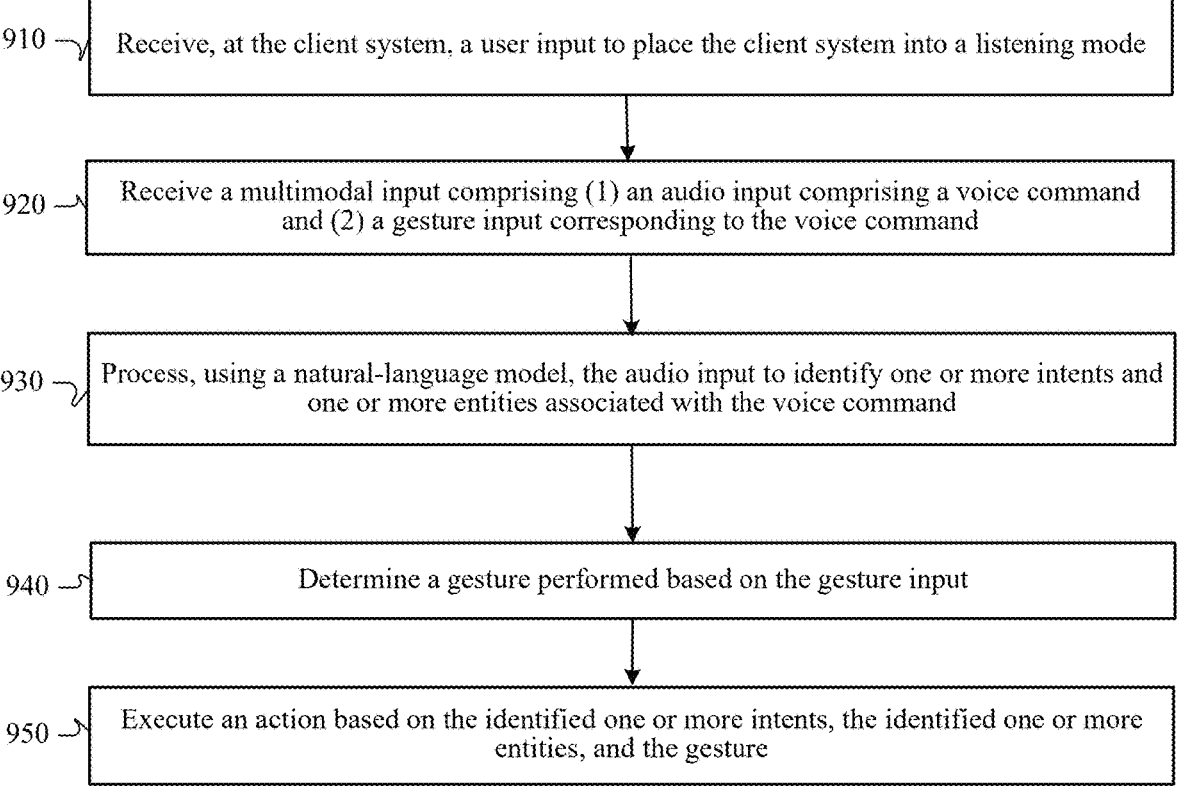

910 — Receive, at the client system, a user input to place the client system into a listening mode 920 — Receive a multimodal input comprising (1) an audio input comprising a voice command and (2) a gesture input corresponding to the voice command 930 — Process, using a natural-language model, the audio input to identify one or more intents and one or more entities associated with the voice command 940 — Determine a gesture performed based on the gesture input 950 — Execute an action based on the identified one or more intents, the identified one or more entities, and the gesture

*FIG. 9*

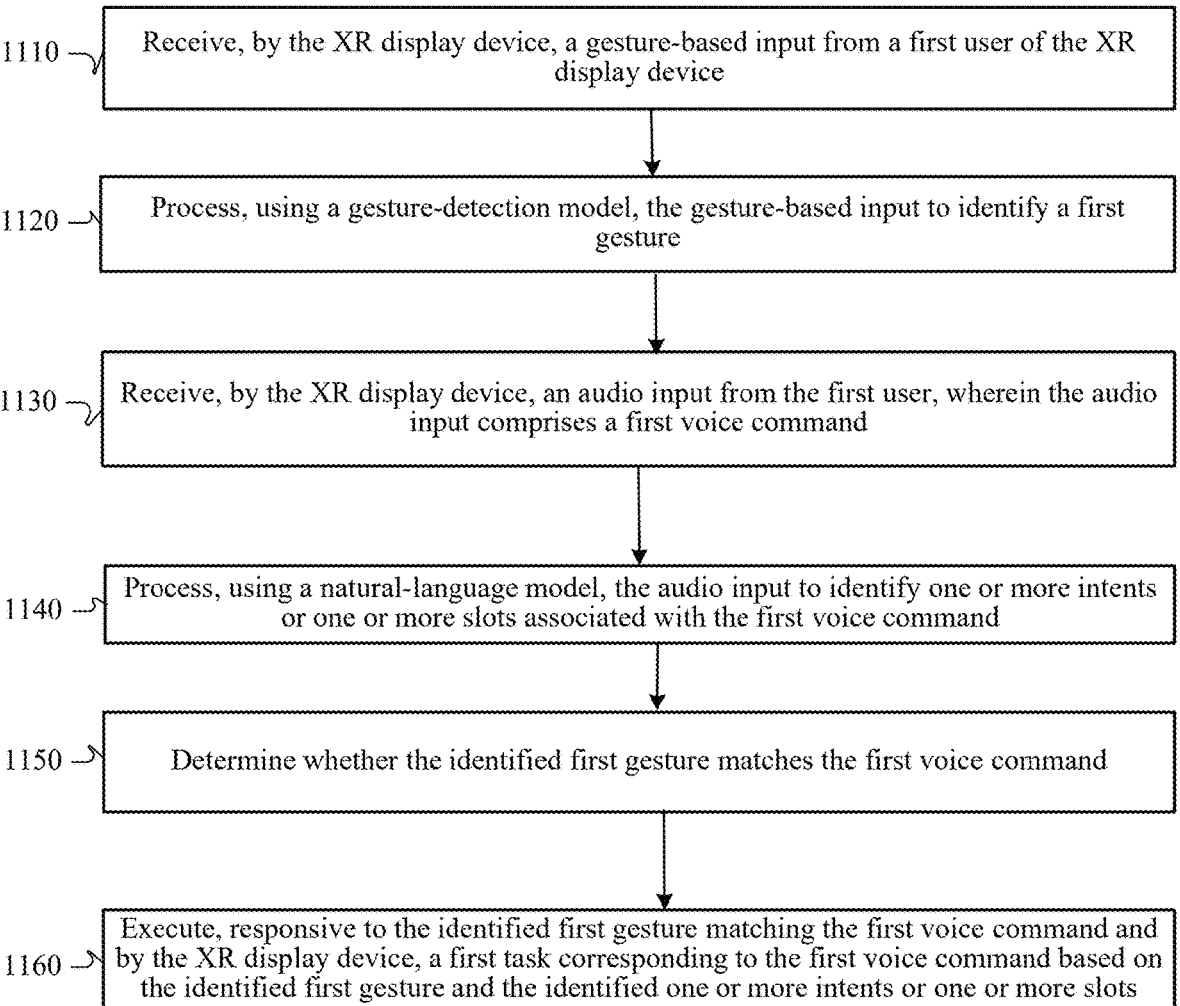

1100

1110 — Receive, by the XR display device, a gesture-based input from a first user of the XR display device 1120 — Process, using a gesture-detection model, the gesture-based input to identify a first gesture 1130 — Receive, by the XR display device, an audio input from the first user, wherein the audio input comprises a first voice command 1140 — Process, using a natural-language model, the audio input to identify one or more intents or one or more slots associated with the first voice command 1150 — Determine whether the identified first gesture matches the first voice command 1160 — Execute, responsive to the identified first gesture matching the first voice command and by the XR display device, a first task corresponding to the first voice command based on the identified first gesture and the identified one or more intents or one or more slots

*FIG. 11*

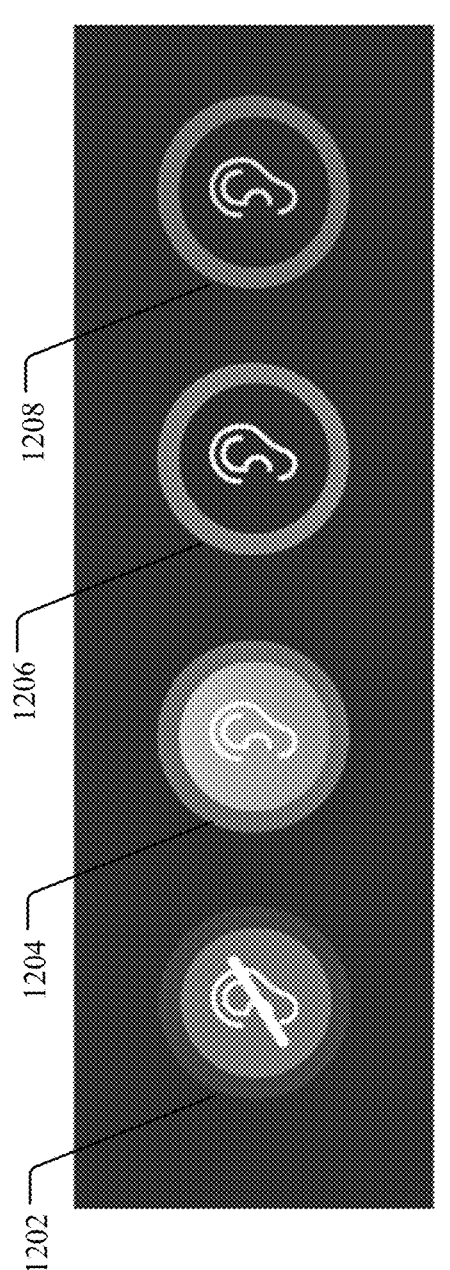
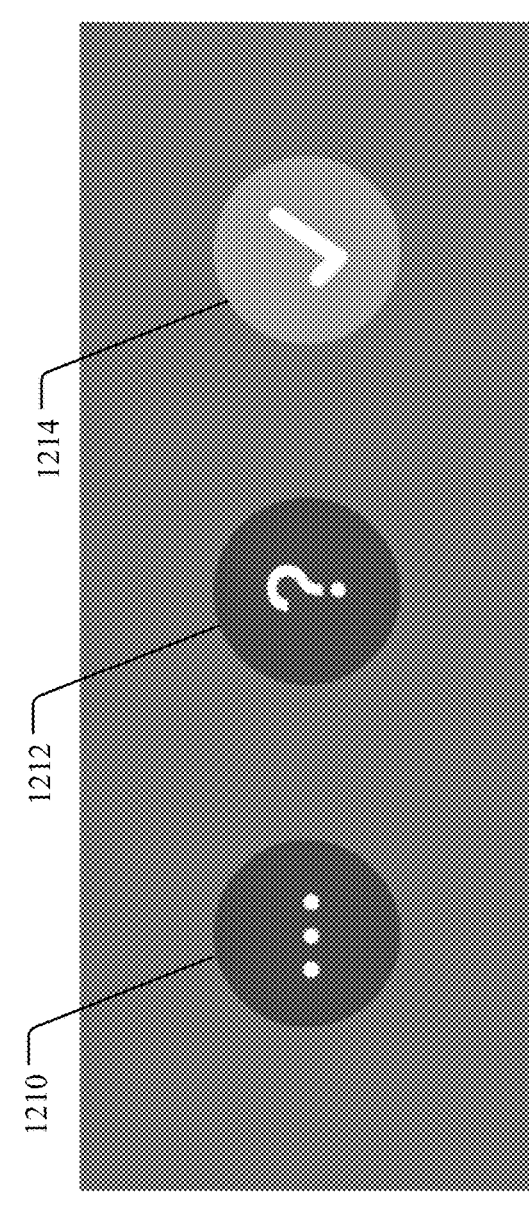
*FIG. 12*

1300

Instructions 1310

Indicator 1308

Text 1306

Stone Heading 1302

Door 1304

Try saying the magic words!

Lorem ipsum dolor sit amet

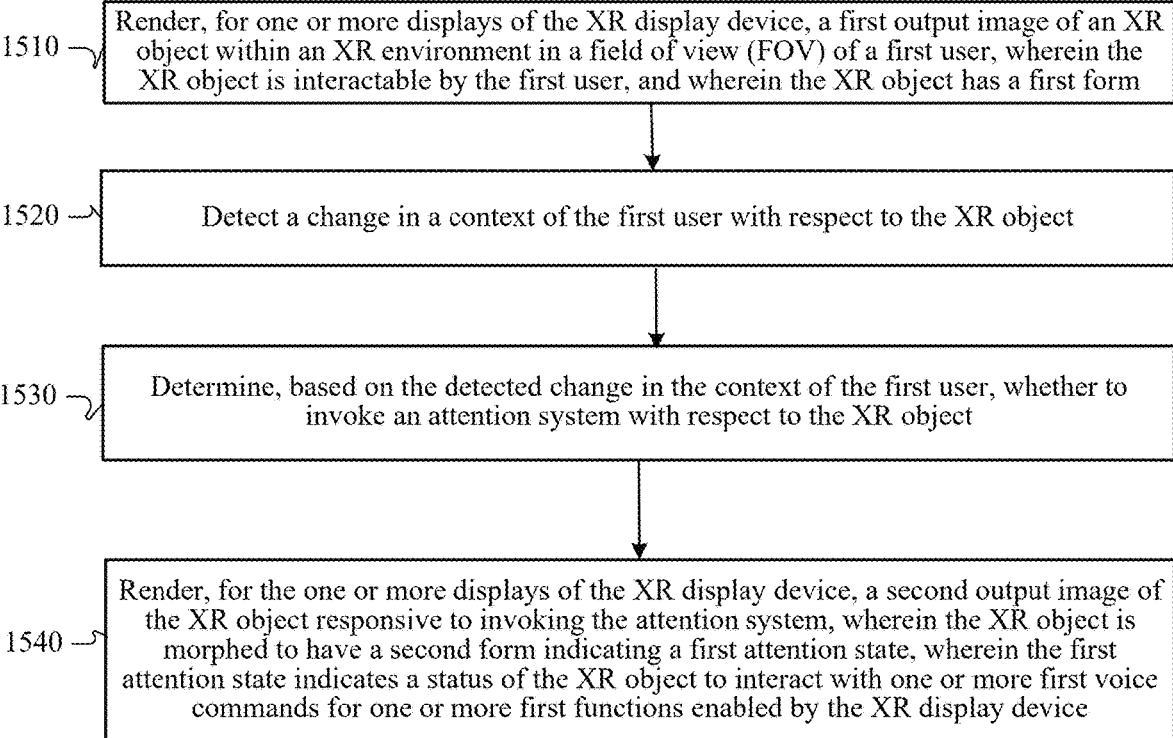

1500

1510 — Render, for one or more displays of the XR display device, a first output image of an XR object within an XR environment in a field of view (FOV) of a first user, wherein the XR object is interactable by the first user, and wherein the XR object has a first form 1520 — Detect a change in a context of the first user with respect to the XR object 1530 — Determine, based on the detected change in the context of the first user, whether to invoke an attention system with respect to the XR object 1540 — Render, for the one or more displays of the XR display device, a second output image of the XR object responsive to invoking the attention system, wherein the XR object is morphed to have a second form indicating a first attention state, wherein the first attention state indicates a status of the XR object to interact with one or more first voice commands for one or more first functions enabled by the XR display device

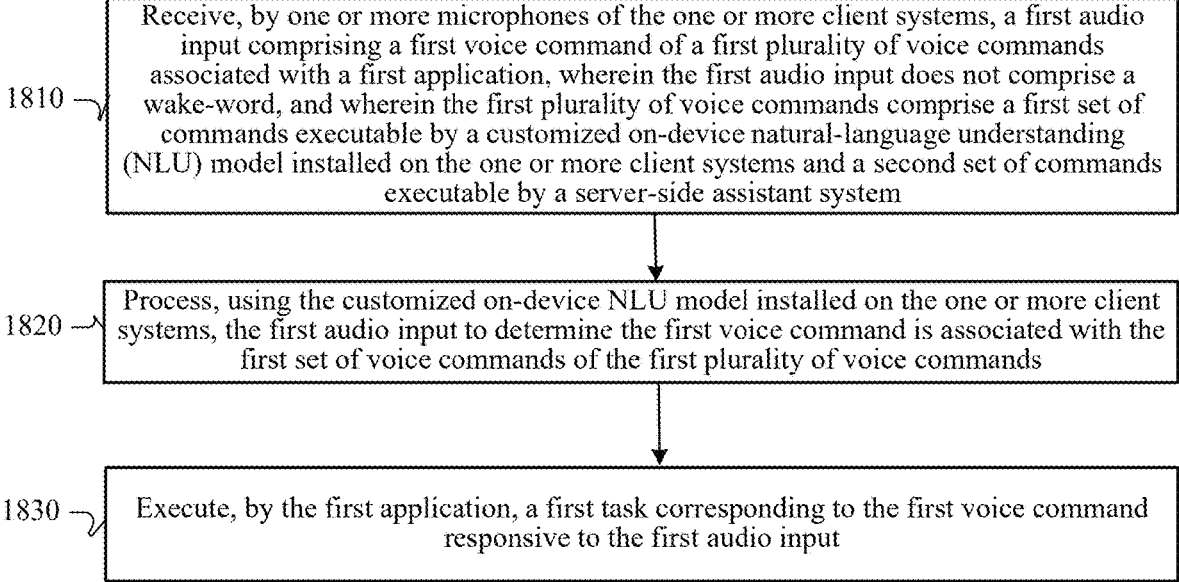

1810 — Receive, by one or more microphones of the one or more client systems, a first audio input comprising a first voice command of a first plurality of voice commands associated with a first application, wherein the first audio input does not comprise a wake-word, and wherein the first plurality of voice commands comprise a first set of commands executable by a customized on-device natural-language understanding (NLU) model installed on the one or more client systems and a second set of commands executable by a server-side assistant system 1820 — Process, using the customized on-device NLU model installed on the one or more client systems, the first audio input to determine the first voice command is associated with the first set of voice commands of the first plurality of voice commands 1830 — Execute, by the first application, a first task corresponding to the first voice command responsive to the first audio input

*FIG. 18*

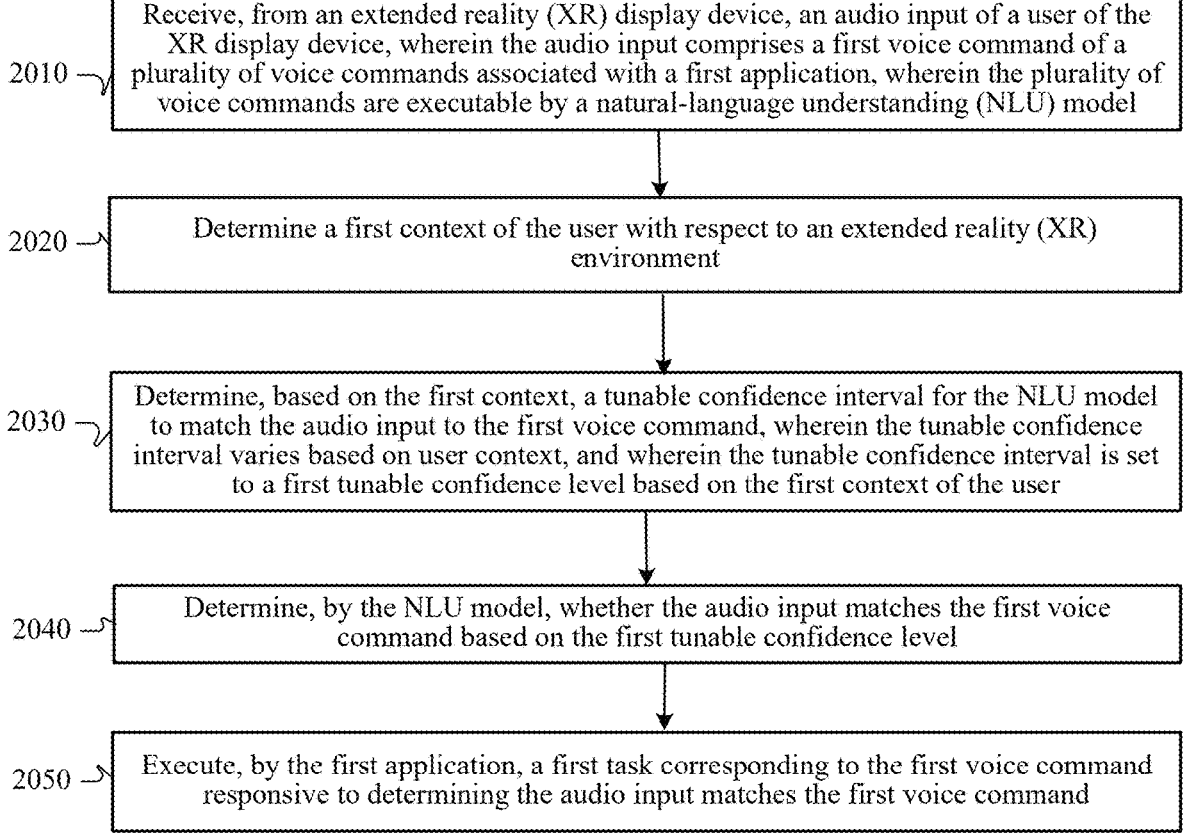

2010 — Receive, from an extended reality (XR) display device, an audio input of a user of the XR display device, wherein the audio input comprises a first voice command of a plurality of voice commands associated with a first application, wherein the plurality of voice commands are executable by a natural-language understanding (NLU) model 2020 — Determine a first context of the user with respect to an extended reality (XR) environment 2030 — Determine, based on the first context, a tunable confidence interval for the NLU model to match the audio input to the first voice command, wherein the tunable confidence interval varies based on user context, and wherein the tunable confidence interval is set to a first tunable confidence level based on the first context of the user 2040 — Determine, by the NLU model, whether the audio input matches the first voice command based on the first tunable confidence level 2050 — Execute, by the first application, a first task corresponding to the first voice command responsive to determining the audio input matches the first voice command

TUNABLE CONFIDENCE INTERVALS FOR ON-DEVICE NATURAL LANGUAGE UNDERSTANDING MODELS

PRIORITY

This application claims the benefit under 35 U.S.C. § 119(e) of U.S. Provisional Patent Application No. 63/272, 621, filed 27 Oct. 2021, which is incorporated herein by reference.

TECHNICAL FIELD

This disclosure generally relates to databases and file management within network environments, and in particular relates to hardware and software for augmented reality systems and virtual reality systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

Standard virtual reality systems use either virtual reality headsets or multi-projected environments to generate realistic images, sounds and other sensations that simulate a user's physical presence in a virtual environment. A person using virtual reality equipment is able to look around the artificial world, move around in it, and interact with virtual features or items. The effect is commonly created by VR headsets consisting of a head-mounted display with a small screen in front of the eyes but can also be created through specially designed rooms with multiple large screens. Virtual reality typically incorporates auditory and video feedback but may also allow other types of sensory and force feedback through haptic technology.

Augmented reality is an interactive experience that combines the real world and computer-generated content. The content can span multiple sensory modalities, including visual, auditory, haptic, somatosensory and olfactory. Augmented reality can be defined as a system that incorporates three basic features: a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment.

Virtual reality (VR) and augmented reality (AR) applications are applications that make use of an immersive sensory experience that digitally simulates a virtual environment or virtual objects in a real-world environment. Applications have been developed in a variety of domains, such as education, architectural and urban design, digital marketing and activism, engineering and robotics, entertainment, virtual communities, fine arts, healthcare and clinical therapies, heritage and archaeology, occupational safety, social science and psychology.

SUMMARY OF PARTICULAR EMBODIMENTS

In particular embodiments, the assistant system may assist a user to obtain information or services. The assistant system may enable the user to interact with the assistant system via user inputs of various modalities (e.g., audio, voice, text, image, video, gesture, motion, location, orientation) in stateful and multi-turn conversations to receive assistance from the assistant system. As an example and not by way of limitation, the assistant system may support mono-modal inputs (e.g., only voice inputs), multi-modal inputs (e.g., voice inputs and text inputs), hybrid/multi-modal inputs, or any combination thereof. User inputs provided by a user may be associated with particular assistant-related tasks, and may include, for example, user requests (e.g., verbal requests for information or performance of an action), user interactions with an assistant application associated with the assistant system (e.g., selection of UI elements via touch or gesture), or any other type of suitable user input that may be detected and understood by the assistant system (e.g., user movements detected by the client device of the user). The assistant system may create and store a user profile comprising both personal and contextual information associated with the user. In particular embodiments, the assistant system may analyze the user input using natural-language understanding (NLU). The analysis may be based on the user profile of the user for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation (NLG). Through the interaction with the user, the assistant system may use dialog-management techniques to manage and advance the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute, without a user input, tasks that are relevant to user interests and preferences based on the user profile, at a time relevant for the user. In particular embodiments, the assistant system may check privacy settings to ensure that accessing a user's profile or other user information and executing different tasks are permitted subject to the user's privacy settings.

In particular embodiments, the assistant system may assist the user via a hybrid architecture built upon both client-side processes and server-side processes. The client-side processes and the server-side processes may be two parallel workflows for processing a user input and providing assistance to the user. In particular embodiments, the client-side processes may be performed locally on a client system associated with a user. By contrast, the server-side processes may be performed remotely on one or more computing systems. In particular embodiments, an arbitrator on the client system may coordinate receiving user input (e.g., an audio signal), determine whether to use a client-side process, a server-side process, or both, to respond to the user input, and analyze the processing results from each process. The arbitrator may instruct agents on the client-side or server-side to execute tasks associated with the user input based on the aforementioned analyses. The execution results may be further rendered as output to the client system. By leveraging both client-side and server-side processes, the assistant system can effectively assist a user with optimal usage of computing resources while at the same time protecting user privacy and enhancing security.

In particular embodiments, a client system may implement voice commands within an augmented reality (AR), virtual reality (VR), mixed reality (MR), or extended reality (XR) environment via a voice SDK, which allows XR applications to easily integrate voice commands on XR devices (e.g., the client system). In particular embodiments, XR may be one or more of a combination of AR, VR, or MR. As an example and not by way of limitation, XR may include elements of AR or VR or MR. In particular embodiments, the client system may implement voice commands in combination with gestures within XR environments via a voice SDK. As XR content becomes more immersive, voice integration may make the content more engaging to interact with various applications. That is, people typically interact with the real world using their voice and hands. Currently, navigating through XR content may be cumbersome as the user may need to navigate through unfamiliar nested menus. As an example and not by way of limitation, a user may need to click through various virtual menus by ray-casting from a controller or inputting text through a virtual keyboard to navigate to a desired destination. To improve upon the user experience, the XR system may implement voice commands, combined with one or more other modalities (e.g., gesture, pose, eye gaze, etc.) to allow a user to perform voice navigation/search, voice FAQ, and voice-driven gameplay & experiences.

In particular embodiments, a client system embodied as an augmented reality headset, virtual reality headset, or extended reality headset may perform the method of processing a voice command. In particular embodiments, the client system may receive a gesture-based input from a first user of the client system. In particular embodiments, the client system may process, using a gesture-detection model, the gesture-based input to identify a first gesture. In particular embodiments, the client system may receive an audio input from the first user. In particular embodiments, the audio input comprises a first voice command. In particular embodiments, client system may process, using a natural-language model, the audio input to identify one or more intents or one or more slots associated with the first voice command. In particular embodiments, client system may determine whether the identified first gesture matches the first voice command. In particular embodiments, client system may execute, responsive to the identified first gesture matching the first voice command and by the XR display device, a first task corresponding to the first voice command based on the identified first gesture and the identified one or more intents or one or more slots. Particular embodiments may repeat one or more steps of the method, where appropriate. Although this disclosure describes and illustrates particular steps of the method as occurring in a particular order, this disclosure contemplates any suitable steps of the method of occurring in any suitable order. Moreover, although this disclosure describes and illustrates an example method for processing a voice command including the particular steps of the method, this disclosure contemplates any suitable method for processing a voice command including any suitable steps, which may include all, some, or none of the steps of the method, where appropriate. Furthermore, although this disclosure describes and illustrates particular components, devices, or systems carrying out particular steps of the method, this disclosure contemplates any suitable combination of any suitable components, devices, or systems carrying out any suitable steps of the method.

Certain technical challenges exist for navigating through XR content. One technical challenge may include navigating through the unfamiliar nested menus. Another technical challenge may include a user needing to click through various virtual menus by ray-casting from a controller or inputting text through a virtual keyboard to navigate to a desired destination. The solution presented by the embodiments disclosed herein to address this challenge may be the XR system may implement voice commands, combined with one or more other modalities (e.g., gesture, pose, eye gaze, etc.) to allow a user to perform voice navigation/search, voice FAQ, and voice-driven gameplay & experiences.

Certain embodiments disclosed herein may provide one or more technical advantages. A technical advantage of the embodiments may include capturing voice requests with out-of-the-box activation methods. Another technical advantage of the embodiments may include automatic speech recognition (ASR) for a user's utterance. Another technical advantage of the embodiments may include receive live ASR transcription for a spoken utterance. Another technical advantage of the embodiments may include training custom NLU capabilities specific for applications. Another technical advantage of the embodiments may include improved voice request accuracy with dynamic entities. Certain embodiments disclosed herein may provide none, some, or all of the above technical advantages. One or more other technical advantages may be readily apparent to one skilled in the art in view of the figures, descriptions, and claims of the present disclosure.

In particular embodiments, a client system may implement voice commands within an XR environment via a voice SDK, which allows XR applications to easily integrate voice commands on XR devices (e.g., the client system). In particular embodiments, a client system may implement an attention system to provide audio-visual cues to a microphone status in XR environments. There are sometimes issues with users identifying and understanding which entities/objects are interactable by voice within an XR environment. Additionally, users sometimes are not knowledgeable on what voice commands are available to them for certain contexts, such as for assistant experiences on voice-forward and voice-only devices and immersive in-app experiences in XR. To help the user distinguish which objects are interactable via voice command, an attention system may be used to provide audio-visual cues that let users know various attention states of a XR object, such as when the XR object is ready to receive a voice command, when the microphone is active, and when the system is processing the voice command.

In particular embodiments, a client system may be embodied as an augmented reality headset, virtual reality headset, or extended reality headset to perform a method of invoking an attention system. In particular embodiments, the client system may render, for one or more displays of the client system, a first output image of an XR object within an XR environment in a field of view (FOV) of a first user. In particular embodiments, the XR object may be interactable by the first user. In particular embodiments, the XR object may have a first form. In particular embodiments, the client system may detect a change in a context of the first user with respect to the XR object. In particular embodiments, the client system may determine, based on the detected change in the context of the first user, whether to invoke an attention system with respect to the XR object. In particular embodiments, client system may render, for the one or more displays of the client system, a second output image of the XR object responsive to invoking the attention system. In particular embodiments, the XR object is morphed to have a second form indicating a first attention state. In particular embodiments, the first attention state indicates a status of the XR object to interact with one or more first voice commands for one or more first functions enabled by the client system. Particular embodiments may repeat one or more steps of the method, where appropriate. Although this disclosure describes and illustrates particular steps of the method as occurring in a particular order, this disclosure contemplates any suitable steps of the method occurring in any suitable order. Moreover, although this disclosure describes and illustrates an example method for invoking an attention system including the particular steps of the method, this disclosure contemplates any suitable method for invoking an attention system including any suitable steps, which may include all, some, or none of the steps of the method, where appropriate. Furthermore, although this disclosure describes and illustrates particular components, devices, or systems carrying out particular steps of the method, this disclosure contemplates any suitable combination of any suitable components, devices, or systems carrying out any suitable steps of the method.

Certain technical challenges exist for understanding a current attention state of an object and system. One technical challenge may include issues with users identifying and understanding which entities/objects are interactable by voice within an XR environment. The solution presented by the embodiments disclosed herein to address this challenge may be providing an attention system that provides an attention state on an object-to-object basis. Another technical challenge may include users sometimes are not knowledgeable on what voice commands are available to them for certain contexts. The solution presented by the embodiments disclosed herein to address this challenge may be to provide a user education module to educate the user.

Certain embodiments disclosed herein may provide one or more technical advantages. A technical advantage of the embodiments may include helping the user distinguish which objects are interactable via voice command, an attention system that may be used to provide audio-visual cues that let users know various attention states of a XR object, such as when the XR object is ready to receive a voice command, when the microphone is active, and when the system is processing the voice command. Another technical advantage of the embodiments may include using visual cues to map with the attention system states to visually guide users to know when their microphone is on/off and when the attention system is ready to receive voice inputs. Certain embodiments disclosed herein may provide none, some, or all of the above technical advantages. One or more other technical advantages may be readily apparent to one skilled in the art in view of the figures, descriptions, and claims of the present disclosure.

In particular embodiments, a client system may implement voice commands within an XR environment via a voice SDK, which allows XR applications to easily integrate voice commands on XR devices (e.g., the client system). The client system may use a customized on-device natural-language understanding (NLU) models to process voice inputs. Using voice commands in certain XR apps may have issues, such as latency caused by having to send the audio file to a server, process it, and then get a response. Even latency of a few hundred microseconds can be too slow to make certain voice commands usable for particular apps (e.g., most action-based games). As an example and not by way of limitation, for a fast-paced action-based game, a user may request to call in an in-game action to be performed in the middle of an in-game environment. The user may expect to have the in-game action be performed within a reasonable time period (e.g., a few milliseconds). To reduce the latency of processing voice commands for certain situations, the voice SDK may enable app developers to add certain voice interactions onto a customized on-device NLU model for the application so the voice commands may be executed quicker. The voice SDK may enable the voice interactions in applications by using a pattern recognizer that identifies certain phrases that are expected for certain situations.

In particular embodiments, one or more client systems may be embodied as an augmented reality headset, virtual reality headset, or extended reality headset to perform a method of processing an audio input. In particular embodiments, one or more clients systems may receive, by one or more microphones of the one or more client systems, a first audio input comprising a first voice command of a first plurality of voice commands associated with a first application. In particular embodiments, the first audio input may not comprise a wake-word. In particular embodiments, the first plurality of voice commands may comprise a first set of commands executable by a customized on-device natural-language understanding (NLU) model installed on the one or more client systems and a second set of commands executable by a server-side assistant system. In particular embodiments, the one or more client systems may process, using the customized on-device NLU model installed on the one or more client systems, the first audio input to determine the first voice command is associated with the first set of voice commands of the first plurality of voice commands. In particular embodiments, the one or more client systems may execute, by the first application, a first task corresponding to the first voice command responsive to the first audio input. Particular embodiments may repeat one or more steps of the method, where appropriate. Although this disclosure describes and illustrates particular steps of the method as occurring in a particular order, this disclosure contemplates any suitable steps of the method occurring in any suitable order. Moreover, although this disclosure describes and illustrates an example method for processing an audio input including the particular steps of the method of, this disclosure contemplates any suitable method for processing an audio input including any suitable steps, which may include all, some, or none of the steps of the method of, where appropriate. Furthermore, although this disclosure describes and illustrates particular components, devices, or systems carrying out particular steps of the method, this disclosure contemplates any suitable combination of any suitable components, devices, or systems carrying out any suitable steps of the method.

Certain technical challenges exist for processing audio inputs. One technical challenge may include latency caused by having to send the audio file to a server, process it, and then get a response. The solution presented by the embodiments disclosed herein to address this challenge may be to use a customized on-device NLU model for an application so the voice commands may be executed quicker. Another technical challenge may include latency of processing voice commands for certain situations. The solution presented by the embodiments disclosed herein to address this challenge may be using a pattern recognizer that identifies certain phrases that are expected for certain situations.

Certain embodiments disclosed herein may provide one or more technical advantages. A technical advantage of the embodiments may include enabling voice commands that are executed quickly for applications. Another technical advantage of the embodiments may include customized NLU model may be trained to bypass the wake word and respond directly to particular words/commands. Certain embodiments disclosed herein may provide none, some, or all of the above technical advantages. One or more other technical advantages may be readily apparent to one skilled in the art in view of the figures, descriptions, and claims of the present disclosure.

In particular embodiments, a client system may implement voice commands within an XR environment via a voice SDK, which allows XR applications to easily integrate voice commands on XR devices (e.g., the client system). In particular embodiments, one or more computing systems (e.g., a server-side assistant system) may customize the tolerance intervals used by natural-language understanding (NLU) models for processing voice interactions via the voice SDK. Developers may have issues initially adding voice interactions to their applications. To reduce the complexity and improve upon the developer experience, the voice SDK may include voice interactions that allow users to maintain immersion, enable multitasking, and make content more accessible. As an example and not by way of limitation, the voice SDK may provide interactions that allow voice-driven gameplay, such as using voice commands to navigate an XR environment. As another example and not by way of limitation, the voice SDK may provide interactions that allow voice navigation and search, such as a voice command to quickly switch a XR environment to another context (e.g., from one XR generated environment to a new XR generated environment) for an application. As another example and not by way of limitation, the voice SDK may provide discovery and user education, such as providing an interface to quickly navigate possible voice commands available to the user within the application. Voice interfaces can unlock entirely new ways of interacting with an XR environment. The voice SDK gives developers a way to integrate AI-driven voice experiences into XR applications.

In particular embodiments, one or more computing systems embodied as server-side assistant system may perform the method of tuning a confidence interval. In particular embodiments, a client system may also perform the method of tuning a confidence interval. In particular embodiments, one or more computing systems may receive, from an extended reality (XR) display device, an audio input of a user of the XR display device. In particular embodiments, the audio input comprises a first voice command of a plurality of voice commands associated with a first application. In particular embodiments, the plurality of voice commands are executable by a natural-language understanding (NLU) model. In particular embodiments, the one or more computing systems may determine a first context of the user with respect to an extended reality (XR) environment. In particular embodiments, the one or more computing systems may determine, based on the first context, a tunable confidence interval for the NLU model to match the audio input to the first voice command. In particular embodiments, the tunable confidence interval may vary based on user context. In particular embodiments the tunable confidence interval may be set to a first tunable confidence level based on the first context of the user. In particular embodiments, the one or more computing systems may determine, by the NLU model, whether the audio input matches the first voice command based on the first tunable confidence level. In particular embodiments, the one or more computing systems may execute, by the first application, a first task corresponding to the first voice command responsive to determining the audio input matches the first voice command. Particular embodiments may repeat one or more steps of the method, where appropriate. Although this disclosure describes and illustrates particular steps of the method as occurring in a particular order, this disclosure contemplates any suitable steps of the method occurring in any suitable order. Moreover, although this disclosure describes and illustrates an example method for tuning a confidence interval including the particular steps of the method, this disclosure contemplates any suitable method for tuning a confidence interval including any suitable steps, which may include all, some, or none of the steps of the method, where appropriate. Furthermore, although this disclosure describes and illustrates particular components, devices, or systems carrying out particular steps of the method, this disclosure contemplates any suitable combination of any suitable components, devices, or systems carrying out any suitable steps of the method.

Certain technical challenges exist for voice interactions in applications. One technical challenge may include maintaining immersion in an application or XR environment. The solution presented by the embodiments disclosed herein to address this challenge may be providing interactions that allow voice-driven gameplay, such as using voice commands to navigate an XR environment. Another technical challenge may include the complexity of adding voice interactions to applications. The solution presented by the embodiments disclosed herein to address this challenge may be to use a voice SDK that includes voice interactions that allow users to maintain immersion, enable multitasking, and make content more accessible.

Certain embodiments disclosed herein may provide one or more technical advantages. A technical advantage of the embodiments may include providing interactions that allow voice navigation and search, such as a voice command to quickly switch a XR environment to another context (e.g., from one XR generated environment to a new XR generated environment) for an application. Another technical advantage of the embodiments may include providing discovery and user education, such as providing an interface to quickly navigate possible voice commands available to the user within the application. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 9 illustrates an example method for processing an audio input.

FIG. 11 illustrates an example method for processing a voice command.

FIG. 12 illustrates example indications of the attention state of an object.

FIG. 15 illustrates an example method for invoking an attention system of an XR object.

FIG. 18 illustrates an example method for processing an audio input.

FIG. 20 illustrates an example method for tuning a confidence interval.

DESCRIPTION OF EXAMPLE EMBODIMENTS

System Overview

Figure 1:
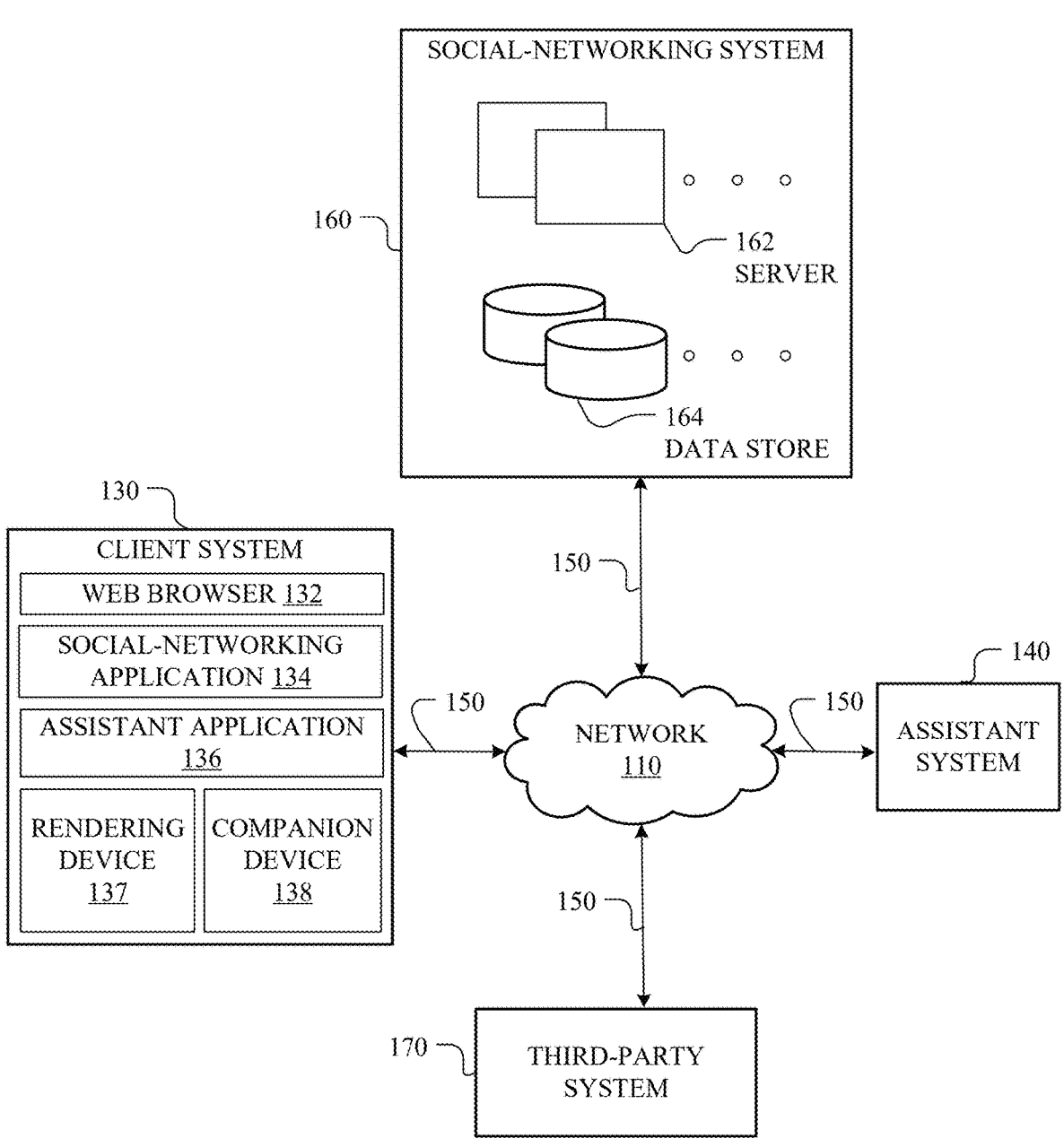
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular technology-based network, a satellite communications technology-based network, another network 110, or a combination of two or more such networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be any suitable electronic device including hardware, software, or embedded logic components, or a combination of two or more such components, and may be capable of carrying out the functionalities implemented or supported by a client system 130. As an example and not by way of limitation, the client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, smart watch, smart glasses, augmented-reality (AR) smart glasses, virtual reality (VR) headset, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent Application No. 29/631910, filed 3 Jan. 2018, U.S. Design patent Application No. 29/631747, filed 2 Jan. 2018, U.S. Design patent Application No. 29/631913, filed 3 Jan. 2018, and U.S. Design patent Application No. 29/631914, filed 3 Jan. 2018, each of which is incorporated by reference. This disclosure contemplates any suitable client systems 130. In particular embodiments, a client system 130 may enable a network user at a client system 130 to access a network 110. The client system 130 may also enable the user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may include an assistant xbot functionality as a front-end interface for interacting with the user of the client system 130, including receiving user inputs and presenting outputs. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be also part of the assistant system 140. In particular embodiments, the assistant application 136 may be accessed via the web browser 132. In particular embodiments, the user may interact with the assistant system 140 by providing user input to the assistant application 136 via various modalities (e.g., audio, voice, text, vision, image, video, gesture, motion, activity, location, orientation). The assistant application 136 may communicate the user input to the assistant system 140 (e.g., via the assistant xbot). Based on the user input, the assistant system 140 may generate responses. The assistant system 140 may send the generated responses to the assistant application 136. The assistant application 136 may then present the responses to the user at the client system 130 via various modalities (e.g., audio, text, image, and video). As an example and not by way of limitation, the user may interact with the assistant system 140 by providing a user input (e.g., a verbal request for information regarding a current status of nearby vehicle traffic) to the assistant xbot via a microphone of the client system 130. The assistant application 136 may then communicate the user input to the assistant system 140 over network 110. The assistant system 140 may accordingly analyze the user input, generate a response based on the analysis of the user input (e.g., vehicle traffic information obtained from a third-party source), and communicate the generated response back to the assistant application 136. The assistant application 136 may then present the generated response to the user in any suitable manner (e.g., displaying a text-based push notification and/or image(s) illustrating a local map of nearby vehicle traffic on a display of the client system 130).

In particular embodiments, a client system 130 may implement wake-word detection techniques to allow users to conveniently activate the assistant system 140 using one or more wake-words associated with assistant system 140. As an example and not by way of limitation, the system audio API on client system 130 may continuously monitor user input comprising audio data (e.g., frames of voice data) received at the client system 130. In this example, a wake-word associated with the assistant system 140 may be the voice phrase "hey assistant." In this example, when the system audio API on client system 130 detects the voice phrase "hey assistant" in the monitored audio data, the assistant system 140 may be activated for subsequent interaction with the user. In alternative embodiments, similar detection techniques may be implemented to activate the assistant system 140 using particular non-audio user inputs associated with the assistant system 140. For example, the non-audio user inputs may be specific visual signals detected by a low-power sensor (e.g., camera) of client system 130. As an example and not by way of limitation, the visual signals may be a static image (e.g., barcode, QR code, universal product code (UPC)), a position of the user (e.g., the user's gaze towards client system 130), a user motion (e.g., the user pointing at an object), or any other suitable visual signal.

In particular embodiments, a client system 130 may include a rendering device 137 and, optionally, a companion device 138. The rendering device 137 may be configured to render outputs generated by the assistant system 140 to the user. The companion device 138 may be configured to perform computations associated with particular tasks (e.g., communications with the assistant system 140) locally (i.e., on-device) on the companion device 138 in particular circumstances (e.g., when the rendering device 137 is unable to perform said computations). In particular embodiments, the client system 130, the rendering device 137, and/or the companion device 138 may each be a suitable electronic device including hardware, software, or embedded logic components, or a combination of two or more such components, and may be capable of carrying out, individually or cooperatively, the functionalities implemented or supported by the client system 130 described herein. As an example and not by way of limitation, the client system 130, the rendering device 137, and/or the companion device 138 may each include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augmented-reality (AR) smart glasses, XR headset other suitable electronic device, or any suitable combination thereof. In particular embodiments, one or more of the client system 130, the rendering device 137, and the companion device 138 may operate as a smart assistant device. As an example and not by way of limitation, the rendering device 137 may comprise smart glasses and the companion device 138 may comprise a smart phone. As another example and not by way of limitation, the rendering device 137 may comprise a smart watch and the companion device 138 may comprise a smart phone. As yet another example and not by way of limitation, the rendering device 137 may comprise smart glasses and the companion device 138 may comprise a smart remote for the smart glasses. As yet another example and not by way of limitation, the rendering device 137 may comprise a XR headset and the companion device 138 may comprise a smart phone.

In particular embodiments, a user may interact with the assistant system 140 using the rendering device 137 or the companion device 138, individually or in combination. In particular embodiments, one or more of the client system 130, the rendering device 137, and the companion device 138 may implement a multi-stage wake-word detection model to enable users to conveniently activate the assistant system 140 by continuously monitoring for one or more wake-words associated with assistant system 140. At a first stage of the wake-word detection model, the rendering device 137 may receive audio user input (e.g., frames of voice data). If a wireless connection between the rendering device 137 and the companion device 138 is available, the application on the rendering device 137 may communicate the received audio user input to the companion application on the companion device 138 via the wireless connection. At a second stage of the wake-word detection model, the companion application on the companion device 138 may process the received audio user input to detect a wake-word associated with the assistant system 140. The companion application on the companion device 138 may then communicate the detected wake-word to a server associated with the assistant system 140 via wireless network 110. At a third stage of the wake-word detection model, the server associated with the assistant system 140 may perform a keyword verification on the detected wake-word to verify whether the user intended to activate and receive assistance from the assistant system 140. In alternative embodiments, any of the processing, detection, or keyword verification may be performed by the rendering device 137 and/or the companion device 138. In particular embodiments, when the assistant system 140 has been activated by the user, an application on the rendering device 137 may be configured to receive user input from the user, and a companion application on the companion device 138 may be configured to handle user inputs (e.g., user requests) received by the application on the rendering device 137. In particular embodiments, the rendering device 137 and the companion device 138 may be associated with each other (i.e., paired) via one or more wireless communication protocols (e.g., Bluetooth).

The following example workflow illustrates how a rendering device 137 and a companion device 138 may handle a user input provided by a user. In this example, an application on the rendering device 137 may receive a user input comprising a user request directed to the rendering device 137. The application on the rendering device 137 may then determine a status of a wireless connection (i.e., tethering status) between the rendering device 137 and the companion device 138. If a wireless connection between the rendering device 137 and the companion device 138 is not available, the application on the rendering device 137 may communicate the user request (optionally including additional data and/or contextual information available to the rendering device 137) to the assistant system 140 via the network 110. The assistant system 140 may then generate a response to the user request and communicate the generated response back to the rendering device 137. The rendering device 137 may then present the response to the user in any suitable manner. Alternatively, if a wireless connection between the rendering device 137 and the companion device 138 is available, the application on the rendering device 137 may communicate the user request (optionally including additional data and/or contextual information available to the rendering device 137) to the companion application on the companion device 138 via the wireless connection. The companion application on the companion device 138 may then communicate the user request (optionally including additional data and/or contextual information available to the companion device 138) to the assistant system 140 via the network 110. The assistant system 140 may then generate a response to the user request and communicate the generated response back to the companion device 138. The companion application on the companion device 138 may then communicate the generated response to the application on the rendering device 137. The rendering device 137 may then present the response to the user in any suitable manner. In the preceding example workflow, the rendering device 137 and the companion device 138 may each perform one or more computations and/or processes at each respective step of the workflow. In particular embodiments, performance of the computations and/or processes disclosed herein may be adaptively switched between the rendering device 137 and the companion device 138 based at least in part on a device state of the rendering device 137 and/or the companion device 138, a task associated with the user input, and/or one or more additional factors. As an example and not by way of limitation, one factor may be signal strength of the wireless connection between the rendering device 137 and the companion device 138. For example, if the signal strength of the wireless connection between the rendering device 137 and the companion device 138 is strong, the computations and processes may be adaptively switched to be substantially performed by the companion device 138 in order to, for example, benefit from the greater processing power of the CPU of the companion device 138. Alternatively, if the signal strength of the wireless connection between the rendering device 137 and the companion device 138 is weak, the computations and processes may be adaptively switched to be substantially performed by the rendering device 137 in a standalone manner. In particular embodiments, if the client system 130 does not comprise a companion device 138, the aforementioned computations and processes may be performed solely by the rendering device 137 in a standalone manner.

In particular embodiments, an assistant system 140 may assist users with various assistant-related tasks. The assistant system 140 may interact with the social-networking system 160 and/or the third-party system 170 when executing these assistant-related tasks.

In particular embodiments, the social-networking system 160 may be a network-addressable computing system that can host an online social network. The social-networking system 160 may generate, store, receive, and send social-networking data, such as, for example, user profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132 or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. As an example and not by way of limitation, each server 162 may be a web server, a news server, a mail server, a message server, an advertising server, a file server, an application server, an exchange server, a database server, a proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects. In particular embodiments, a third-party content provider may use one or more third-party agents to provide content objects and/or services. A third-party agent may be an implementation that is hosted and executing on the third-party system 170.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a user input comprising a user request received from a client system 130. Authorization servers may be used to enforce one or more privacy settings of the users of the social-networking system 160. A privacy setting of a user may determine how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
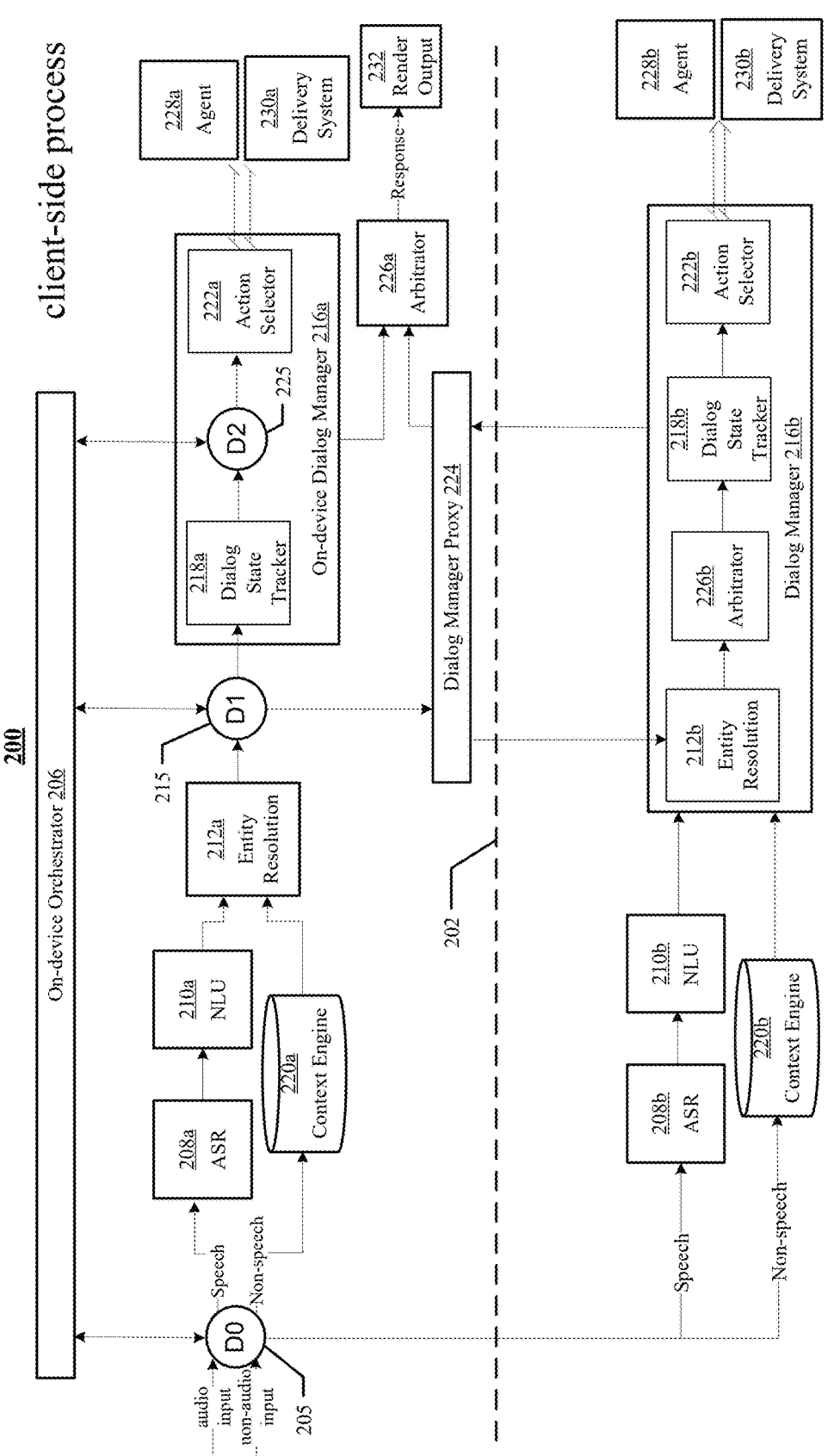
FIG. 2 illustrates an example architecture of the assistant system.

FIG. 2 illustrates an example architecture 200 of the assistant system 140. In particular embodiments, the assistant system 140 may assist a user to obtain information or services. The assistant system 140 may enable the user to interact with the assistant system 140 via user inputs of various modalities (e.g., audio, voice, text, vision, image, video, gesture, motion, activity, location, orientation) in stateful and multi-turn conversations to receive assistance from the assistant system 140. As an example and not by way of limitation, a user input may comprise an audio input based on the user's voice (e.g., a verbal command), which may be processed by a system audio API (application programming interface) on client system 130. The system audio API may perform techniques including echo cancellation, noise removal, beam forming, self-user voice activation, speaker identification, voice activity detection (VAD), and/or any other suitable acoustic technique in order to generate audio data that is readily processable by the assistant system 140. In particular embodiments, the assistant system 140 may support mono-modal inputs (e.g., only voice inputs), multi-modal inputs (e.g., voice inputs and text inputs), hybrid/multi-modal inputs, or any combination thereof. In particular embodiments, a user input may be a user-generated input that is sent to the assistant system 140 in a single turn. User inputs provided by a user may be associated with particular assistant-related tasks, and may include, for example, user requests (e.g., verbal requests for information or performance of an action), user interactions with the assistant application 136 associated with the assistant system 140 (e.g., selection of UI elements via touch or gesture), or any other type of suitable user input that may be detected and understood by the assistant system 140 (e.g., user movements detected by the client device 130 of the user).

In particular embodiments, the assistant system 140 may create and store a user profile comprising both personal and contextual information associated with the user. In particular embodiments, the assistant system 140 may analyze the user input using natural-language understanding (NLU) techniques. The analysis may be based at least in part on the user profile of the user for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation (NLG). Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute, without a user input, pre-authorized tasks that are relevant to user interests and preferences based on the user profile, at a time relevant for the user. In particular embodiments, the assistant system 140 may check privacy settings to ensure that accessing a user's profile or other user information and executing different tasks are permitted subject to the user's privacy settings. More information on assisting users subject to privacy settings may be found in More information on assisting users subject to privacy settings may be found in U.S. patent application Ser. No. 16/182,542, filed 6 Nov. 2018, which is incorporated by reference.

In particular embodiments, the assistant system 140 may assist a user via an architecture built upon client-side processes and server-side processes which may operate in various operational modes. In FIG. 2, the client-side process is illustrated above the dashed line 202 whereas the server-side process is illustrated below the dashed line 202. A first operational mode (i.e., on-device mode) may be a workflow in which the assistant system 140 processes a user input and provides assistance to the user by primarily or exclusively performing client-side processes locally on the client system 130. For example, if the client system 130 is not connected to a network 110 (i.e., when client system 130 is offline), the assistant system 140 may handle a user input in the first operational mode utilizing only client-side processes. A second operational mode (i.e., cloud mode) may be a workflow in which the assistant system 140 processes a user input and provides assistance to the user by primarily or exclusively performing server-side processes on one or more remote servers (e.g., a server associated with assistant system 140). As illustrated in FIG. 2, a third operational mode (i.e., blended mode) may be a parallel workflow in which the assistant system 140 processes a user input and provides assistance to the user by performing client-side processes locally on the client system 130 in conjunction with server-side processes on one or more remote servers (e.g., a server associated with assistant system 140). For example, the client system 130 and the server associated with assistant system 140 may both perform automatic speech recognition (ASR) and natural-language understanding (NLU) processes, but the client system 130 may delegate dialog, agent, and natural-language generation (NLG) processes to be performed by the server associated with assistant system 140.

In particular embodiments, selection of an operational mode may be based at least in part on a device state, a task associated with a user input, and/or one or more additional factors. As an example and not by way of limitation, as described above, one factor may be a network connectivity status for client system 130. For example, if the client system 130 is not connected to a network 110 (i.e., when client system 130 is offline), the assistant system 140 may handle a user input in the first operational mode (i.e., on-device mode). As another example and not by way of limitation, another factor may be based on a measure of available battery power (i.e., battery status) for the client system 130. For example, if there is a need for client system 130 to conserve battery power (e.g., when client system 130 has minimal available battery power or the user has indicated a desire to conserve the battery power of the client system 130), the assistant system 140 may handle a user input in the second operational mode (i.e., cloud mode) or the third operational mode (i.e., blended mode) in order to perform fewer power-intensive operations on the client system 130. As yet another example and not by way of limitation, another factor may be one or more privacy constraints (e.g., specified privacy settings, applicable privacy policies). For example, if one or more privacy constraints limits or precludes particular data from being transmitted to a remote server (e.g., a server associated with the assistant system 140), the assistant system 140 may handle a user input in the first operational mode (i.e., on-device mode) in order to protect user privacy. As yet another example and not by way of limitation, another factor may be desynchronized context data between the client system 130 and a remote server (e.g., the server associated with assistant system 140). For example, the client system 130 and the server associated with assistant system 140 may be determined to have inconsistent, missing, and/or unreconciled context data, the assistant system 140 may handle a user input in the third operational mode (i.e., blended mode) to reduce the likelihood of an inadequate analysis associated with the user input. As yet another example and not by way of limitation, another factor may be a measure of latency for the connection between client system 130 and a remote server (e.g., the server associated with assistant system 140). For example, if a task associated with a user input may significantly benefit from and/or require prompt or immediate execution (e.g., photo capturing tasks), the assistant system 140 may handle the user input in the first operational mode (i.e., on-device mode) to ensure the task is performed in a timely manner. As yet another example and not by way of limitation, another factor may be, for a feature relevant to a task associated with a user input, whether the feature is only supported by a remote server (e.g., the server associated with assistant system 140). For example, if the relevant feature requires advanced technical functionality (e.g., high-powered processing capabilities, rapid update cycles) that is only supported by the server associated with assistant system 140 and is not supported by client system 130 at the time of the user input, the assistant system 140 may handle the user input in the second operational mode (i.e., cloud mode) or the third operational mode (i.e., blended mode) in order to benefit from the relevant feature.

In particular embodiments, an on-device orchestrator 206 on the client system 130 may coordinate receiving a user input and may determine, at one or more decision points in an example workflow, which of the operational modes described above should be used to process or continue processing the user input. As discussed above, selection of an operational mode may be based at least in part on a device state, a task associated with a user input, and/or one or more additional factors. As an example and not by way of limitation, with reference to the workflow architecture illustrated in FIG. 2, after a user input is received from a user, the on-device orchestrator 206 may determine, at decision point (DO) 205, whether to begin processing the user input in the first operational mode (i.e., on-device mode), the second operational mode (i.e., cloud mode), or the third operational mode (i.e., blended mode). For example, at decision point (DO) 205, the on-device orchestrator 206 may select the first operational mode (i.e., on-device mode) if the client system 130 is not connected to network 110 (i.e., when client system 130 is offline), if one or more privacy constraints expressly require on-device processing (e.g., adding or removing another person to a private call between users), or if the user input is associated with a task which does not require or benefit from server-side processing (e.g., setting an alarm or calling another user). As another example, at decision point (DO) 205, the on-device orchestrator 206 may select the second operational mode (i.e., cloud mode) or the third operational mode (i.e., blended mode) if the client system 130 has a need to conserve battery power (e.g., when client system 130 has minimal available battery power or the user has indicated a desire to conserve the battery power of the client system 130) or has a need to limit additional utilization of computing resources (e.g., when other processes operating on client device 130 require high CPU utilization (e.g., SMS messaging applications)).

In particular embodiments, if the on-device orchestrator 206 determines at decision point (DO) 205 that the user input should be processed using the first operational mode (i.e., on-device mode) or the third operational mode (i.e., blended mode), the client-side process may continue as illustrated in FIG. 2. As an example and not by way of limitation, if the user input comprises speech data, the speech data may be received at a local automatic speech recognition (ASR) module 208a on the client system 130. The ASR module 208a may allow a user to dictate and have speech transcribed as written text, have a document synthesized as an audio stream, or issue commands that are recognized as such by the system.

In particular embodiments, the output of the ASR module 208a may be sent to a local natural-language understanding (NLU) module 210a. The NLU module 210a may perform named entity resolution (NER), or named entity resolution may be performed by the entity resolution module 212a, as described below. In particular embodiments, one or more of an intent, a slot, or a domain may be an output of the NLU module 210a.

In particular embodiments, the user input may comprise non-speech data, which may be received at a local context engine 220a. As an example and not by way of limitation, the non-speech data may comprise locations, visuals, touch, gestures, world updates, social updates, contextual information, information related to people, activity data, and/or any other suitable type of non-speech data. The non-speech data may further comprise sensory data received by client system 130 sensors (e.g., microphone, camera), which may be accessed subject to privacy constraints and further analyzed by computer vision technologies. In particular embodiments, the computer vision technologies may comprise object detection, scene recognition, hand tracking, eye tracking, and/or any other suitable computer vision technologies. In particular embodiments, the non-speech data may be subject to geometric constructions, which may comprise constructing objects surrounding a user using any suitable type of data collected by a client system 130. As an example and not by way of limitation, a user may be wearing AR glasses, and geometric constructions may be utilized to determine spatial locations of surfaces and items (e.g., a floor, a wall, a user's hands). In particular embodiments, the non-speech data may be inertial data captured by AR glasses or a VR headset or XR headset, and which may be data associated with linear and angular motions (e.g., measurements associated with a user's body movements). In particular embodiments, the context engine 220a may determine various types of events and context based on the non-speech data.

In particular embodiments, the outputs of the NLU module 210a and/or the context engine 220a may be sent to an entity resolution module 212a. The entity resolution module 212a may resolve entities associated with one or more slots output by NLU module 210a. In particular embodiments, each resolved entity may be associated with one or more entity identifiers. As an example and not by way of limitation, an identifier may comprise a unique user identifier (ID) corresponding to a particular user (e.g., a unique username or user ID number for the social-networking system 160). In particular embodiments, each resolved entity may also be associated with a confidence score. More information on resolving entities may be found in U.S. Pat. No. 10,803,050, filed 27 Jul. 2018, and U.S. patent application Ser. No. 16/048,072, filed 27 Jul. 2018, each of which is incorporated by reference.

In particular embodiments, at decision point (DO) 205, the on-device orchestrator 206 may determine that a user input should be handled in the second operational mode (i.e., cloud mode) or the third operational mode (i.e., blended mode). In these operational modes, the user input may be handled by certain server-side modules in a similar manner as the client-side process described above.

In particular embodiments, if the user input comprises speech data, the speech data of the user input may be received at a remote automatic speech recognition (ASR) module 208b on a remote server (e.g., the server associated with assistant system 140). The ASR module 208b may allow a user to dictate and have speech transcribed as written text, have a document synthesized as an audio stream, or issue commands that are recognized as such by the system.

In particular embodiments, the output of the ASR module 208b may be sent to a remote natural-language understanding (NLU) module 210b. In particular embodiments, the NLU module 210b may perform named entity resolution (NER) or named entity resolution may be performed by entity resolution module 212b of dialog manager module 216b as described below. In particular embodiments, one or more of an intent, a slot, or a domain may be an output of the NLU module 210b.

In particular embodiments, the user input may comprise non-speech data, which may be received at a remote context engine 220b. In particular embodiments, the remote context engine 220b may determine various types of events and context based on the non-speech data. In particular embodiments, the output of the NLU module 210b and/or the context engine 220b may be sent to a remote dialog manager 216b.

In particular embodiments, as discussed above, an on-device orchestrator 206 on the client system 130 may coordinate receiving a user input and may determine, at one or more decision points in an example workflow, which of the operational modes described above should be used to process or continue processing the user input. As further discussed above, selection of an operational mode may be based at least in part on a device state, a task associated with a user input, and/or one or more additional factors. As an example and not by way of limitation, with continued reference to the workflow architecture illustrated in FIG. 2, after the entity resolution module 212a generates an output or a null output, the on-device orchestrator 206 may determine, at decision point (D1) 215, whether to continue processing the user input in the first operational mode (i.e., on-device mode), the second operational mode (i.e., cloud mode), or the third operational mode (i.e., blended mode). For example, at decision point (D1) 215, the on-device orchestrator 206 may select the first operational mode (i.e., on-device mode) if an identified intent is associated with a latency sensitive processing task (e.g., taking a photo, pausing a stopwatch). As another example and not by way of limitation, if a messaging task is not supported by on-device processing on the client system 130, the on-device orchestrator 206 may select the third operational mode (i.e., blended mode) to process the user input associated with a messaging request. As yet another example, at decision point (D1) 215, the on-device orchestrator 206 may select the second operational mode (i.e., cloud mode) or the third operational mode (i.e., blended mode) if the task being processed requires access to a social graph, a knowledge graph, or a concept graph not stored on the client system 130. Alternatively, the on-device orchestrator 206 may instead select the first operational mode (i.e., on-device mode) if a sufficient version of an informational graph including requisite information for the task exists on the client system 130 (e.g., a smaller and/or bootstrapped version of a knowledge graph).

In particular embodiments, if the on-device orchestrator 206 determines at decision point (D1) 215 that processing should continue using the first operational mode (i.e., on-device mode) or the third operational mode (i.e., blended mode), the client-side process may continue as illustrated in FIG. 2. As an example and not by way of limitation, the output from the entity resolution module 212a may be sent to an on-device dialog manager 216a. In particular embodiments, the on-device dialog manager 216a may comprise a dialog state tracker 218a and an action selector 222a. The on-device dialog manager 216a may have complex dialog logic and product-related business logic to manage the dialog state and flow of the conversation between the user and the assistant system 140. The on-device dialog manager 216a may include full functionality for end-to-end integration and multi-turn support (e.g., confirmation, disambiguation). The on-device dialog manager 216a may also be lightweight with respect to computing limitations and resources including memory, computation (CPU), and binary size constraints. The on-device dialog manager 216a may also be scalable to improve developer experience. In particular embodiments, the on-device dialog manager 216a may benefit the assistant system 140, for example, by providing offline support to alleviate network connectivity issues (e.g., unstable or unavailable network connections), by using client-side processes to prevent privacy-sensitive information from being transmitted off of client system 130, and by providing a stable user experience in high-latency sensitive scenarios.

In particular embodiments, the on-device dialog manager 216a may further conduct false trigger mitigation. Implementation of false trigger mitigation may detect and prevent false triggers from user inputs which would otherwise invoke the assistant system 140 (e.g., an unintended wakeword) and may further prevent the assistant system 140 from generating data records based on the false trigger that may be inaccurate and/or subject to privacy constraints. As an example and not by way of limitation, if a user is in a voice call, the user's conversation during the voice call may be considered private, and the false trigger mitigation may limit detection of wake-words to audio user inputs received locally by the user's client system 130. In particular embodiments, the on-device dialog manager 216a may implement false trigger mitigation based on a nonsense detector. If the nonsense detector determines with a high confidence that a received wake-word is not logically and/or contextually sensible at the point in time at which it was received from the user, the on-device dialog manager 216a may determine that the user did not intend to invoke the assistant system 140.

In particular embodiments, due to a limited computing power of the client system 130, the on-device dialog manager 216a may conduct on-device learning based on learning algorithms particularly tailored for client system 130. As an example and not by way of limitation, federated learning techniques may be implemented by the on-device dialog manager 216a. Federated learning is a specific category of distributed machine learning techniques which may train machine-learning models using decentralized data stored on end devices (e.g., mobile phones). In particular embodiments, the on-device dialog manager 216a may use federated user representation learning model to extend existing neural-network personalization techniques to implementation of federated learning by the on-device dialog manager 216a. Federated user representation learning may personalize federated learning models by learning task-specific user representations (i.e., embeddings) and/or by personalizing model weights. Federated user representation learning is a simple, scalable, privacy-preserving, and resource-efficient. Federated user representation learning may divide model parameters into federated and private parameters. Private parameters, such as private user embeddings, may be trained locally on a client system 130 instead of being transferred to or averaged by a remote server (e.g., the server associated with assistant system 140). Federated parameters, by contrast, may be trained remotely on the server. In particular embodiments, the on-device dialog manager 216a may use an active federated learning model, which may transmit a global model trained on the remote server to client systems 130 and calculate gradients locally on the client systems 130. Active federated learning may enable the on-device dialog manager 216a to minimize the transmission costs associated with downloading models and uploading gradients. For active federated learning, in each round, client systems 130 may be selected in a semi-random manner based at least in part on a probability conditioned on the current model and the data on the client systems 130 in order to optimize efficiency for training the federated learning model.

In particular embodiments, the dialog state tracker 218a may track state changes over time as a user interacts with the world and the assistant system 140 interacts with the user. As an example and not by way of limitation, the dialog state tracker 218a may track, for example, what the user is talking about, whom the user is with, where the user is, what tasks are currently in progress, and where the user's gaze is at subject to applicable privacy policies.

In particular embodiments, at decision point (D1) 215, the on-device orchestrator 206 may determine to forward the user input to the server for either the second operational mode (i.e., cloud mode) or the third operational mode (i.e., blended mode). As an example and not by way of limitation, if particular functionalities or processes (e.g., messaging) are not supported by on the client system 130, the on-device orchestrator 206 may determine at decision point (D1) 215 to use the third operational mode (i.e., blended mode). In particular embodiments, the on-device orchestrator 206 may cause the outputs from the NLU module 210*a*, the context engine 220*a*, and the entity resolution module 212*a*, via a dialog manager proxy 224, to be forwarded to an entity resolution module 212*b* of the remote dialog manager 216*b* to continue the processing. The dialog manager proxy 224 may be a communication channel for information/events exchange between the client system 130 and the server. In particular embodiments, the dialog manager 216*b* may additionally comprise a remote arbitrator 226*b*, a remote dialog state tracker 218*b*, and a remote action selector 222*b*. In particular embodiments, the assistant system 140 may have started processing a user input with the second operational mode (i.e., cloud mode) at decision point (DO) 205 and the on-device orchestrator 206 may determine to continue processing the user input based on the second operational mode (i.e., cloud mode) at decision point (D1) 215. Accordingly, the output from the NLU module 210*b* and the context engine 220*b* may be received at the remote entity resolution module 212*b*. The remote entity resolution module 212*b* may have similar functionality as the local entity resolution module 212*a*, which may comprise resolving entities associated with the slots. In particular embodiments, the entity resolution module 212*b* may access one or more of the social graph, the knowledge graph, or the concept graph when resolving the entities. The output from the entity resolution module 212*b* may be received at the arbitrator 226*b*.

In particular embodiments, the remote arbitrator 226*b* may be responsible for choosing between client-side and server-side upstream results (e.g., results from the NLU module 210*a/b*, results from the entity resolution module 212*a/b*, and results from the context engine 220*a/b*). The arbitrator 226*b* may send the selected upstream results to the remote dialog state tracker 218*b*. In particular embodiments, similarly to the local dialog state tracker 218*a*, the remote dialog state tracker 218*b* may convert the upstream results into candidate tasks using task specifications and resolve arguments with entity resolution.

In particular embodiments, at decision point (D2) 225, the on-device orchestrator 206 may determine whether to continue processing the user input based on the first operational mode (i.e., on-device mode) or forward the user input to the server for the third operational mode (i.e., blended mode). The decision may depend on, for example, whether the client-side process is able to resolve the task and slots successfully, whether there is a valid task policy with a specific feature support, and/or the context differences between the client-side process and the server-side process. In particular embodiments, decisions made at decision point (D2) 225 may be for multi-turn scenarios. In particular embodiments, there may be at least two possible scenarios. In a first scenario, the assistant system 140 may have started processing a user input in the first operational mode (i.e., on-device mode) using client-side dialog state. If at some point the assistant system 140 decides to switch to having the remote server process the user input, the assistant system 140 may create a programmatic/predefined task with the current task state and forward it to the remote server. For subsequent turns, the assistant system 140 may continue processing in the third operational mode (i.e., blended mode) using the server-side dialog state. In another scenario, the assistant system 140 may have started processing the user input in either the second operational mode (i.e., cloud mode) or the third operational mode (i.e., blended mode) and may substantially rely on server-side dialog state for all subsequent turns. If the on-device orchestrator 206 determines to continue processing the user input based on the first operational mode (i.e., on-device mode), the output from the dialog state tracker 218*a* may be received at the action selector 222*a*.

In particular embodiments, at decision point (D2) 225, the on-device orchestrator 206 may determine to forward the user input to the remote server and continue processing the user input in either the second operational mode (i.e., cloud mode) or the third operational mode (i.e., blended mode). The assistant system 140 may create a programmatic/predefined task with the current task state and forward it to the server, which may be received at the action selector 222*b*. In particular embodiments, the assistant system 140 may have started processing the user input in the second operational mode (i.e., cloud mode), and the on-device orchestrator 206 may determine to continue processing the user input in the second operational mode (i.e., cloud mode) at decision point (D2) 225. Accordingly, the output from the dialog state tracker 218*b* may be received at the action selector 222*b*.

In particular embodiments, the action selector 222*a/b* may perform interaction management. The action selector 222*a/b* may determine and trigger a set of general executable actions. The actions may be executed either on the client system 130 or at the remote server. As an example and not by way of limitation, these actions may include providing information or suggestions to the user. In particular embodiments, the actions may interact with agents 228*a/b*, users, and/or the assistant system 140 itself. These actions may comprise actions including one or more of a slot request, a confirmation, a disambiguation, or an agent execution. The actions may be independent of the underlying implementation of the action selector 222*a/b*. For more complicated scenarios such as, for example, multi-turn tasks or tasks with complex business logic, the local action selector 222*a* may call one or more local agents 228*a*, and the remote action selector 222*b* may call one or more remote agents 228*b* to execute the actions. Agents 228*a/b* may be invoked via task ID, and any actions may be routed to the correct agent 228*a/b* using that task ID. In particular embodiments, an agent 228*a/b* may be configured to serve as a broker across a plurality of content providers for one domain. A content provider may be an entity responsible for carrying out an action associated with an intent or completing a task associated with the intent. In particular embodiments, agents 228*a/b* may provide several functionalities for the assistant system 140 including, for example, native template generation, task specific business logic, and querying external APIs. When executing actions for a task, agents 228*a/b* may use context from the dialog state tracker 218*a/b*, and may also update the dialog state tracker 218*a/b*. In particular embodiments, agents 228*a/b* may also generate partial payloads from a dialog act.

In particular embodiments, the local agents 228*a* may have different implementations to be compiled/registered for different platforms (e.g., smart glasses versus a VR headset or a XR headset). In particular embodiments, multiple device-specific implementations (e.g., real-time calls for a client system 130 or a messaging application on the client system 130) may be handled internally by a single agent 228*a*. Alternatively, device-specific implementations may be handled by multiple agents 228*a* associated with multiple domains. As an example and not by way of limitation, calling an agent 228a on smart glasses may be implemented in a different manner than calling an agent 228a on a smart phone. Different platforms may also utilize varying numbers of agents 228a. The agents 228a may also be cross-platform (i.e., different operating systems on the client system 130). In addition, the agents 228a may have minimized startup time or binary size impact. Local agents 228a may be suitable for particular use cases. As an example and not by way of limitation, one use case may be emergency calling on the client system 130. As another example and not by way of limitation, another use case may be responding to a user input without network connectivity. As yet another example and not by way of limitation, another use case may be that particular domains/tasks may be privacy sensitive and may prohibit user inputs being sent to the remote server.

In particular embodiments, the local action selector 222a may call a local delivery system 230a for executing the actions, and the remote action selector 222b may call a remote delivery system 230b for executing the actions. The delivery system 230a/b may deliver a predefined event upon receiving triggering signals from the dialog state tracker 218a/b by executing corresponding actions. The delivery system 230a/b may ensure that events get delivered to a host with a living connection. As an example and not by way of limitation, the delivery system 230a/b may broadcast to all online devices that belong to one user. As another example and not by way of limitation, the delivery system 230a/b may deliver events to target-specific devices. The delivery system 230a/b may further render a payload using up-to-date device context.

In particular embodiments, the on-device dialog manager 216a may additionally comprise a separate local action execution module, and the remote dialog manager 216b may additionally comprise a separate remote action execution module. The local execution module and the remote action execution module may have similar functionality. In particular embodiments, the action execution module may call the agents 228a/b to execute tasks. The action execution module may additionally perform a set of general executable actions determined by the action selector 222a/b. The set of executable actions may interact with agents 228a/b, users, and the assistant system 140 itself via the delivery system 230a/b.

In particular embodiments, if the user input is handled using the first operational mode (i.e., on-device mode), results from the agents 228a and/or the delivery system 230a may be returned to the on-device dialog manager 216a. The on-device dialog manager 216a may then instruct a local arbitrator 226a to generate a final response based on these results. The arbitrator 226a may aggregate the results and evaluate them. As an example and not by way of limitation, the arbitrator 226a may rank and select a best result for responding to the user input. If the user request is handled in the second operational mode (i.e., cloud mode), the results from the agents 228b and/or the delivery system 230b may be returned to the remote dialog manager 216b. The remote dialog manager 216b may instruct, via the dialog manager proxy 224, the arbitrator 226a to generate the final response based on these results. Similarly, the arbitrator 226a may analyze the results and select the best result to provide to the user. If the user input is handled based on the third operational mode (i.e., blended mode), the client-side results and server-side results (e.g., from agents 228a/b and/or delivery system 230a/b) may both be provided to the arbitrator 226a by the on-device dialog manager 216a and remote dialog manager 216b, respectively. The arbitrator 226 may then choose between the client-side and server-side side results to determine the final result to be presented to the user. In particular embodiments, the logic to decide between these results may depend on the specific use-case.

In particular embodiments, the local arbitrator 226a may generate a response based on the final result and send it to a render output module 232. The render output module 232 may determine how to render the output in a way that is suitable for the client system 130. As an example and not by way of limitation, for a XR headset or VR headset or AR smart glasses, the render output module 232 may determine to render the output using a visual-based modality (e.g., an image or a video clip) that may be displayed via the XR headset or VR headset or AR smart glasses. As another example, the response may be rendered as audio signals that may be played by the user via a XR headset or VR headset or AR smart glasses. As yet another example, the response may be rendered as augmented-reality data for enhancing user experience.

In particular embodiments, in addition to determining an operational mode to process the user input, the on-device orchestrator 206 may also determine whether to process the user input on the rendering device 137, process the user input on the companion device 138, or process the user request on the remote server. The rendering device 137 and/or the companion device 138 may each use the assistant stack in a similar manner as disclosed above to process the user input. As an example and not by, the on-device orchestrator 206 may determine that part of the processing should be done on the rendering device 137, part of the processing should be done on the companion device 138, and the remaining processing should be done on the remote server.

In particular embodiments, the assistant system 140 may have a variety of capabilities including audio cognition, visual cognition, signals intelligence, reasoning, and memories. In particular embodiments, the capability of audio cognition may enable the assistant system 140 to, for example, understand a user's input associated with various domains in different languages, understand and summarize a conversation, perform on-device audio cognition for complex commands, identify a user by voice, extract topics from a conversation and auto-tag sections of the conversation, enable audio interaction without a wake-word, filter and amplify user voice from ambient noise and conversations, and/or understand which client system 130 a user is talking to if multiple client systems 130 are in vicinity.

In particular embodiments, the capability of visual cognition may enable the assistant system 140 to, for example, recognize interesting objects in the world through a combination of existing machine-learning models and one-shot learning, recognize an interesting moment and auto-capture it, achieve semantic understanding over multiple visual frames across different episodes of time, provide platform support for additional capabilities in places or objects recognition, recognize a full set of settings and micro-locations including personalized locations, recognize complex activities, recognize complex gestures to control a client system 130, handle images/videos from egocentric cameras (e.g., with motion, capture angles, resolution), accomplish similar levels of accuracy and speed regarding images with lower resolution, conduct one-shot registration and recognition of places and objects, and/or perform visual recognition on a client system 130.

In particular embodiments, the assistant system 140 may leverage computer vision techniques to achieve visual cognition. Besides computer vision techniques, the assistant system 140 may explore options that may supplement these techniques to scale up the recognition of objects. In particular embodiments, the assistant system 140 may use supplemental signals such as, for example, optical character recognition (OCR) of an object's labels, GPS signals for places recognition, and/or signals from a user's client system 130 to identify the user. In particular embodiments, the assistant system 140 may perform general scene recognition (e.g., home, work, public spaces) to set a context for the user and reduce the computer-vision search space to identify likely objects or people. In particular embodiments, the assistant system 140 may guide users to train the assistant system 140. For example, crowdsourcing may be used to get users to tag objects and help the assistant system 140 recognize more objects over time. As another example, users may register their personal objects as part of an initial setup when using the assistant system 140. The assistant system 140 may further allow users to provide positive/negative signals for objects they interact with to train and improve personalized models for them.

In particular embodiments, the capability of signals intelligence may enable the assistant system 140 to, for example, determine user location, understand date/time, determine family locations, understand users' calendars and future desired locations, integrate richer sound understanding to identify setting/context through sound alone, and/or build signals intelligence models at runtime which may be personalized to a user's individual routines.

In particular embodiments, the capability of reasoning may enable the assistant system 140 to, for example, pick up previous conversation threads at any point in the future, synthesize all signals to understand micro and personalized context, learn interaction patterns and preferences from users' historical behavior and accurately suggest interactions that they may value, generate highly predictive proactive suggestions based on micro-context understanding, understand what content a user may want to see at what time of a day, and/or understand the changes in a scene and how that may impact the user's desired content.

In particular embodiments, the capabilities of memories may enable the assistant system 140 to, for example, remember which social connections a user previously called or interacted with, write into memory and query memory at will (i.e., open dictation and auto tags), extract richer preferences based on prior interactions and long-term learning, remember a user's life history, extract rich information from egocentric streams of data and auto catalog, and/or write to memory in structured form to form rich short, episodic and long-term memories.

Figure 3:
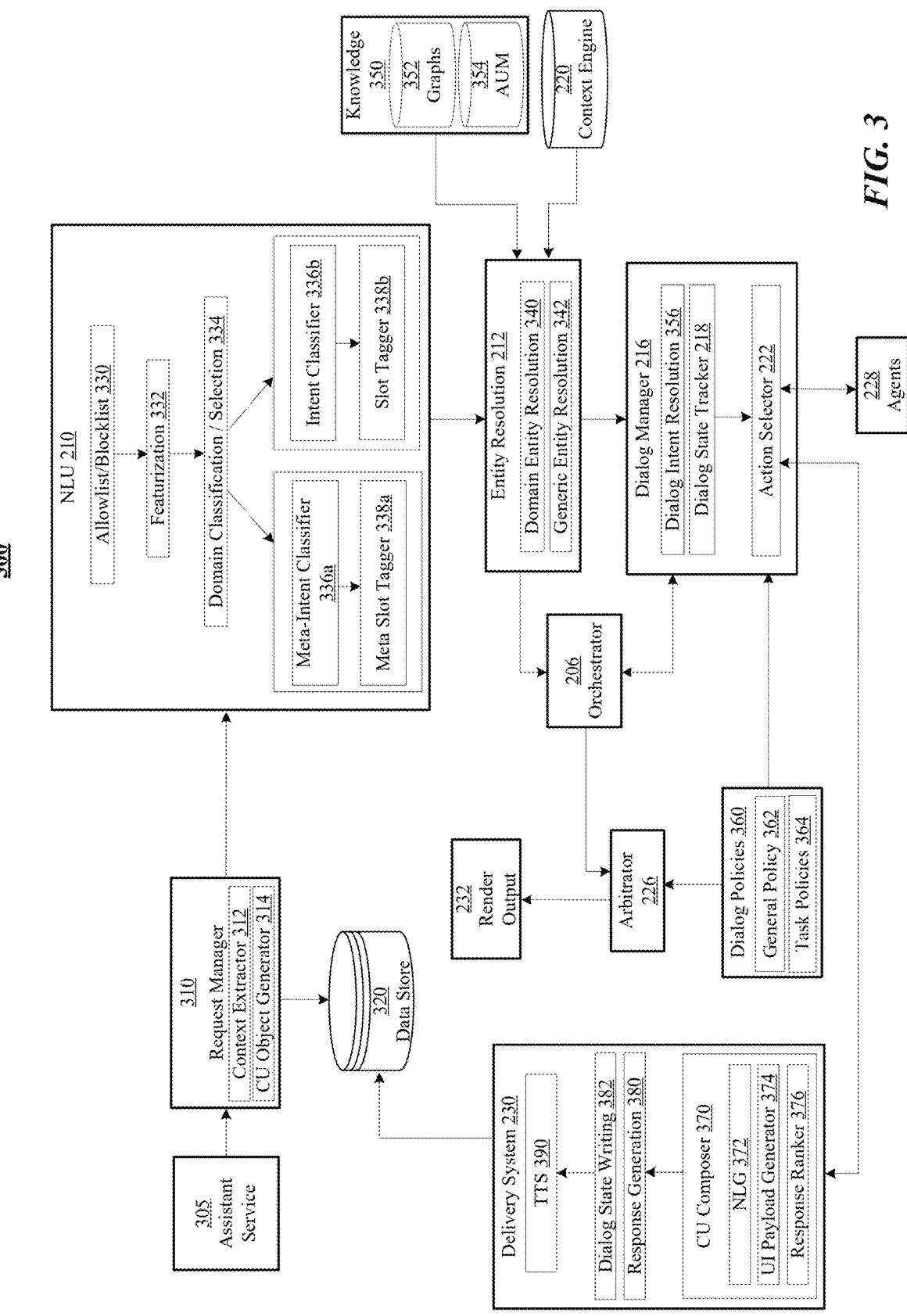
FIG. 3 illustrates an example flow diagram of the assistant system.

FIG. 3 illustrates an example flow diagram 300 of the assistant system 140. In particular embodiments, an assistant service module 305 may access a request manager 310 upon receiving a user input. In particular embodiments, the request manager 310 may comprise a context extractor 312 and a conversational understanding object generator (CU object generator) 314. The context extractor 312 may extract contextual information associated with the user input. The context extractor 312 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 314 may generate particular CU objects relevant to the user input. The CU objects may comprise dialog-session data and features associated with the user input, which may be shared with all the modules of the assistant system 140. In particular embodiments, the request manager 310 may store the contextual information and the generated CU objects in a data store 320 which is a particular data store implemented in the assistant system 140.

In particular embodiments, the request manger 310 may send the generated CU objects to the NLU module 210. The NLU module 210 may perform a plurality of steps to process the CU objects. The NLU module 210 may first run the CU objects through an allowlist/blocklist 330. In particular embodiments, the allowlist/blocklist 330 may comprise interpretation data matching the user input. The NLU module 210 may then perform a featurization 332 of the CU objects. The NLU module 210 may then perform domain classification/selection 334 on user input based on the features resulted from the featurization 332 to classify the user input into predefined domains. In particular embodiments, a domain may denote a social context of interaction (e.g., education), or a namespace for a set of intents (e.g., music). The domain classification/selection results may be further processed based on two related procedures. In one procedure, the NLU module 210 may process the domain classification/selection results using a meta-intent classifier 336a. The meta-intent classifier 336a may determine categories that describe the user's intent. An intent may be an element in a pre-defined taxonomy of semantic intentions, which may indicate a purpose of a user interaction with the assistant system 140. The NLU module 210a may classify a user input into a member of the pre-defined taxonomy. For example, the user input may be "Play Beethoven's 5th," and the NLU module 210a may classify the input as having the intent [IN:play_music]. In particular embodiments, intents that are common to multiple domains may be processed by the meta-intent classifier 336a. As an example and not by way of limitation, the meta-intent classifier 336a may be based on a machine-learning model that may take the domain classification/selection results as input and calculate a probability of the input being associated with a particular predefined meta-intent. The NLU module 210 may then use a meta slot tagger 338a to annotate one or more meta slots for the classification result from the meta-intent classifier 336a. A slot may be a named sub-string corresponding to a character string within the user input representing a basic semantic entity. For example, a slot for "pizza" may be [SL:dish]. In particular embodiments, a set of valid or expected named slots may be conditioned on the classified intent. As an example and not by way of limitation, for the intent [IN:play_music], a valid slot may be [SL:song_name]. In particular embodiments, the meta slot tagger 338a may tag generic slots such as references to items (e.g., the first), the type of slot, the value of the slot, etc. In particular embodiments, the NLU module 210 may process the domain classification/selection results using an intent classifier 336b. The intent classifier 336b may determine the user's intent associated with the user input. In particular embodiments, there may be one intent classifier 336b for each domain to determine the most possible intents in a given domain. As an example and not by way of limitation, the intent classifier 336b may be based on a machine-learning model that may take the domain classification/selection results as input and calculate a probability of the input being associated with a particular predefined intent. The NLU module 210 may then use a slot tagger 338b to annotate one or more slots associated with the user input. In particular embodiments, the slot tagger 338*b* may annotate the one or more slots for the n-grams of the user input. As an example and not by way of limitation, a user input may comprise "change 500 dollars in my account to Japanese yen." The intent classifier 336*b* may take the user input as input and formulate it into a vector. The intent classifier 336*b* may then calculate probabilities of the user input being associated with different predefined intents based on a vector comparison between the vector representing the user input and the vectors representing different predefined intents. In a similar manner, the slot tagger 338*b* may take the user input as input and formulate each word into a vector. The slot tagger 338*b* may then calculate probabilities of each word being associated with different predefined slots based on a vector comparison between the vector representing the word and the vectors representing different predefined slots. The intent of the user may be classified as "changing money". The slots of the user input may comprise "500", "dollars", "account", and "Japanese yen". The meta-intent of the user may be classified as "financial service". The meta slot may comprise "finance".

In particular embodiments, the natural-language understanding (NLU) module 210 may additionally extract information from one or more of a social graph, a knowledge graph, or a concept graph, and may retrieve a user's profile stored locally on the client system 130. The NLU module 210 may additionally consider contextual information when analyzing the user input. The NLU module 210 may further process information from these different sources by identifying and aggregating information, annotating n-grams of the user input, ranking the n-grams with confidence scores based on the aggregated information, and formulating the ranked n-grams into features that may be used by the NLU module 210 for understanding the user input. In particular embodiments, the NLU module 210 may identify one or more of a domain, an intent, or a slot from the user input in a personalized and context-aware manner. As an example and not by way of limitation, a user input may comprise "show me how to get to the coffee shop." The NLU module 210 may identify a particular coffee shop that the user wants to go to based on the user's personal information and the associated contextual information. In particular embodiments, the NLU module 210 may comprise a lexicon of a particular language, a parser, and grammar rules to partition sentences into an internal representation. The NLU module 210 may also comprise one or more programs that perform naive semantics or stochastic semantic analysis, and may further use pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding (NLU) may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the output of the NLU module 210 may be sent to the entity resolution module 212 to resolve relevant entities. Entities may include, for example, unique users or concepts, each of which may have a unique identifier (ID). The entities may include one or more of a real-world entity (from general knowledge base), a user entity (from user memory), a contextual entity (device context/dialog context), or a value resolution (numbers, datetime, etc.). In particular embodiments, the entity resolution module 212 may comprise domain entity resolution 340 and generic entity resolution 342. The entity resolution module 212 may execute generic and domain-specific entity resolution. The generic entity resolution 342 may resolve the entities by categorizing the slots and meta slots into different generic topics. The domain entity resolution 340 may resolve the entities by categorizing the slots and meta slots into different domains. As an example and not by way of limitation, in response to the input of an inquiry of the advantages of a particular brand of electric car, the generic entity resolution 342 may resolve the referenced brand of electric car as vehicle and the domain entity resolution 340 may resolve the referenced brand of electric car as electric car.

In particular embodiments, entities may be resolved based on knowledge 350 about the world and the user. The assistant system 140 may extract ontology data from the graphs 352. As an example and not by way of limitation, the graphs 352 may comprise one or more of a knowledge graph, a social graph, or a concept graph. The ontology data may comprise the structural relationship between different slots/meta-slots and domains. The ontology data may also comprise information of how the slots/meta-slots may be grouped, related within a hierarchy where the higher level comprises the domain, and subdivided according to similarities and differences. For example, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability and/or a semantic weight. A confidence probability for an attribute value represents a probability that the value is accurate for the given attribute. A semantic weight for an attribute value may represent how the value semantically appropriate for the given attribute considering all the available information. For example, the knowledge graph may comprise an entity of a book titled "BookName", which may include information extracted from multiple content sources (e.g., an online social network, online encyclopedias, book review sources, media databases, and entertainment content sources), which may be deduped, resolved, and fused to generate the single unique record for the knowledge graph. In this example, the entity titled "BookName" may be associated with a "fantasy" attribute value for a "genre" entity attribute. More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference.

In particular embodiments, the assistant user memory (AUM) 354 may comprise user episodic memories which help determine how to assist a user more effectively. The AUM 354 may be the central place for storing, retrieving, indexing, and searching over user data. As an example and not by way of limitation, the AUM 354 may store information such as contacts, photos, reminders, etc. Additionally, the AUM 354 may automatically synchronize data to the server and other devices (only for non-sensitive data). As an example and not by way of limitation, if the user sets a nickname for a contact on one device, all devices may synchronize and get that nickname based on the AUM 354. In particular embodiments, the AUM 354 may first prepare events, user sate, reminder, and trigger state for storing in a data store. Memory node identifiers (ID) may be created to store entry objects in the AUM 354, where an entry may be some piece of information about the user (e.g., photo, reminder, etc.) As an example and not by way of limitation, the first few bits of the memory node ID may indicate that this is a memory node ID type, the next bits may be the user ID, and the next bits may be the time of creation. The AUM 354 may then index these data for retrieval as needed. Index ID may be created for such purpose. In particular embodiments, given an "index key" (e.g., PHOTO_LOCATION) and "index value" (e.g., "San Francisco"), the AUM 354 may get a list of memory IDs that have that attribute (e.g., photos in San Francisco). As an example and not by way of limitation, the first few bits may indicate this is an index ID type, the next bits may be the user ID, and the next bits may encode an "index key" and "index value". The AUM 354 may further conduct information retrieval with a flexible query language. Relation index ID may be created for such purpose. In particular embodiments, given a source memory node and an edge type, the AUM 354 may get memory IDs of all target nodes with that type of outgoing edge from the source. As an example and not by way of limitation, the first few bits may indicate this is a relation index ID type, the next bits may be the user ID, and the next bits may be a source node ID and edge type. In particular embodiments, the AUM 354 may help detect concurrent updates of different events. More information on episodic memories may be found in U.S. patent application Ser. No. 16/552,559, filed 27 Aug. 2019, which is incorporated by reference.

In particular embodiments, the entity resolution module 212 may use different techniques to resolve different types of entities. For real-world entities, the entity resolution module 212 may use a knowledge graph to resolve the span to the entities, such as "music track", "movie", etc. For user entities, the entity resolution module 212 may use user memory or some agents to resolve the span to user-specific entities, such as "contact", "reminders", or "relationship". For contextual entities, the entity resolution module 212 may perform coreference based on information from the context engine 220 to resolve the references to entities in the context, such as "him", "her", "the first one", or "the last one". In particular embodiments, for coreference, the entity resolution module 212 may create references for entities determined by the NLU module 210. The entity resolution module 212 may then resolve these references accurately. As an example and not by way of limitation, a user input may comprise "find me the nearest grocery store and direct me there". Based on coreference, the entity resolution module 212 may interpret "there" as "the nearest grocery store". In particular embodiments, coreference may depend on the information from the context engine 220 and the dialog manager 216 so as to interpret references with improved accuracy. In particular embodiments, the entity resolution module 212 may additionally resolve an entity under the context (device context or dialog context), such as, for example, the entity shown on the screen or an entity from the last conversation history. For value resolutions, the entity resolution module 212 may resolve the mention to exact value in standardized form, such as numerical value, date time, address, etc.

In particular embodiments, the entity resolution module 212 may first perform a check on applicable privacy constraints in order to guarantee that performing entity resolution does not violate any applicable privacy policies. As an example and not by way of limitation, an entity to be resolved may be another user who specifies in their privacy settings that their identity should not be searchable on the online social network. In this case, the entity resolution module 212 may refrain from returning that user's entity identifier in response to a user input. By utilizing the described information obtained from the social graph, the knowledge graph, the concept graph, and the user profile, and by complying with any applicable privacy policies, the entity resolution module 212 may resolve entities associated with a user input in a personalized, context-aware, and privacy-protected manner.

In particular embodiments, the entity resolution module 212 may work with the ASR module 208 to perform entity resolution. The following example illustrates how the entity resolution module 212 may resolve an entity name. The entity resolution module 212 may first expand names associated with a user into their respective normalized text forms as phonetic consonant representations which may be phonetically transcribed using a double metaphone algorithm. The entity resolution module 212 may then determine an n-best set of candidate transcriptions and perform a parallel comprehension process on all of the phonetic transcriptions in the n-best set of candidate transcriptions. In particular embodiments, each transcription that resolves to the same intent may then be collapsed into a single intent. Each intent may then be assigned a score corresponding to the highest scoring candidate transcription for that intent. During the collapse, the entity resolution module 212 may identify various possible text transcriptions associated with each slot, correlated by boundary timing offsets associated with the slot's transcription. The entity resolution module 212 may then extract a subset of possible candidate transcriptions for each slot from a plurality (e.g., 1000) of candidate transcriptions, regardless of whether they are classified to the same intent. In this manner, the slots and intents may be scored lists of phrases. In particular embodiments, a new or running task capable of handling the intent may be identified and provided with the intent (e.g., a message composition task for an intent to send a message to another user). The identified task may then trigger the entity resolution module 212 by providing it with the scored lists of phrases associated with one of its slots and the categories against which it should be resolved. As an example and not by way of limitation, if an entity attribute is specified as "friend," the entity resolution module 212 may run every candidate list of terms through the same expansion that may be run at matcher compilation time. Each candidate expansion of the terms may be matched in the precompiled trie matching structure. Matches may be scored using a function based at least in part on the transcribed input, matched form, and friend name. As another example and not by way of limitation, if an entity attribute is specified as "celebrity/notable person," the entity resolution module 212 may perform parallel searches against the knowledge graph for each candidate set of terms for the slot output from the ASR module 208. The entity resolution module 212 may score matches based on matched person popularity and ASR-provided score signal. In particular embodiments, when the memory category is specified, the entity resolution module 212 may perform the same search against user memory. The entity resolution module 212 may crawl backward through user memory and attempt to match each memory (e.g., person recently mentioned in conversation, or seen and recognized via visual signals, etc.). For each entity, the entity resolution module 212 may employ matching similarly to how friends are matched (i.e., phonetic). In particular embodiments, scoring may comprise a temporal decay factor associated with a recency with which the name was previously mentioned. The entity resolution module 212 may further combine, sort, and dedupe all matches. In particular embodiments, the task may receive the set of candidates. When multiple high scoring candidates are present, the entity resolution module 212 may perform user-facilitated disambiguation (e.g., getting real-time user feedback from users on these candidates).

In particular embodiments, the context engine 220 may help the entity resolution module 212 improve entity resolution. The context engine 220 may comprise offline aggregators and an online inference service. The offline aggregators may process a plurality of data associated with the user that are collected from a prior time window. As an example and not by way of limitation, the data may include news feed posts/comments, interactions with news feed posts/comments, search history, etc., that are collected during a pre-determined timeframe (e.g., from a prior 90-day window). The processing result may be stored in the context engine 220 as part of the user profile. The user profile of the user may comprise user profile data including demographic information, social information, and contextual information associated with the user. The user profile data may also include user interests and preferences on a plurality of topics, aggregated through conversations on news feed, search logs, messaging platforms, etc. The usage of a user profile may be subject to privacy constraints to ensure that a user's information can be used only for his/her benefit, and not shared with anyone else. More information on user profiles may be found in U.S. patent application Ser. No. 15/967,239, filed 30 Apr. 2018, which is incorporated by reference. In particular embodiments, the online inference service may analyze the conversational data associated with the user that are received by the assistant system 140 at a current time. The analysis result may be stored in the context engine 220 also as part of the user profile. In particular embodiments, both the offline aggregators and online inference service may extract personalization features from the plurality of data. The extracted personalization features may be used by other modules of the assistant system 140 to better understand user input. In particular embodiments, the entity resolution module 212 may process the information from the context engine 220 (e.g., a user profile) in the following steps based on natural-language processing (NLP). In particular embodiments, the entity resolution module 212 may tokenize text by text normalization, extract syntax features from text, and extract semantic features from text based on NLP. The entity resolution module 212 may additionally extract features from contextual information, which is accessed from dialog history between a user and the assistant system 140. The entity resolution module 212 may further conduct global word embedding, domain-specific embedding, and/or dynamic embedding based on the contextual information. The processing result may be annotated with entities by an entity tagger. Based on the annotations, the entity resolution module 212 may generate dictionaries. In particular embodiments, the dictionaries may comprise global dictionary features which can be updated dynamically offline. The entity resolution module 212 may rank the entities tagged by the entity tagger. In particular embodiments, the entity resolution module 212 may communicate with different graphs 352 including one or more of the social graph, the knowledge graph, or the concept graph to extract ontology data that is relevant to the retrieved information from the context engine 220. In particular embodiments, the entity resolution module 212 may further resolve entities based on the user profile, the ranked entities, and the information from the graphs 352.

In particular embodiments, the entity resolution module 212 may be driven by the task (corresponding to an agent 228). This inversion of processing order may make it possible for domain knowledge present in a task to be applied to pre-filter or bias the set of resolution targets when it is obvious and appropriate to do so. As an example and not by way of limitation, for the utterance "who is John?" no clear category is implied in the utterance. Therefore, the entity resolution module 212 may resolve "John" against everything. As another example and not by way of limitation, for the utterance "send a message to John", the entity resolution module 212 may easily determine "John" refers to a person that one can message. As a result, the entity resolution module 212 may bias the resolution to a friend. As another example and not by way of limitation, for the utterance "what is John's most famous album?" To resolve "John", the entity resolution module 212 may first determine the task corresponding to the utterance, which is finding a music album. The entity resolution module 212 may determine that entities related to music albums include singers, producers, and recording studios. Therefore, the entity resolution module 212 may search among these types of entities in a music domain to resolve "John."

In particular embodiments, the output of the entity resolution module 212 may be sent to the dialog manager 216 to advance the flow of the conversation with the user. The dialog manager 216 may be an asynchronous state machine that repeatedly updates the state and selects actions based on the new state. The dialog manager 216 may additionally store previous conversations between the user and the assistant system 140. In particular embodiments, the dialog manager 216 may conduct dialog optimization. Dialog optimization relates to the challenge of understanding and identifying the most likely branching options in a dialog with a user. As an example and not by way of limitation, the assistant system 140 may implement dialog optimization techniques to obviate the need to confirm who a user wants to call because the assistant system 140 may determine a high confidence that a person inferred based on context and available data is the intended recipient. In particular embodiments, the dialog manager 216 may implement reinforcement learning frameworks to improve the dialog optimization. The dialog manager 216 may comprise dialog intent resolution 356, the dialog state tracker 218, and the action selector 222. In particular embodiments, the dialog manager 216 may execute the selected actions and then call the dialog state tracker 218 again until the action selected requires a user response, or there are no more actions to execute. Each action selected may depend on the execution result from previous actions. In particular embodiments, the dialog intent resolution 356 may resolve the user intent associated with the current dialog session based on dialog history between the user and the assistant system 140. The dialog intent resolution 356 may map intents determined by the NLU module 210 to different dialog intents. The dialog intent resolution 356 may further rank dialog intents based on signals from the NLU module 210, the entity resolution module 212, and dialog history between the user and the assistant system 140.

In particular embodiments, the dialog state tracker 218 may use a set of operators to track the dialog state. The operators may comprise necessary data and logic to update the dialog state. Each operator may act as delta of the dialog state after processing an incoming user input. In particular embodiments, the dialog state tracker 218 may a comprise a task tracker, which may be based on task specifications and different rules. The dialog state tracker 218 may also comprise a slot tracker and coreference component, which may be rule based and/or recency based. The coreference component may help the entity resolution module 212 to resolve entities. In alternative embodiments, with the coreference component, the dialog state tracker 218 may replace the entity resolution module 212 and may resolve any references/mentions and keep track of the state. In particular embodiments, the dialog state tracker 218 may convert the upstream results into candidate tasks using task specifications and resolve arguments with entity resolution. Both user state (e.g., user's current activity) and task state (e.g., triggering conditions) may be tracked. Given the current state, the dialog state tracker 218 may generate candidate tasks the assistant system 140 may process and perform for the user. As an example and not by way of limitation, candidate tasks may include "show suggestion," "get weather information," or "take photo." In particular embodiments, the dialog state tracker 218 may generate candidate tasks based on available data from, for example, a knowledge graph, a user memory, and a user task history. In particular embodiments, the dialog state tracker 218 may then resolve the triggers object using the resolved arguments. As an example and not by way of limitation, a user input "remind me to call mom when she's online and I'm home tonight" may perform the conversion from the NLU output to the triggers representation by the dialog state tracker 218 as illustrated in Table 1 below:

event handlers may have an opportunity to process a given event. As an example and not by way of limitation, the dialog state tracker 218 may run all event handlers in parallel on every event, and then may merge the state updates proposed by each event handler (e.g., for each event, most handlers may return a NULL update).

In particular embodiments, the dialog state tracker 218 may work as any programmatic handler (logic) that requires versioning. In particular embodiments, instead of directly altering the dialog state, the dialog state tracker 218 may be a side-effect free component and generate n-best candidates of dialog state update operators that propose updates to the dialog state. The dialog state tracker 218 may comprise intent resolvers containing logic to handle different types of NLU intent based on the dialog state and generate the operators. In particular embodiments, the logic may be organized by intent handler, such as a disambiguation intent handler to handle the intents when the assistant system 140 asks for disambiguation, a confirmation intent handler that comprises the logic to handle confirmations, etc. Intent resolvers may combine the turn intent together with the dialog state to generate the contextual updates for a conversation with the user. A slot resolution component may then recursively resolve the slots in the update operators with resolution providers including the knowledge graph and

TABLE 1

| Example Conversion from NLU Output to Triggers Representation | |
| --- | --- |
| NLU Ontology Representation: | Triggers Representation: |
| [IN:CREATE_SMART_REMINDER<br>Remind me to<br>  [SL:TODO call mom] when<br>  [SL:TRIGGER_CONJUNCTION<br>    [IN:GET_TRIGGER<br>      [SL:TRIGGER_SOCIAL_UPDATE<br>      she's online] and I'm<br>      [SL:TRIGGER_LOCATION home]<br>      [SL:DATE_TIME tonight]<br>    ]<br>  ]<br>] | → Triggers: {<br>    andTriggers: [<br><br>    condition: {ContextualEvent(mom is<br>    online)},<br>    condition: {ContextualEvent(location is<br>    home)},<br>    condition: {ContextualEvent(time is<br>    tonight)}]))]} |

In the above example, "mom," "home," and "tonight" are represented by their respective entities: personEntity, locationEntity, datetimeEntity.

In particular embodiments, the dialog manager 216 may map events determined by the context engine 220 to actions. As an example and not by way of limitation, an action may be a natural-language generation (NLG) action, a display or overlay, a device action, or a retrieval action. The dialog manager 216 may also perform context tracking and interaction management. Context tracking may comprise aggregating real-time stream of events into a unified user state. Interaction management may comprise selecting optimal action in each state. In particular embodiments, the dialog state tracker 218 may perform context tracking (i.e., tracking events related to the user). To support processing of event streams, the dialog state tracker 218*a* may use an event handler (e.g., for disambiguation, confirmation, request) that may consume various types of events and update an internal assistant state. Each event type may have one or more handlers. Each event handler may be modifying a certain slice of the assistant state. In particular embodiments, the event handlers may be operating on disjoint subsets of the state (i.e., only one handler may have write-access to a particular field in the state). In particular embodiments, all domain agents. In particular embodiments, the dialog state tracker 218 may update/rank the dialog state of the current dialog session. As an example and not by way of limitation, the dialog state tracker 218 may update the dialog state as "completed" if the dialog session is over. As another example and not by way of limitation, the dialog state tracker 218 may rank the dialog state based on a priority associated with it.

In particular embodiments, the dialog state tracker 218 may communicate with the action selector 222 about the dialog intents and associated content objects. In particular embodiments, the action selector 222 may rank different dialog hypotheses for different dialog intents. The action selector 222 may take candidate operators of dialog state and consult the dialog policies 360 to decide what actions should be executed. In particular embodiments, a dialog policy 360 may a tree-based policy, which is a pre-constructed dialog plan. Based on the current dialog state, a dialog policy 360 may choose a node to execute and generate the corresponding actions. As an example and not by way of limitation, the tree-based policy may comprise topic grouping nodes and dialog action (leaf) nodes. In particular embodiments, a dialog policy 360 may also comprise a data structure that describes an execution plan of an action by an agent 228. A dialog policy 360 may further comprise multiple goals related to each other through logical operators. In particular embodiments, a goal may be an outcome of a portion of the dialog policy and it may be constructed by the dialog manager 216. A goal may be represented by an identifier (e.g., string) with one or more named arguments, which parameterize the goal. As an example and not by way of limitation, a goal with its associated goal argument may be represented as {confirm_artist, args:{artist: "Madonna" }}. In particular embodiments, goals may be mapped to leaves of the tree of the tree-structured representation of the dialog policy 360.

In particular embodiments, the assistant system 140 may use hierarchical dialog policies 360 with general policy 362 handling the cross-domain business logic and task policies 364 handling the task/domain specific logic. The general policy 362 may be used for actions that are not specific to individual tasks. The general policy 362 may be used to determine task stacking and switching, proactive tasks, notifications, etc. The general policy 362 may comprise handling low-confidence intents, internal errors, unacceptable user response with retries, and/or skipping or inserting confirmation based on ASR or NLU confidence scores. The general policy 362 may also comprise the logic of ranking dialog state update candidates from the dialog state tracker 218 output and pick the one to update (such as picking the top ranked task intent). In particular embodiments, the assistant system 140 may have a particular interface for the general policy 362, which allows for consolidating scattered cross-domain policy/business-rules, especial those found in the dialog state tracker 218, into a function of the action selector 222. The interface for the general policy 362 may also allow for authoring of self-contained sub-policy units that may be tied to specific situations or clients (e.g., policy functions that may be easily switched on or off based on clients, situation). The interface for the general policy 362 may also allow for providing a layering of policies with back-off, i.e., multiple policy units, with highly specialized policy units that deal with specific situations being backed up by more general policies 362 that apply in wider circumstances. In this context the general policy 362 may alternatively comprise intent or task specific policy.

In particular embodiments, a task policy 364 may comprise the logic for action selector 222 based on the task and current state. The task policy 364 may be dynamic and ad-hoc. In particular embodiments, the types of task policies 364 may include one or more of the following types: (1) manually crafted tree-based dialog plans; (2) coded policy that directly implements the interface for generating actions; (3) configurator-specified slot-filling tasks; or (4) machine-learning model based policy learned from data. In particular embodiments, the assistant system 140 may bootstrap new domains with rule-based logic and later refine the task policies 364 with machine-learning models. In particular embodiments, the general policy 362 may pick one operator from the candidate operators to update the dialog state, followed by the selection of a user facing action by a task policy 364. Once a task is active in the dialog state, the corresponding task policy 364 may be consulted to select right actions.

In particular embodiments, the action selector 222 may select an action based on one or more of the event determined by the context engine 220, the dialog intent and state, the associated content objects, and the guidance from dialog policies 360. Each dialog policy 360 may be subscribed to specific conditions over the fields of the state. After an event is processed and the state is updated, the action selector 222 may run a fast search algorithm (e.g., similarly to the Boolean satisfiability) to identify which policies should be triggered based on the current state. In particular embodiments, if multiple policies are triggered, the action selector 222 may use a tie-breaking mechanism to pick a particular policy. Alternatively, the action selector 222 may use a more sophisticated approach which may dry-run each policy and then pick a particular policy which may be determined to have a high likelihood of success. In particular embodiments, mapping events to actions may result in several technical advantages for the assistant system 140. One technical advantage may include that each event may be a state update from the user or the user's physical/digital environment, which may or may not trigger an action from assistant system 140. Another technical advantage may include possibilities to handle rapid bursts of events (e.g., user enters a new building and sees many people) by first consuming all events to update state, and then triggering action(s) from the final state. Another technical advantage may include consuming all events into a single global assistant state.

In particular embodiments, the action selector 222 may take the dialog state update operators as part of the input to select the dialog action. The execution of the dialog action may generate a set of expectations to instruct the dialog state tracker 218 to handle future turns. In particular embodiments, an expectation may be used to provide context to the dialog state tracker 218 when handling the user input from next turn. As an example and not by way of limitation, slot request dialog action may have the expectation of proving a value for the requested slot. In particular embodiments, both the dialog state tracker 218 and the action selector 222 may not change the dialog state until the selected action is executed. This may allow the assistant system 140 to execute the dialog state tracker 218 and the action selector 222 for processing speculative ASR results and to do n-best ranking with dry runs.

In particular embodiments, the action selector 222 may call different agents 228 for task execution. Meanwhile, the dialog manager 216 may receive an instruction to update the dialog state. As an example and not by way of limitation, the update may comprise awaiting agents' 228 response. An agent 228 may select among registered content providers to complete the action. The data structure may be constructed by the dialog manager 216 based on an intent and one or more slots associated with the intent. In particular embodiments, the agents 228 may comprise first-party agents and third-party agents. In particular embodiments, first-party agents may comprise internal agents that are accessible and controllable by the assistant system 140 (e.g. agents associated with services provided by the online social network, such as messaging services or photo-share services). In particular embodiments, third-party agents may comprise external agents that the assistant system 140 has no control over (e.g., third-party online music application agents, ticket sales agents). The first-party agents may be associated with first-party providers that provide content objects and/or services hosted by the social-networking system 160. The third-party agents may be associated with third-party providers that provide content objects and/or services hosted by the third-party system 170. In particular embodiments, each of the first-party agents or third-party agents may be designated for a particular domain. As an example and not by way of limitation, the domain may comprise weather, transportation, music, shopping, social, videos, photos, events, locations, and/or work. In particular embodiments, the assistant system 140 may use a plurality of agents 228 collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, the dialog manager 216 may support multi-turn compositional resolution of slot mentions. For a compositional parse from the NLU module 210, the resolver may recursively resolve the nested slots. The dialog manager 216 may additionally support disambiguation for the nested slots. As an example and not by way of limitation, the user input may be "remind me to call Alex". The resolver may need to know which Alex to call before creating an actionable reminder to-do entity. The resolver may halt the resolution and set the resolution state when further user clarification is necessary for a particular slot. The general policy 362 may examine the resolution state and create corresponding dialog action for user clarification. In dialog state tracker 218, based on the user input and the last dialog action, the dialog manager 216 may update the nested slot. This capability may allow the assistant system 140 to interact with the user not only to collect missing slot values but also to reduce ambiguity of more complex/ambiguous utterances to complete the task. In particular embodiments, the dialog manager 216 may further support requesting missing slots in a nested intent and multi-intent user inputs (e.g., "take this photo and send it to Dad"). In particular embodiments, the dialog manager 216 may support machine-learning models for more robust dialog experience. As an example and not by way of limitation, the dialog state tracker 218 may use neural network based models (or any other suitable machine-learning models) to model belief over task hypotheses. As another example and not by way of limitation, for action selector 222, highest priority policy units may comprise white-list/black-list overrides, which may have to occur by design; middle priority units may comprise machine-learning models designed for action selection; and lower priority units may comprise rule-based fallbacks when the machine-learning models elect not to handle a situation. In particular embodiments, machine-learning model based general policy unit may help the assistant system 140 reduce redundant disambiguation or confirmation steps, thereby reducing the number of turns to execute the user input.

In particular embodiments, the determined actions by the action selector 222 may be sent to the delivery system 230. The delivery system 230 may comprise a CU composer 370, a response generation component 380, a dialog state writing component 382, and a text-to-speech (TTS) component 390. Specifically, the output of the action selector 222 may be received at the CU composer 370. In particular embodiments, the output from the action selector 222 may be formulated as a<k,c,u,d> tuple, in which k indicates a knowledge source, c indicates a communicative goal, u indicates a user model, and d indicates a discourse model.

In particular embodiments, the CU composer 370 may generate a communication content for the user using a natural-language generation (NLG) component 372. In particular embodiments, the NLG component 372 may use different language models and/or language templates to generate natural-language outputs. The generation of natural-language outputs may be application specific. The generation of natural-language outputs may be also personalized for each user. In particular embodiments, the NLG component 372 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator to build complex concepts/roles from atomic ones. In particular embodiments, the content determination component may perform the following tasks to determine the communication content. The first task may comprise a translation task, in which the input to the NLG component 372 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the NLG component 372. The sentence planner may determine the organization of the communication content to make it human understandable. The surface realization component may determine specific words to use, the sequence of the sentences, and the style of the communication content.

In particular embodiments, the CU composer 370 may also determine a modality of the generated communication content using the UI payload generator 374. Since the generated communication content may be considered as a response to the user input, the CU composer 370 may additionally rank the generated communication content using a response ranker 376. As an example and not by way of limitation, the ranking may indicate the priority of the response. In particular embodiments, the CU composer 370 may comprise a natural-language synthesis (NLS) component that may be separate from the NLG component 372. The NLS component may specify attributes of the synthesized speech generated by the CU composer 370, including gender, volume, pace, style, or register, in order to customize the response for a particular user, task, or agent. The NLS component may tune language synthesis without engaging the implementation of associated tasks. In particular embodiments, the CU composer 370 may check privacy constraints associated with the user to make sure the generation of the communication content follows the privacy policies. More information on customizing natural-language generation (NLG) may be found in U.S. patent application Ser. No. 15/967,279, filed 30 Apr. 2018, and U.S. patent application Ser. No. 15/966,455, filed 30 Apr. 2018, which is incorporated by reference.

In particular embodiments, the delivery system 230 may perform different tasks based on the output of the CU composer 370. These tasks may include writing (i.e., storing/updating) the dialog state into the data store 330 using the dialog state writing component 382 and generating responses using the response generation component 380. In particular embodiments, the output of the CU composer 370 may be additionally sent to the TTS component 390 if the determined modality of the communication content is audio. In particular embodiments, the output from the delivery system 230 comprising one or more of the generated responses, the communication content, or the speech generated by the TTS component 390 may be then sent back to the dialog manager 216.

In particular embodiments, the orchestrator 206 may determine, based on the output of the entity resolution module 212, whether to processing a user input on the client system 130 or on the server, or in the third operational mode (i.e., blended mode) using both. Besides determining how to process the user input, the orchestrator 206 may receive the results from the agents 228 and/or the results from the delivery system 230 provided by the dialog manager 216. The orchestrator 206 may then forward these results to the arbitrator 226. The arbitrator 226 may aggregate these results, analyze them, select the best result, and provide the selected result to the render output module 232. In particular embodiments, the arbitrator 226 may consult with dialog policies 360 to obtain the guidance when analyzing these results. In particular embodiments, the render output module 232 may generate a response that is suitable for the client system 130.

Figure 4:
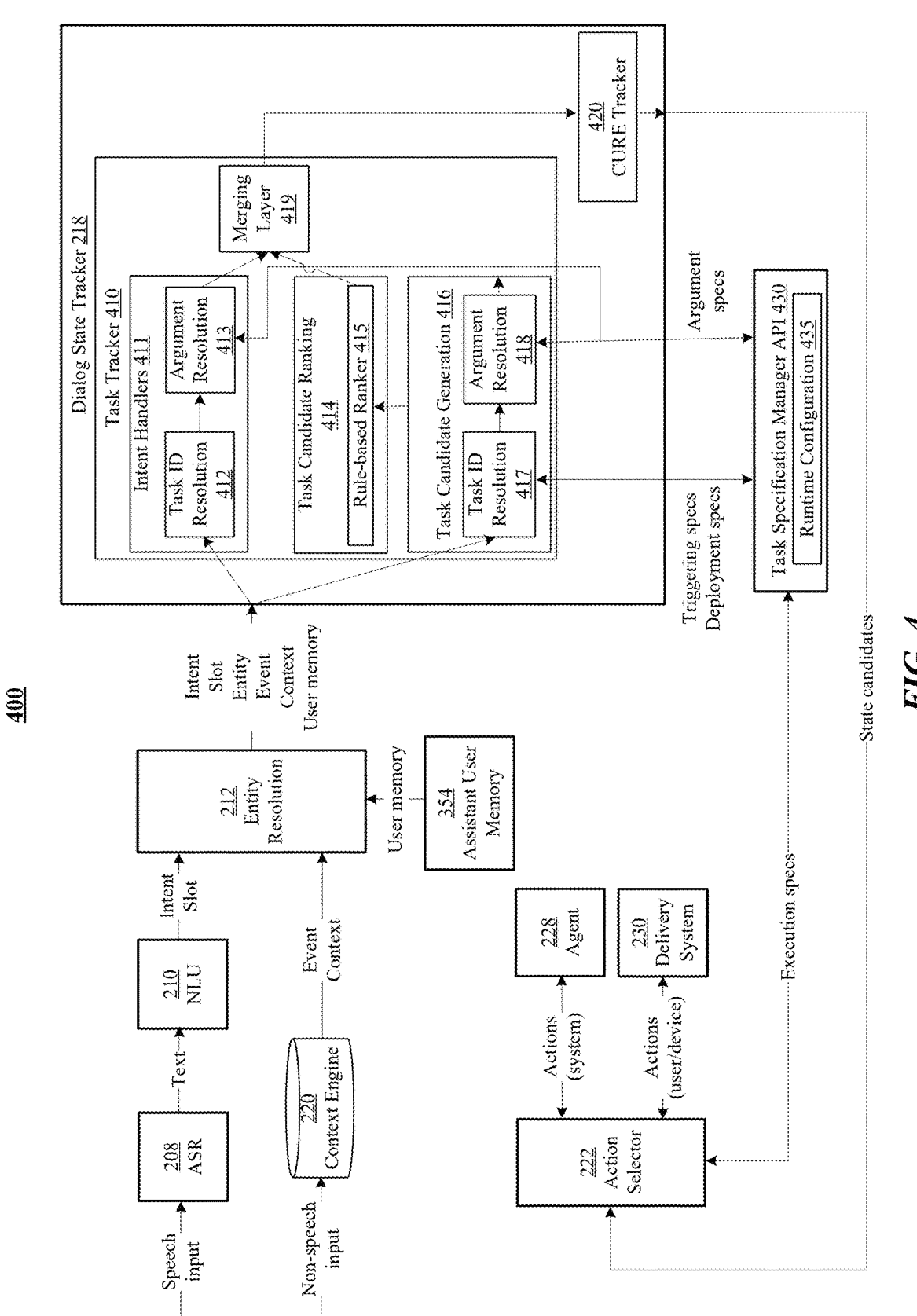
FIG. 4 illustrates an example task-centric flow diagram of processing a user input.

FIG. 4 illustrates an example task-centric flow diagram 400 of processing a user input. In particular embodiments, the assistant system 140 may assist users not only with voice-initiated experiences but also more proactive, multi-modal experiences that are initiated on understanding user context. In particular embodiments, the assistant system 140 may rely on assistant tasks for such purpose. An assistant task may be a central concept that is shared across the whole assistant stack to understand user intention, interact with the user and the world to complete the right task for the user. In particular embodiments, an assistant task may be the primitive unit of assistant capability. It may comprise data fetching, updating some state, executing some command, or complex tasks composed of a smaller set of tasks. Completing a task correctly and successfully to deliver the value to the user may be the goal that the assistant system 140 is optimized for. In particular embodiments, an assistant task may be defined as a capability or a feature. The assistant task may be shared across multiple product surfaces if they have exactly the same requirements so it may be easily tracked. It may also be passed from device to device, and easily picked up mid-task by another device since the primitive unit is consistent. In addition, the consistent format of the assistant task may allow developers working on different modules in the assistant stack to more easily design around it. Furthermore, it may allow for task sharing. As an example and not by way of limitation, if a user is listening to music on smart glasses, the user may say "play this music on my phone." In the event that the phone hasn't been woken or has a task to execute, the smart glasses may formulate a task that is provided to the phone, which may then be executed by the phone to start playing music. In particular embodiments, the assistant task may be retained by each surface separately if they have different expected behaviors. In particular embodiments, the assistant system 140 may identify the right task based on user inputs in different modality or other signals, conduct conversation to collect all necessary information, and complete that task with action selector 222 implemented internally or externally, on server or locally product surfaces. In particular embodiments, the assistant stack may comprise a set of processing components from wake-up, recognizing user inputs, understanding user intention, reasoning about the tasks, fulfilling a task to generate natural-language response with voices.

In particular embodiments, the user input may comprise speech input. The speech input may be received at the ASR module 208 for extracting the text transcription from the speech input. The ASR module 208 may use statistical models to determine the most likely sequences of words that correspond to a given portion of speech received by the assistant system 140 as audio input. The models may include one or more of hidden Markov models, neural networks, deep learning models, or any combination thereof. The received audio input may be encoded into digital data at a particular sampling rate (e.g., 16, 44.1, or 96 kHz) and with a particular number of bits representing each sample (e.g., 8, 16, of 24 bits).

In particular embodiments, the ASR module 208 may comprise one or more of a grapheme-to-phoneme (G2P) model, a pronunciation learning model, a personalized acoustic model, a personalized language model (PLM), or an end-pointing model. In particular embodiments, the grapheme-to-phoneme (G2P) model may be used to determine a user's grapheme-to-phoneme style (i.e., what it may sound like when a particular user speaks a particular word). In particular embodiments, the personalized acoustic model may be a model of the relationship between audio signals and the sounds of phonetic units in the language. Therefore, such personalized acoustic model may identify how a user's voice sounds. The personalized acoustical model may be generated using training data such as training speech received as audio input and the corresponding phonetic units that correspond to the speech. The personalized acoustical model may be trained or refined using the voice of a particular user to recognize that user's speech. In particular embodiments, the personalized language model may then determine the most likely phrase that corresponds to the identified phonetic units for a particular audio input. The personalized language model may be a model of the probabilities that various word sequences may occur in the language. The sounds of the phonetic units in the audio input may be matched with word sequences using the personalized language model, and greater weights may be assigned to the word sequences that are more likely to be phrases in the language. The word sequence having the highest weight may be then selected as the text that corresponds to the audio input. In particular embodiments, the personalized language model may also be used to predict what words a user is most likely to say given a context. In particular embodiments, the end-pointing model may detect when the end of an utterance is reached. In particular embodiments, based at least in part on a limited computing power of the client system 130, the assistant system 140 may optimize the personalized language model at runtime during the client-side process. As an example and not by way of limitation, the assistant system 140 may pre-compute a plurality of personalized language models for a plurality of possible subjects a user may talk about. When a user input is associated with a request for assistance, the assistant system 140 may promptly switch between and locally optimize the pre-computed language models at runtime based on user activities. As a result, the assistant system 140 may preserve computational resources while efficiently identifying a subject matter associated with the user input. In particular embodiments, the assistant system 140 may also dynamically re-learn user pronunciations at runtime.

In particular embodiments, the user input may comprise non-speech input. The non-speech input may be received at the context engine 220 for determining events and context from the non-speech input. The context engine 220 may determine multi-modal events comprising voice/text intents, location updates, visual events, touch, gaze, gestures, activities, device/application events, and/or any other suitable type of events. The voice/text intents may depend on the ASR module 208 and the NLU module 210. The location updates may be consumed by the dialog manager 216 to support various proactive/reactive scenarios. The visual events may be based on person or object appearing in the user's field of view. These events may be consumed by the dialog manager 216 and recorded in transient user state to support visual co-reference (e.g., resolving "that" in "how much is that shirt?" and resolving "him" in "send him my contact"). The gaze, gesture, and activity may result in flags being set in the transient user state (e.g., user is running) which may condition the action selector 222. For the device/application events, if an application makes an update to the device state, this may be published to the assistant system 140 so that the dialog manager 216 may use this context (what is currently displayed to the user) to handle reactive and proactive scenarios. As an example and not by way of limitation, the context engine 220 may cause a push notification message to be displayed on a display screen of the user's client system 130. The user may interact with the push notification message, which may initiate a multi-modal event (e.g., an event workflow for replying to a message received from another user). Other example multi-modal events may include seeing a friend, seeing a landmark, being at home, running, starting a call with touch, taking a photo with touch, opening an application, etc. In particular embodiments, the context engine 220 may also determine world/social events based on world/social updates (e.g., weather changes, a friend getting online). The social updates may comprise events that a user is subscribed to, (e.g., friend's birthday, posts, comments, other notifications). These updates may be consumed by the dialog manager 216 to trigger proactive actions based on context (e.g., suggesting a user call a friend on their birthday, but only if the user is not focused on something else). As an example and not by way of limitation, receiving a message may be a social event, which may trigger the task of reading the message to the user.

In particular embodiments, the text transcription from the ASR module 208 may be sent to the NLU module 210. The NLU module 210 may process the text transcription and extract the user intention (i.e., intents) and parse the slots or parsing result based on the linguistic ontology. In particular embodiments, the intents and slots from the NLU module 210 and/or the events and contexts from the context engine 220 may be sent to the entity resolution module 212. In particular embodiments, the entity resolution module 212 may resolve entities associated with the user input based on the output from the NLU module 210 and/or the context engine 220. The entity resolution module 212 may use different techniques to resolve the entities, including accessing user memory from the assistant user memory (AUM) 354. In particular embodiments, the AUM 354 may comprise user episodic memories helpful for resolving the entities by the entity resolution module 212. The AUM 354 may be the central place for storing, retrieving, indexing, and searching over user data.

In particular embodiments, the entity resolution module 212 may provide one or more of the intents, slots, entities, events, context, or user memory to the dialog state tracker 218. The dialog state tracker 218 may identify a set of state candidates for a task accordingly, conduct interaction with the user to collect necessary information to fill the state, and call the action selector 222 to fulfill the task. In particular embodiments, the dialog state tracker 218 may comprise a task tracker 410. The task tracker 410 may track the task state associated with an assistant task. In particular embodiments, a task state may be a data structure persistent cross interaction turns and updates in real time to capture the state of the task during the whole interaction. The task state may comprise all the current information about a task execution status, such as arguments, confirmation status, confidence score, etc. Any incorrect or outdated information in the task state may lead to failure or incorrect task execution. The task state may also serve as a set of contextual information for many other components such as the ASR module 208, the NLU module 210, etc.

In particular embodiments, the task tracker 410 may comprise intent handlers 411, task candidate ranking module 414, task candidate generation module 416, and merging layer 419. In particular embodiments, a task may be identified by its ID name. The task ID may be used to associate corresponding component assets if it is not explicitly set in the task specification, such as dialog policy 360, agent execution, NLG dialog act, etc. Therefore, the output from the entity resolution module 212 may be received by a task ID resolution component 417 of the task candidate generation module 416 to resolve the task ID of the corresponding task. In particular embodiments, the task ID resolution component 417 may call a task specification manager API 430 to access the triggering specifications and deployment specifications for resolving the task ID. Given these specifications, the task ID resolution component 417 may resolve the task ID using intents, slots, dialog state, context, and user memory.

In particular embodiments, the technical specification of a task may be defined by a task specification. The task specification may be used by the assistant system 140 to trigger a task, conduct dialog conversation, and find a right execution module (e.g., agents 228) to execute the task. The task specification may be an implementation of the product requirement document. It may serve as the general contract and requirements that all the components agreed on. It may be considered as an assembly specification for a product, while all development partners deliver the modules based on the specification. In particular embodiments, an assistant task may be defined in the implementation by a specification. As an example and not by way of limitation, the task specification may be defined as the following categories. One category may be a basic task schema which comprises the basic identification information such as ID, name, and the schema of the input arguments. Another category may be a triggering specification, which is about how a task can be triggered, such as intents, event message ID, etc. Another category may be a conversational specification, which is for dialog manager 216 to conduct the conversation with users and systems. Another category may be an execution specification, which is about how the task will be executed and fulfilled. Another category may be a deployment specification, which is about how a feature will be deployed to certain surfaces, local, and group of users.

In particular embodiments, the task specification manager API 430 may be an API for accessing a task specification manager. The task specification manager may be a module in the runtime stack for loading the specifications from all the tasks and providing interfaces to access all the tasks specifications for detailed information or generating task candidates. In particular embodiments, the task specification manager may be accessible for all components in the runtime stack via the task specification manager API 430. The task specification manager may comprise a set of static utility functions to manage tasks with the task specification manager, such as filtering task candidates by platform. Before landing the task specification, the assistant system 140 may also dynamically load the task specifications to support end-to-end development on the development stage.

In particular embodiments, the task specifications may be grouped by domains and stored in runtime configurations 435. The runtime stack may load all the task specifications from the runtime configurations 435 during the building time. In particular embodiments, in the runtime configurations 435, for a domain, there may be a cconf file and a cinc file (e.g., sidechef_task.cconf and sidechef_task.inc). As an example and not by way of limitation, <domain>_tasks. cconf may comprise all the details of the task specifications. As another example and not by way of limitation, <domain>_tasks.cinc may provide a way to override the generated specification if there is no support for that feature yet.

In particular embodiments, a task execution may require a set of arguments to execute. Therefore, an argument resolution component 418 may resolve the argument names using the argument specifications for the resolved task ID. These arguments may be resolved based on NLU outputs (e.g., slot [SL:contact]), dialog state (e.g., short-term calling history), user memory (such as user preferences, location, long-term calling history, etc.), or device context (such as timer states, screen content, etc.). In particular embodiments, the argument modality may be text, audio, images or other structured data. The slot to argument mapping may be defined by a filling strategy and/or language ontology. In particular embodiments, given the task triggering specifications, the task candidate generation module 416 may look for the list of tasks to be triggered as task candidates based on the resolved task ID and arguments.

In particular embodiments, the generated task candidates may be sent to the task candidate ranking module 414 to be further ranked. The task candidate ranking module 414 may use a rule-based ranker 415 to rank them. In particular embodiments, the rule-based ranker 415 may comprise a set of heuristics to bias certain domain tasks. The ranking logic may be described as below with principles of context priority. In particular embodiments, the priority of a user specified task may be higher than an on-foreground task. The priority of the on-foreground task may be higher than a device-domain task when the intent is a meta intent. The priority of the device-domain task may be higher than a task of a triggering intent domain. As an example and not by way of limitation, the ranking may pick the task if the task domain is mentioned or specified in the utterance, such as "create a timer in TIMER app". As another example and not by way of imitation, the ranking may pick the task if the task domain is on foreground or active state, such as "stop the timer" to stop the timer while the TIMER app is on foreground and there is an active timer. As yet another example and not by way of imitation, the ranking may pick the task if the intent is general meta intent, and the task is device control while there is no other active application or active state. As yet another example and not by way of imitation, the ranking may pick the task if the task is the same as the intent domain. In particular embodiments, the task candidate ranking module 414 may customize some more logic to check the match of intent/slot/entity types. The ranked task candidates may be sent to the merging layer 419.

In particular embodiments, the output from the entity resolution module 212 may also sent to a task ID resolution component 412 of the intent handlers 411. The task ID resolution component 412 may resolve the task ID of the corresponding task similarly to the task ID resolution component 417. In particular embodiments, the intent handlers 411 may additionally comprise an argument resolution component 413. The argument resolution component 413 may resolve the argument names using the argument specifications for the resolved task ID similarly to the argument resolution component 418. In particular embodiments, intent handlers 411 may deal with task agnostic features and may not be expressed within the task specifications which are task specific. Intent handlers 411 may output state candidates other than task candidates such as argument update, confirmation update, disambiguation update, etc. In particular embodiments, some tasks may require very complex triggering conditions or very complex argument filling logic that may not be reusable by other tasks even if they were supported in the task specifications (e.g., in-call voice commands, media tasks via [IN:PLAY_MEDIA], etc.). Intent handlers 411 may be also suitable for such type of tasks. In particular embodiments, the results from the intent handlers 411 may take precedence over the results from the task candidate ranking module 414. The results from the intent handlers 411 may be also sent to the merging layer 419.

In particular embodiments, the merging layer 419 may combine the results from the intent handlers 411 and the results from the task candidate ranking module 414. The dialog state tracker 218 may suggest each task as a new state for the dialog policies 360 to select from, thereby generating a list of state candidates. The merged results may be further sent to a conversational understanding reinforcement engine (CURE) tracker 420. In particular embodiments, the CURE tracker 420 may be a personalized learning process to improve the determination of the state candidates by the dialog state tracker 218 under different contexts using real-time user feedback. More information on conversational understanding reinforcement engine may be found in U.S. patent application Ser. No. 17/186,459, filed 26 Feb. 2021, which is incorporated by reference.

In particular embodiments, the state candidates generated by the CURE tracker 420 may be sent to the action selector 222. The action selector 222 may consult with the task policies 364, which may be generated from execution specifications accessed via the task specification manager API 430. In particular embodiments, the execution specifications may describe how a task should be executed and what actions the action selector 222 may need to take to complete the task.

In particular embodiments, the action selector 222 may determine actions associated with the system. Such actions may involve the agents 228 to execute. As a result, the action selector 222 may send the system actions to the agents 228 and the agents 228 may return the execution results of these actions. In particular embodiments, the action selector may determine actions associated with the user or device. Such actions may need to be executed by the delivery system 230. As a result, the action selector 222 may send the user/device actions to the delivery system 230 and the delivery system 230 may return the execution results of these actions.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), extended reality (XR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Artificial/Augmented Reality Systems

Figure 5A:
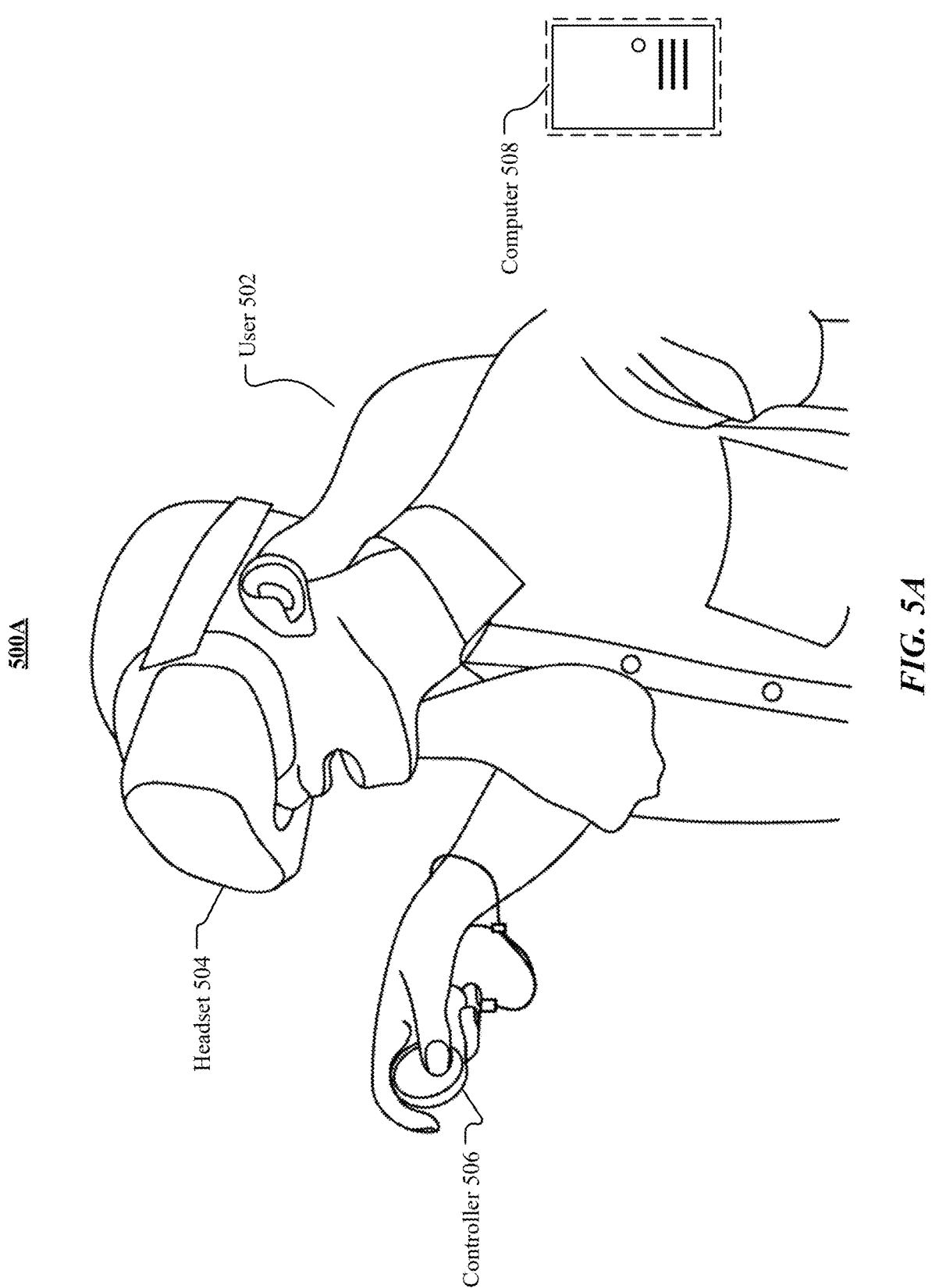
FIG. 5A illustrates an example artificial reality (AR) system.

FIG. 5A illustrates an example artificial reality (AR) system 500A. In particular embodiments, the artificial reality system 500 may comprise a headset 504, a controller 506, and a computing system 508. A user 502 may wear the headset 504 that may display visual artificial reality content to the user 502. The headset 504 may include an audio device that may provide audio artificial reality content to the user 502. The headset 504 may include one or more cameras which can capture images and videos of environments. The headset 504 may include an eye tracking system to determine the vergence distance of the user 502. The headset 504 may be referred as a head-mounted display (HDM). The controller 506 may comprise a trackpad and one or more buttons. The controller 506 may receive inputs from the user 502 and relay the inputs to the computing system 508. The controller 206 may also provide haptic feedback to the user 502. The computing system 508 may be connected to the headset 504 and the controller 506 through cables or wireless connections. The computing system 508 may control the headset 504 and the controller 506 to provide the artificial reality content to and receive inputs from the user 502. The computing system 508 may be a standalone host computer system, an on-board computer system integrated with the headset 504, a mobile device, or any other hardware platform capable of providing artificial reality content to and receiving inputs from the user 502.

Figure 5B:
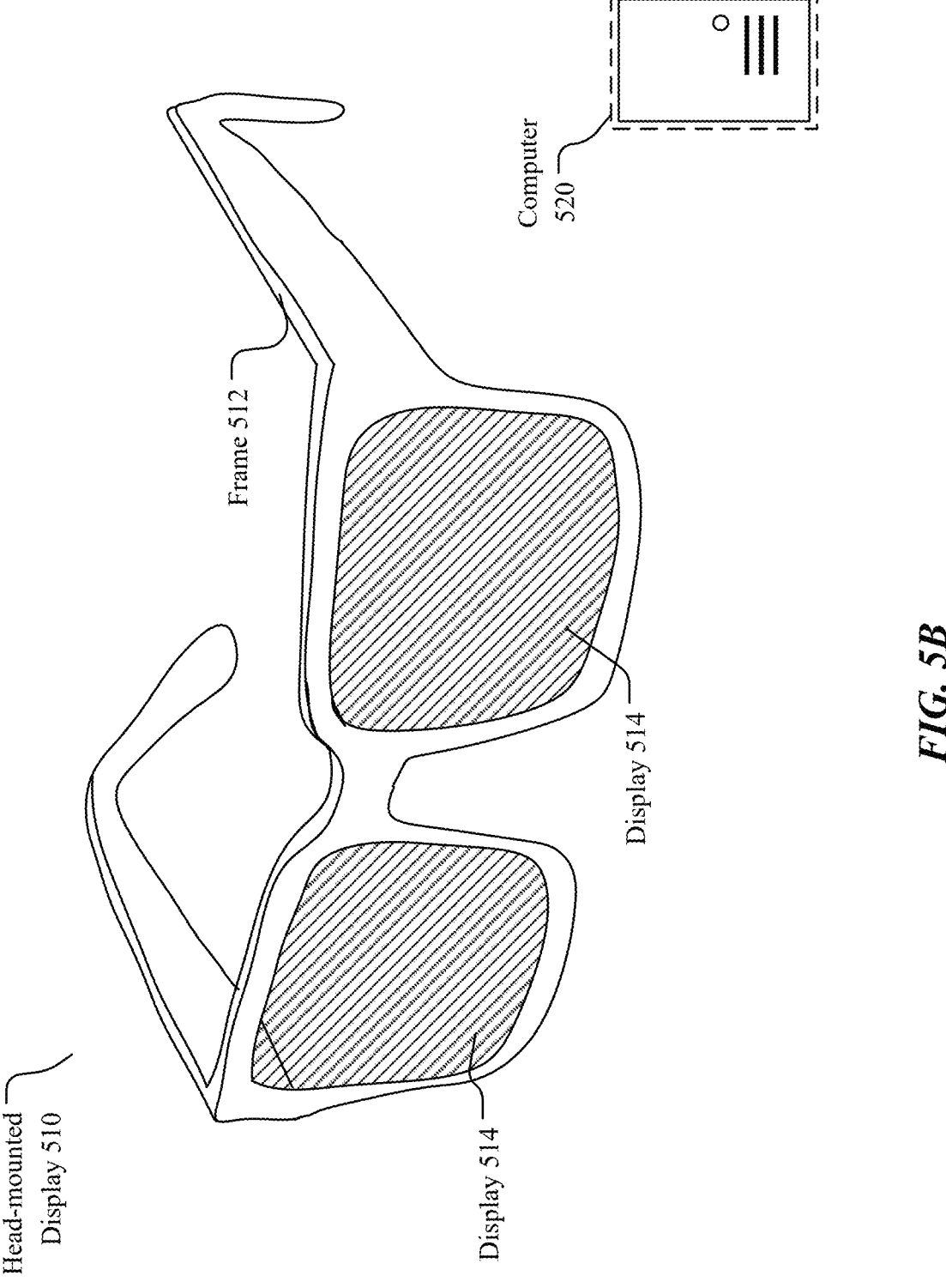
FIG. 5B illustrates an example augmented reality (AR) system.

FIG. 5B illustrates an example augmented reality (AR) system 500B. The augmented reality system 500B may include a head-mounted display (HMD) 510 (e.g., glasses) comprising a frame 512, one or more displays 514, and a computing system 520. The displays 514 may be transparent or translucent allowing a user wearing the HMD 510 to look through the displays 514 to see the real world and displaying visual artificial reality content to the user at the same time. The HMD 510 may include an audio device that may provide audio artificial reality content to users. The HMD 510 may include one or more cameras which can capture images and videos of environments. The HMD 510 may include an eye tracking system to track the vergence movement of the user wearing the HMD 510. The augmented reality system 500B may further include a controller comprising a trackpad and one or more buttons. The controller may receive inputs from users and relay the inputs to the computing system 520. The controller may also provide haptic feedback to users. The computing system 520 may be connected to the HMD 510 and the controller through cables or wireless connections. The computing system 520 may control the HMD 510 and the controller to provide the augmented reality content to and receive inputs from users. The computing system 520 may be a standalone host computer system, an on-board computer system integrated with the HMD 510, a mobile device, or any other hardware platform capable of providing artificial reality content to and receiving inputs from users.

Voice Command Integration

In particular embodiments, a client system may implement voice commands within an extended reality (XR) environment (e.g., augmented reality (AR) or virtual reality (VR)) via a voice SDK, which allows XR applications to easily integrate voice commands on XR devices (e.g., the client system). In particular embodiments, the client system may implement voice commands in combination with gestures within XR environments via a voice SDK. As XR content becomes more immersive, voice integration may make the content more engaging to interact with various applications. That is, people typically interact with the real world using their voice and hands. Currently, navigating through XR content may be cumbersome as the user may need to navigate through unfamiliar nested menus. As an example and not by way of limitation, a user may need to click through various virtual menus by ray-casting from a controller or inputting text through a virtual keyboard to navigate to a desired destination. To improve upon the user experience, the XR system may implement voice commands, combined with one or more other modalities (e.g., gesture, pose, eye gaze, etc.) to allow a user to perform voice navigation/search, voice FAQ, and voice-driven gameplay & experiences.

In particular embodiments, in order to implement voice commands into XR content, a voice SDK may be used by application developers to customize voice commands for their applications. In particular embodiments, the voice SDK may provide various features for applications, such as capturing voice requests with out-of-the-box activation methods, automatic speech recognition (ASR) for a user's utterance, receive live ASR transcription for a spoken utterance, built-in intents, entities, and traits with no natural language understanding (NLU) training, training custom NLU capabilities specific for applications, and improve voice request accuracy with dynamic entities. In particular embodiments, the voice SDK may also be complimented with a natural-language platform to process voice requests into user intents to trigger relevant application functionalities. A typical voice command flow may start with receiving a user input to trigger an initiation to receive a voice command. The user input may include one or more of a button press, clicking a user interface element, a gesture, and the like. This user input may place the XR system into a listening mode for a voice command. There may be other activation modalities including head pose, head gesture, eye gaze, voice, proximity, touch, and the like. The different activation modalities enable voice-driven interactions and multi-sequence activation. As an example and not by way of limitation, voice-driven interactions may include interactions with non-player characters, gameplay that requires voice activation for certain elements, and the like. The activation methods may also improve accessibility, provide greater flexibility in physical interactions with XR objects (e.g., non-player characters), and preserve immersion by reducing the disruption (e.g., needing to pull up a menu to select an option or the like) to the flow of an application experience. To avoid unintentional activation, another modality may be used in conjunction with gesture activation (e.g., voice, gaze, etc.). As an example and not by way of limitation, a user can gaze at an object to select it (and the attention system indicates the object is ready to receive input), and then when the user makes a subsequent input (voice or gesture or both), the system knows the command is directed at the object in the user's gaze. As another example and not by way of limitation, a user can directly touch an object (real or virtual) to select the object, allowing subsequent voice interactions with respect to the object. As another example and not by way of limitation, the user can change their position with respect to an object to select it (e.g., move towards an object) or take a certain pose to initiate the system (e.g., tilting your head at a certain angle to wake the system), allow subsequent voice/gesture inputs. Multi-sequence activation can be used to allow certain sequences of various modalities of inputs in any order to cause activation, such as using a gesture and then voice activation. The XR system may then receive an audio input from the user through one or more microphones corresponding to the voice command. The XR system may then process the audio input to identify one or more user intents and entities. The XR system may use the application that received the audio input in order to perform a voice command based on the identified one or more user intents and entities. As an example and not by way of limitation, the developer of the application may add a voice command to search for workouts on their application. The user input may be "Show me a 10 minute boxing workout", which may be processed using a NLU model to identify an intent: start_workout, entity–[duration]=10 minute, entity [workout_category]=boxing. These intents and entities may be sent to the application to perform application functionality corresponding to the intents and entities.

In particular embodiments, an assistant system or one or more components of the assistant system may be used to help process voice commands. As an example and not by way of limitation, the user may start an audio input with "hey assistant" to initiate a voice command. The audio input may include a wake word to place the XR system into a listening mode for the voice command. The voice commands may include voice destinations, content search, hands-free navigation and control, voice-driven gameplay, and other functionalities. Voice destinations may be a voice command to allow a user to jump to any registered destination using voice. Content search may enable a user to quickly search for information associated with an application using a voice command. Hands-free navigation and control may include a voice command to allow a user to invite a friend into a gaming lobby among other things. The voice-driven gameplay may implement voice commands that are integrated in the gameplay of particular applications. As an example and not by way of limitation, a wizards duel game may implement the casting of wizard spells through a combination of gesture and voice input. For instance, a user may need to say a specific phrase and perform a specific hand wave to complete the voice command corresponding to a particular spell. Gesture detection may be done using, for example, one or more accelerometers in hand-held controllers, electromyography (EMG) signals from a wearable wristband, vision-based hand tracking techniques (for modeling the position and movement of the user's hands), or other suitable techniques. The detection of the gesture may place the XR system in a listening mode for a particular application or the application may be set in a listening mode for certain contexts. For instance, if the gameplay requires audio input from the user, then the XR system may be set to a listening mode for the certain contexts. A XR system may use a language model to identify phrases from an audio input and compare that to a list of phrases associated with the application. The XR system may identify a corresponding gesture performed and compare that to a list associated with a combination of phrases and gestures. When a particular phrase and gesture combination is detected, then the XR system may present a corresponding output, such as a resulting wizard spell. The XR system may perform object recognition on real-world objects and allow the user to interact with the object (e.g., see a real-world menu, CV recognizes it, then point at an item on the menu and ask the assistant to tell you about it).

In particular embodiments, an application developer may initially set up a list of actions to perform based on voice commands. The developer may specify an utterance, a phrase, voice command, etc. that is linked to an intent. The developer may identify an n-gram within the utterance, phrase, voice command, etc. and generate an entity based on the identified n-gram. The NLU model may identify synonyms corresponding to the n-gram associated with an entity, such that when a user speaks an utterance or phrase, the XR system would perform the same action associated with the original intent and entity combination. In particular embodiments, a voice SDK may include a set of intents and entities available to be used in voice commands.

In particular embodiments, the voice SDK may enable voice interactions with applications. These voice interactions may include voice commands that consolidate controller actions into a single phrase or interactive conversation that makes an application more engaging. In particular embodiments, the voice SDK may capture voice requests with various activation method, access ASR for a user's utterance, receive live ASR transcription for the spoken utterance, use one or more included intents, entities, and traits, train custom NLU capabilities specific for a particular application, and improve voice request accuracy using synonyms for entities.

In particular embodiments, the voice commands may be used for voice navigation and search, voice FAQ, and voice-driven gameplay and experiences. In particular embodiments, the voice SDK implemented by a client system may have built-in intents, entities, traits, with support for full customization. As an example and not by way of limitation, an application developer may start with a built-in intent, entity, trait, etc. and customize the intent to fit their application. In particular embodiments, the voice SDK may have cross-platform support to apply to other devices. As an example and not by way of limitation, if a voice command was created for a particular XR system, the voice command may be used for other XR systems. In particular embodiments, the voice SDK may function in a plurality of different languages.

In particular embodiments, a client system may alter one or more elements of an XR environment in response to a voice command received from a user. As an example and not by way of limitation, the user may say "change the desk to red". The client system may use one or more methods to confirm the voice command as described herein. As an example and not by way of limitation, the client system may generate an XR element pointing to the identified entity (e.g., the desk) to confirm which element the user is directed to. While a singular element is discussed, the user may alter multiple elements or the entire XR environment using voice commands. As an example and not by way of limitation, the user may request to return to a home environment of an XR system, which would alter the entire XR environment.

In particular embodiments, the voice interactions a user of a client system may experience may factor in one or more of language used, tone, context, visuals, gestures, facial expressions, and body language. The voice interactions may be interactive, contextual, cooperative, variable, and multimodal.

In particular embodiments, the client system may include several activation models to input a voice command or invoke a voice interaction. The activation models may include UI affordance, immersion, gaze, gesture, and an attention system. In particular embodiments, the UI affordance may be an option within a user interface that can be used to activate a voice interaction. The voice interaction may be setting the client system into a listening mode to receive a voice command, begin an audio interaction, and other voice interactions. The user interface that a user may interact with may be embodied as a mic button, exclamation point above a character's head, and the like. The user interface may include keyboard dictation or search activities. UI affordance may be easily transferable to other devices. In particular embodiments activation of a voice interaction using UI affordance may include a controller click on a microphone button, a hand pinch click on UI button, a hand direct touch on UI button.

In particular embodiments, an activation model including immersion may be an option that is effective and natural when used within a context of a game. As an example and not by way of limitation, a user may rub a magic lamp which activates a voice interaction, the user may stand in front of a magic mirror, or the user may talk to a non-player character (NPC). The immersion activation model may be used for voice-driven gameplay.

In particular embodiments, an activation model including gaze may be an option that uses the first-person perspective an eye tracking as an activation model. In particular embodiments, the client system may perform eye tracking to determine a user's gaze (after receiving user permission). The gaze activation model may be combined with other gestures or game elements to provide an immersive experience. As an example and not by way of limitation, a user gazing at a non-player character and waving to speak and start a voice interaction. As another example and not by way of limitation, a user may lock onto a target during gameplay to use a voice command.

In particular embodiments, an activation model including gestures may be an option for voice-driven gameplay. Gesture activation may be combined with head/eye gaze or used separately. As an example and not by way of limitation, the user may make a gesture such as with a wand. In particular embodiments, the gesture activation may be used for multisequence activation. The gesture activation may be combined with a voice input.

In particular embodiments, an activation model may include mechanisms using an attention system. Natural attention indicators and modalities may be used for activation of a voice interaction. As an example and not by way of limitation, body language and gaze.

In particular embodiments, a client system may receive a user input to place the client system in a listening mode. In particular embodiments, the client system may be embodied as an XR display device. The user input may comprise one or more of a button press, wake word, gesture input, and the like. The client system may be configured to receive an audio input and any additional inputs in response to the user input. In particular embodiments, the client system may receive a multimodal input comprising (1) an audio input comprising a voice command and (2) a gesture input corresponding to the voice command. In particular embodiments, the gesture input may correspond to the user input to place the client system in a listening mode. In particular embodiments, the client system may process, using a natural-language model, the audio input to identify one or more intents and one or more entities associated with the voice command. In particular embodiments, the client system may use the natural-language model of the assistant system to process the audio input. In particular embodiments, the client system may determine a gesture performed based on the gesture input. As an example and not by way of limitation, the client system may determine a circle gesture was performed based on the gesture input. The gesture input may be received at one or more hand-held controllers associated with the client system. In particular embodiments, the client system may execute an action based on the identified one or more intents, the identified one or more entities, and the gesture. As an example and not by way of limitation, within a wizard dueling application, the action may be to display a spell animation.

In particular embodiments, an extended reality (XR) display device may receive a gesture-based input from a first user of the XR display device. The XR display device may be embodied as the client system. In particular embodiments, the XR display device may use one or more sensors or a device coupled to the XR display device to receive a gesture-based input from the first user. As an example and not by way of limitation, the XR display device may receive a gesture-based input (e.g., a circle gesture) from a controller coupled (wired or wireless) to the XR display device. In particular embodiments, the XR display device may receive a tertiary input, wherein the tertiary input may comprise one or more of a touch input, a gaze input, or a pose input. As an example and not by way of limitation, the XR display device may use one or more cameras to capture the gaze input. Although this disclosure describes receiving an input from a user in a particular manner, this disclosure contemplates receiving an input from a user in any suitable manner.

In particular embodiments, the XR display device may process, using a gesture-detection model, the gesture-based input to identify a first gesture. In particular embodiments, the XR display device may use a gesture-detection model that was trained to detect gestures made by users of the XR display devices. As an example and not by way of limitation, the gesture-detection model may be trained to detect gestures that a user may make while using the XR display device, such as a circle gesture, a pointing gesture, and the like. Although this disclosure describes processing a gesture-based input in a particular manner, this disclosure contemplates processing a gesture-based input in any suitable manner.

In particular embodiments, the XR display device may receive an audio input from the first user, wherein the audio input may comprise a first voice command. In particular embodiments, the XR display device may use one or more microphones to receive the audio input from the first user. In particular embodiments, the XR display device may place one or more microphones of the XR display device into a listening mode responsive to identifying the first gesture. In particular embodiments, the XR display device may place one or more microphones of the XR display device into a listening mode responsive to receiving a tertiary input, such as a gaze input. As an example and not by way of limitation, the XR display device may place one or more microphones of the XR display device into a listening mode if a user looks at an object. Although this disclosure describes receiving an audio input in a particular manner, this disclosure contemplates receiving an audio input in any suitable manner.

In particular embodiments, the XR display device may process, using a natural language understanding (NLU) model, the audio input to identify one or more intents or one or more slots associated with the first voice command. In particular embodiments, the XR display device may process the audio input responsive to both identifying a first gesture and receiving the audio input from the first user. As an example and not by way of limitation, the XR display device may process an audio input when a user simultaneously makes a gesture and says an audio input at the same time. Although this disclosure describes processing an audio input in a particular manner, this disclosure contemplates processing an audio input in any suitable manner.

In particular embodiments, the XR display device may determine whether the identified first gesture matches the first voice command. In particular embodiments, the XR display device may determine whether a voice command matches a gesture made by the user. As an example and not by way of limitation, the XR display device may determine whether the voice command "fireball" matches a circle gesture made by the user. In particular embodiments, the XR display device may determined whether one or more tertiary inputs also or instead matches the first voice command. As an example and not by way of limitation, the XR display device may determine whether a gaze input matches the voice command a user said. Although this disclosure describes determining whether an identified gesture matches a voice command in a particular manner, this disclosure contemplates determining whether an identified gesture matches a voice command in any suitable manner.

In particular embodiments, the XR display device may execute a first task corresponding to the first voice command based on the identified first gesture and the identified one or more intents or one or more slots. In particular embodiments, the XR display device may execute, responsive to the identified first gesture matching the first voice command, the first task corresponding to the first voice command based on the identified first gesture and the identified one or more intents or one or more slots. In particular embodiments, the XR display device may execute the first task corresponding to the first voice command based on one or more other inputs (e.g., tertiary input, such as gaze input) and the identified one or more intents or one or more slots. In particular embodiments, the executing of the first task may further be based on an order of receiving the Although this disclosure describes executing a first task corresponding to a first voice command in a particular manner, this disclosure contemplates executing a first task corresponding to a first voice command in any suitable manner.

In particular embodiments, the XR display device may render visual feedback responsive to executing the first task. In particular embodiments, the XR display device may render visual feedback on one or more displays of the XR display device. As an example and not by way of limitation, if the first task comprises generating a fireball visual, the XR display device may render a fireball while the XR display device is executing the first task. In particular embodiments, the XR display device may render, for one or more displays of the XR display device, a user interface comprising a menu of one or more activatable user interface elements responsive to executing the first task. As an example and not by way of limitation, the XR display device may render a navigation menu to access information and/or other parts of the application associated with the XR environment the user is located. In particular embodiments, the XR display device may render, for one or more displays of the XR display device, information corresponding to frequently asked questions responsive to executing the first task. Although this disclosure describes rendering one or more elements in a particular manner, this disclosure contemplates rendering one or more elements in any suitable manner.

In particular embodiments, the XR display device may capture one or more images corresponding to a real-world environment of the first user. In particular embodiments, the XR display device may use one or more cameras of the XR display device to capture one or more images corresponding to the real-world environment of the first user. As an example and not by way of limitation, the one or more cameras of the XR display device may capture passthrough images for the user to view. In particular embodiments, the XR display device may be an augmented reality device that comprises lens that the user may see through. In particular embodiments, the XR display device may process, using a machine-learning model, the one or more images to identify one or more real-world objects within the one or more images. As an example and not by way of limitation, the XR display device may use a machine-learning model to identify a menu of a restaurant within the one or more images. Although this disclosure describes capturing one or more images in a particular manner, this disclosure contemplates capturing one or more images in any suitable manner.

In particular embodiments, the XR display device may analyze one or more of the identified real-world objects to perform the first task. In particular embodiments, the first task may comprise identifying text corresponding to one or more real-world objects responsive to analyzing the one or more identified real-world objects. The text may be in a first language. The first task may comprise translating the text from the first language to a second language. The first task may also comprise presenting, by the XR display device, the translated text to the first user. As an example and not by way of limitation, the XR display device may present the translated text through rendering the text to be displayed on one or more displays of the XR display device or through outputting an audio output through speakers of the XR display device. In particular embodiments, the XR display device may identify one or more online media corresponding to the one or more real-world objects responsive to analyzing the one or more identified real-world objects. As an example and not by way of limitation, the XR display device may identify a website associated with a menu identified in the real-world environment. The XR display device may render a user interface containing the website on one or more displays of the XR display device. Although this disclosure describes analyzing the one or more identified real-world objects in a particular manner, this disclosure contemplates analyzing the one or more identified real-world objects in any suitable manner.

Figure 6A:
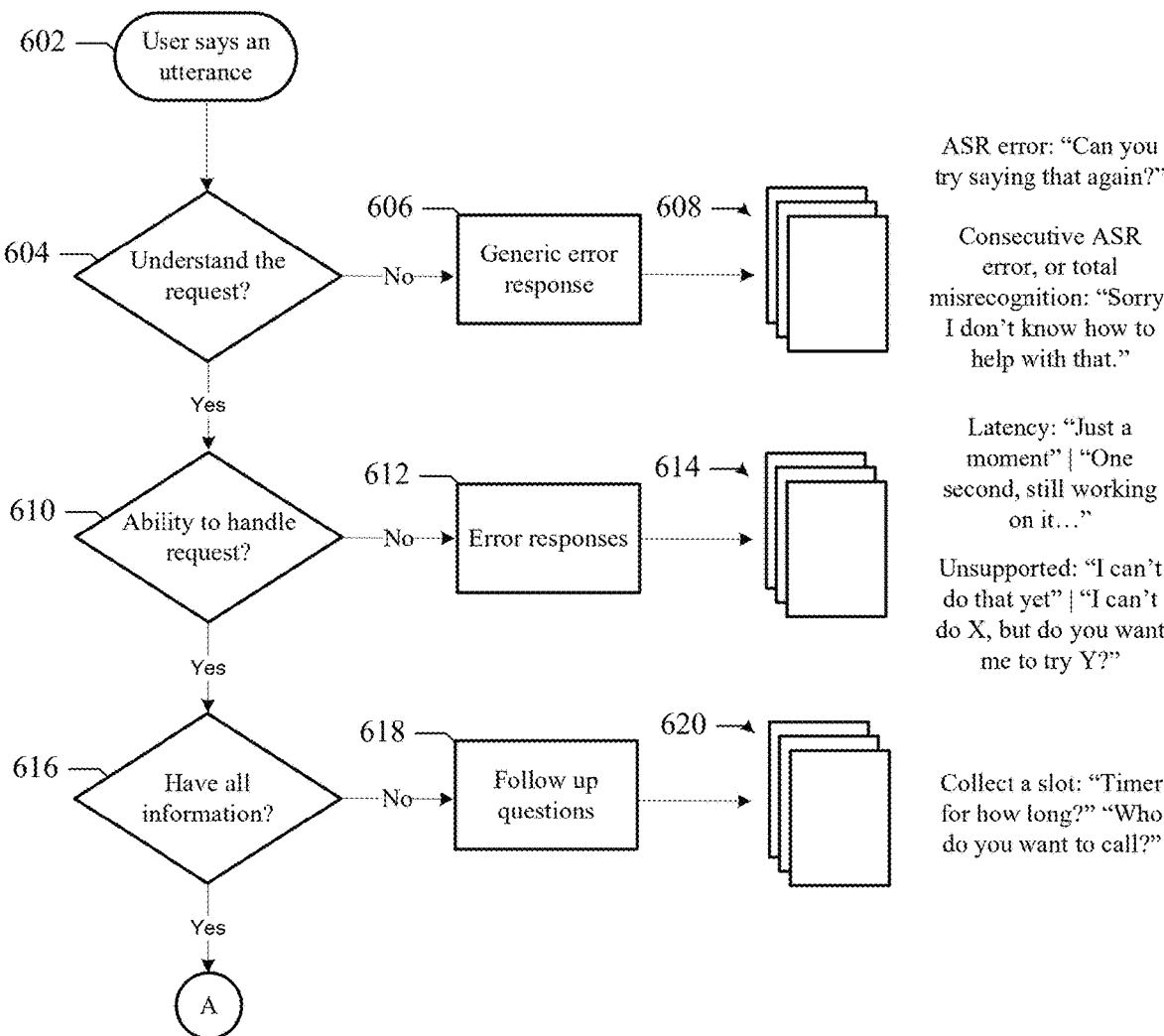
FIGS. 6A-6B illustrates an example flow diagram of processing an audio input.
Figure 6B:
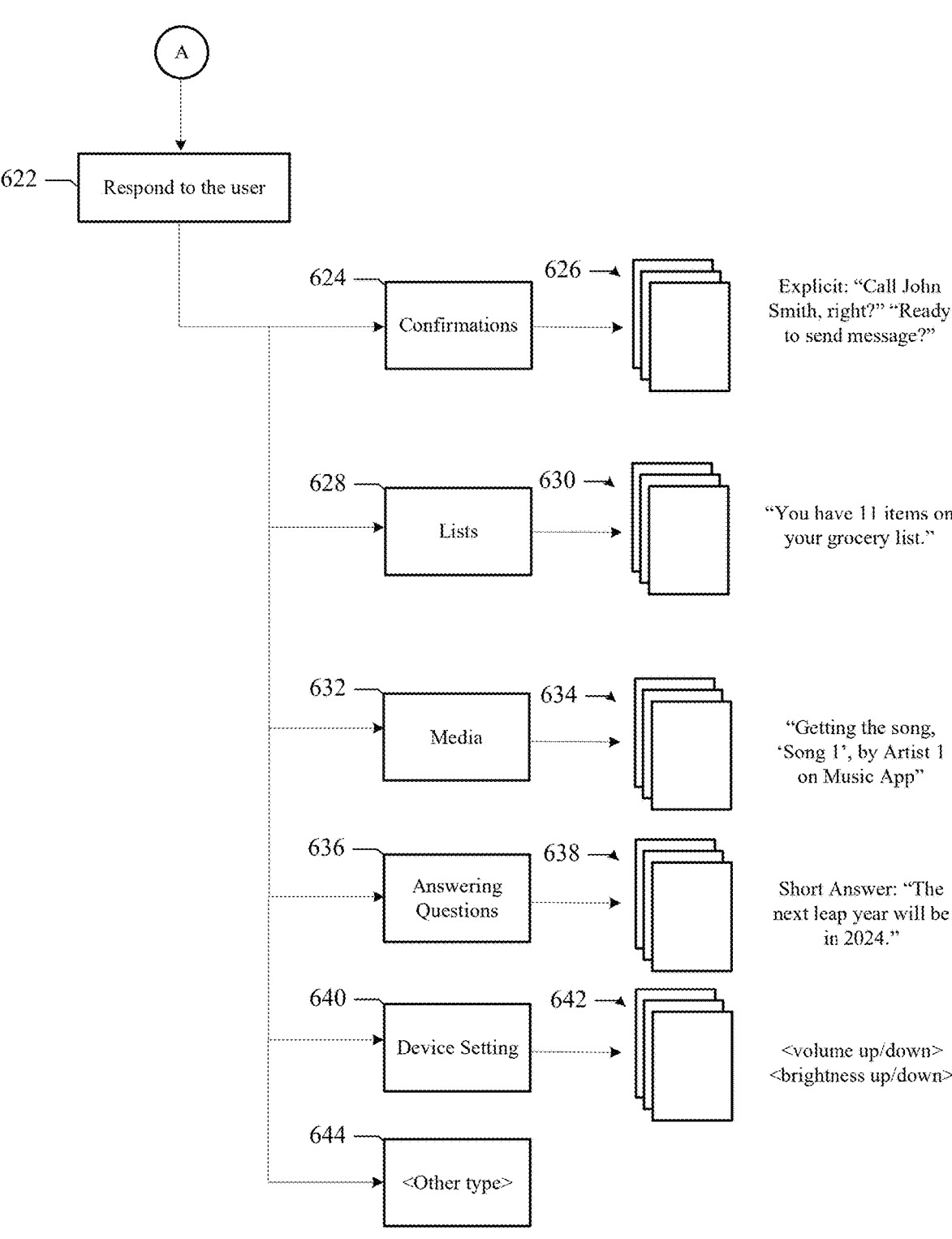

FIGS. 6A-6B illustrate an example flow diagram of processing an audio input. The process 600 may be performed by a client system as described herein. The client system may be embodied as an XR system. In particular embodiments, the process 600 may start at step 602, where a client system receives an utterance from a user. At step 604, the client system may use ASR and a natural language model to process the utterance. The client system may process the utterance to generate one or more intents and one or more entities. The client system may determine whether it was able to understand the request. If the client system is unable to understand the request, the process 600 continues to step 606 where a generic error response 608 is outputted to the user. In particular embodiments, the client system may partially understand the request or has a low confidence in understanding the request. In particular embodiments, if the client system partially understands the request or has low confidence in understanding the request, the client system may determine whether the client system is able to handle any of the identified intents or slots at step 610. In particular embodiments, the client system may generate a request to have the user repeat themselves. In particular embodiments, the client system may confirm what the user is attempting to request. In particular embodiments, the client system may present an audio output to the user to respond to the user utterance. If the client system is able to understand the request, the process 600 may continue to step 610, where the client system determines whether the client system has the ability to handle the request. As an example and not by way of limitation, the client system may attempt to complete the request to determine whether the client system is able to handle the request. If the client system is unable to handle the request, the process 600 continues to step 612 where the client system output one or more error responses 614 to the user. If the client system is able to handle the request, the process 600 continues to step 616 where the client system determines whether the client system has all the information needed to perform and action or respond to the user request. If the client system does not have all the information needed, then the process 600 continues to step 618 where the client system may output follow up questions 620 to request further information from the user. If the client system does have all the information, the client system may proceed to step 622 (shown in FIG. 6B) to perform an action to respond to the user utterance. The process 600 continues to a response step 624, 628, 632, 636, 640, or 644 based on the identified intents and entities in the user utterance. The process 600 can continue to step 624 to respond with one or more confirmations 626. The process 600 can continue to step 628 to respond with one or more lists 630. The process 600 can continue to step 632 to respond with one or more media actions 634. The process 600 can continue to step 636 to respond with one or more answers to questions 638. The process 600 can continue to step 640 to respond with one or more device setting updates 642. The process 600 can continue to step 644 to perform another type of action or response to the user utterance.

Figure 7:
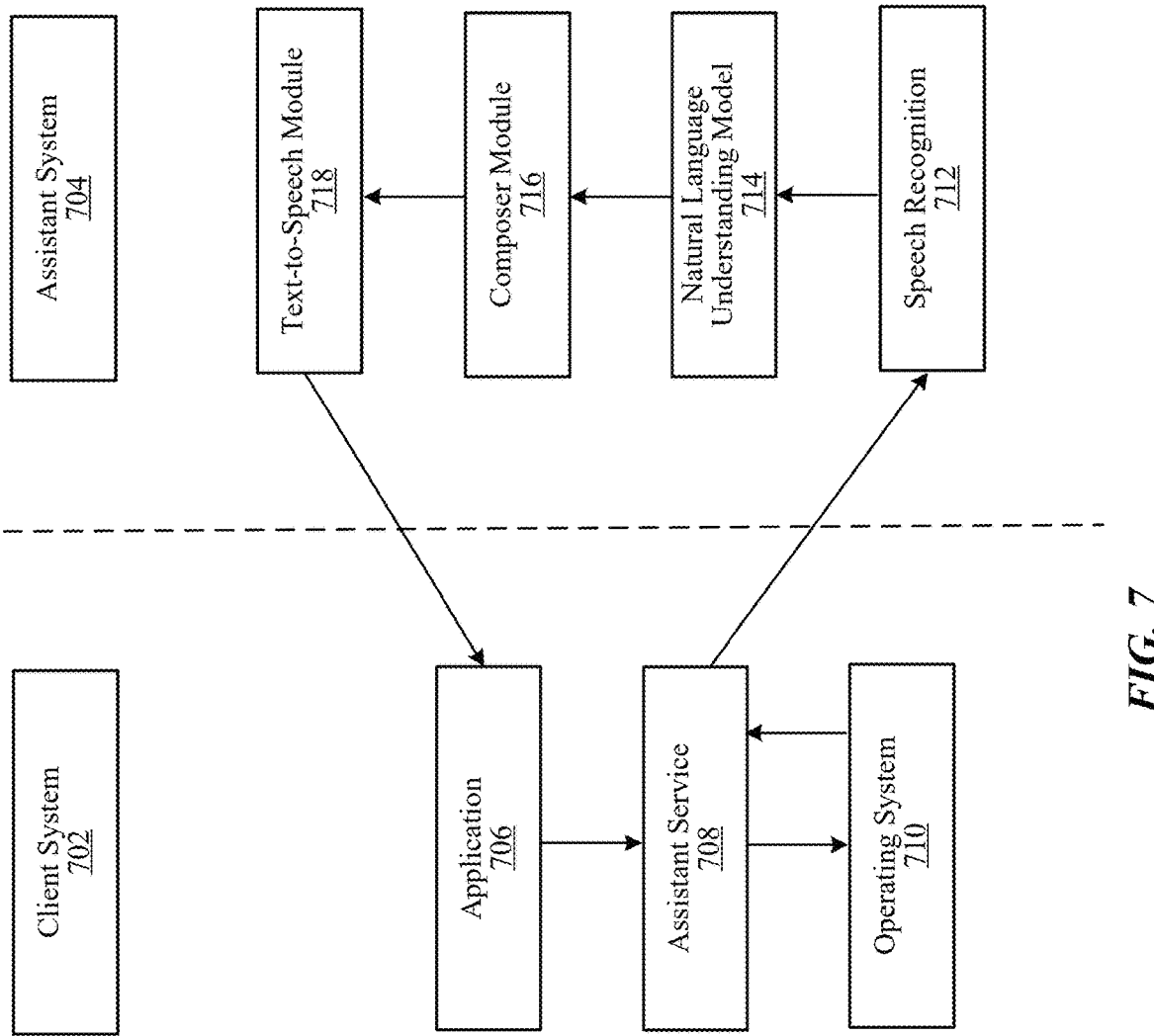
FIG. 7 illustrates an example flow diagram of processing an audio input.

FIG. 7 illustrates an example flow diagram of processing an audio input. In particular embodiments, a client system 702 (e.g., client system 130) may be embodied as a XR display device, such as an AR headset or a VR headset. In particular embodiments, the client system 702 may perform one or more processes as described herein. The client system 702 may interface the assistant system 704 (e.g., assistant system 140). In particular embodiments, the assistant system 704 may comprise one or more computing systems. In particular embodiments, the assistant system 704 may be embodied as an NLP tool to process audio inputs. In particular embodiments, the client system 702 may have an application 706 installed on it. The application 706 may be used to generate and render XR content (e.g., elements and/or environment). In particular embodiments the application 706 may specify one or more activation methods for triggering reception of audio inputs. As an example and not by way of limitation, a user may trigger an invocation model to place an NPC in an XR environment into a listening mode. In particular embodiments, the application 706 may send a request to the assistant service 708 to place one or more microphones of the client system 702 into a listening mode. In particular embodiments, the assistant service 708 may communicate with the operating system 710 to determine whether the application 706 has permission to access the microphone. In response to the operating system 710 determining that the application 706 has access, the operating system 710 may open access to the application 706. In particular embodiments, the application 706 may request to stream the audio inputs received to the assistant system 704 to process. In particular embodiments, the assistant system 704 may use an NLP tool to process any received audio inputs. In particular embodiments, the assistant service 708 may stream audio inputs received from one or more microphones of the client system 702 to the speech recognition model 712 of the assistant system 704. In particular embodiments, the speech recognition model 712 may transcribe the audio received to text. The speech recognition model 712 may send the transcribed text to the natural language understanding model 714. The NLU model may match the text to intent and extract entities for the slots. In particular embodiments, the NLU model 714 may send the results back to the application 706. In particular embodiments, the NLU model 714 may send the intents, slots, and entities to a dialog manager 716. The dialog manager 716 may resolve the intents and slots received from the NLU model. In particular embodiments, the assistant system 704 may perform a task or send instructions to execute a task to the client system 702. The dialog manager 716 may send instructions to the application 706 to perform a task based on the received intents, slots, and entities from the NLU model. In particular embodiments, the assistant system 704 may generate a result from processing the intents, slots, and entities from the NLU model 714 and render a response through the text-to-speech module 718. The response from the text-to-speech module 718 may send the response to the application 706 to output to the user of the client system 702. As an example and not by way of limitation, if the user asked an NPC in an XR environment associated with the application 706 "What do you have for sale?" the text-to-speech module 718 may generate a response going through this process and have the application 706 output the response, "I have baked goods for sale. Would you like to buy some?" In particular embodiments, the client system 702 may generate the response through the application 706 by receiving the intents, slots, and entities from the NLU model 714.

Figure 8:
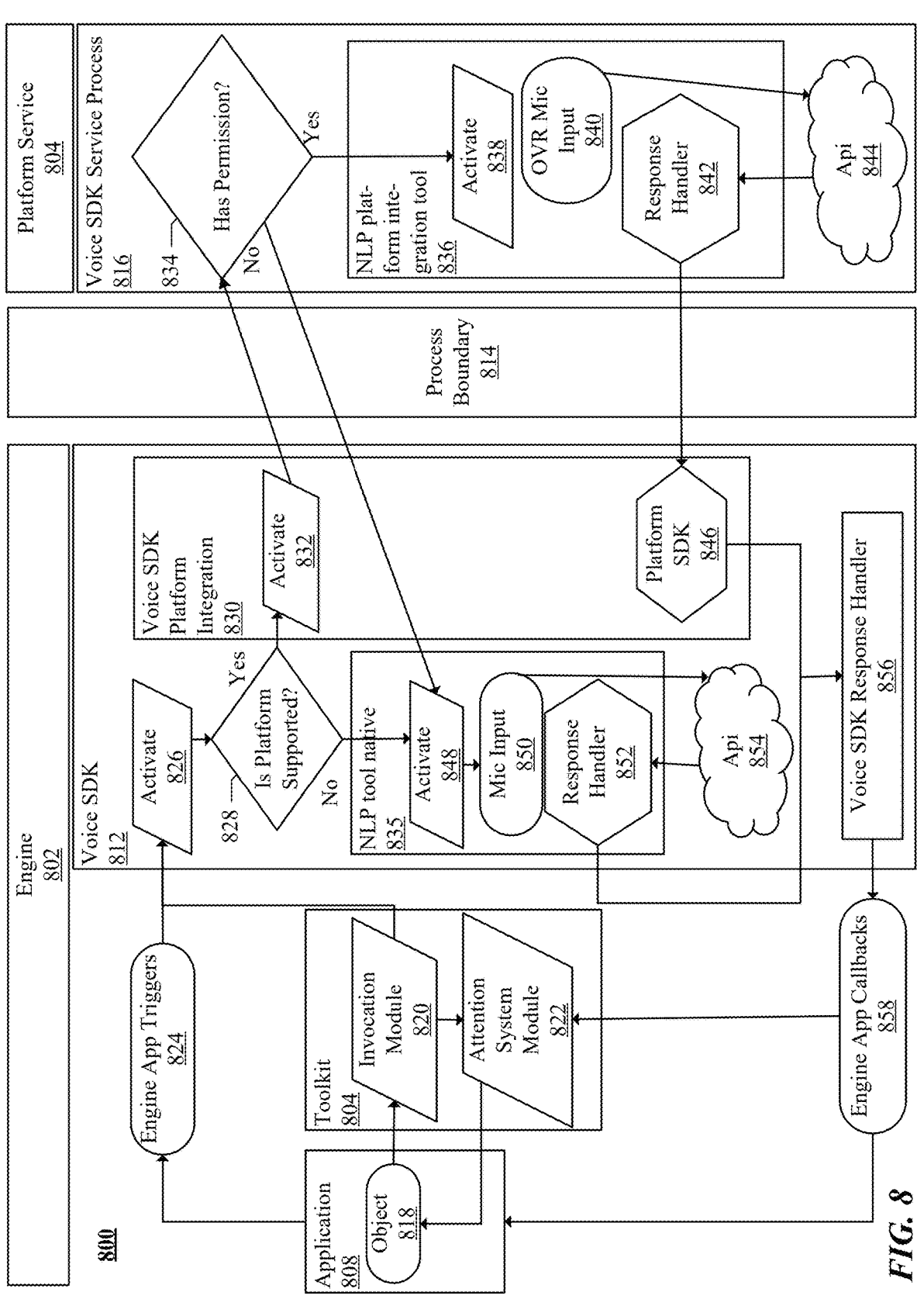
FIG. 8 illustrates an example architecture of a system to process a user input.

FIG. 8 illustrates an example architecture of a system 800 to process a user input. In particular embodiments, the system 800 may include an engine 802. The engine 802 can be embodied as a game engine. In particular embodiments the engine 802 may interact with the platform service 804 through a process boundary 814. In particular embodiments, the platform service 804 may be embodied as an assistant system 140. In particular embodiments, the engine 802 may include a toolkit 804, one or more applications 808, a voice SDK 812, engine application triggers 824, and engine application callbacks 858. In particular embodiments, the platform service 804 may include the voice SDK service process 816. In particular embodiments, the application 808 may initially render an XR environment or XR elements, such as object 818. In particular embodiments, the application 808 may determine the context of a user of the application 808. The application 808 may determine the context of the user with respect to one or more objects 818 within the XR environment. In particular embodiments, the application 808 may access a toolkit 804 to provide additional functionality to the XR environment. In particular embodiments, the object 818 may send information, such as location of the user with respect to the object 818, location of the object, context of the application 808, and the like to the invocation module 820. In particular embodiments, the invocation module 820 may determine whether to activate an attention system based on parameters (e.g., user gaze, distance, and the like) received from the object 818 and as described herein. In particular embodiments, if the invocation module 820 determines to activate an attention system, the invocation module 820 may send a request to the attention system module 822 to change an attention state of the object 818. In particular embodiments, the toolkit 804 may track and manage the attention systems and attention states of multiple objects 818 across different applications 808. In particular embodiments, the attention system module 822 may send instructions to the application 808 to render a different form of the object 818 to reflect a different attention state. As an example and not by way of limitation, if the object 818 is a virtual cat initially in a napping position. As a user of the application 808 approaches the object 818, the attention system module 822 may send instructions to the application 808 to render the virtual cat into a microphone on attention state, where the virtual cat can change into a sitting upright position. In particular embodiments, the application 808 may receive audio inputs from the user of the application 808. In response to receiving an audio input, the application 808 may send a signal to the engine application triggers 824 to process the audio input. In particular embodiments, the engine application triggers may specify certain conditions to trigger processing an audio input as described herein. As an example and not by way of limitation, the user of the application 808 may need to perform a gesture and then say an audio input. In particular embodiments, the engine application triggers 824 may send the audio input from the application 808 to the voice SDK 812. In particular embodiments, the voice SDK 812 determines whether to be activated at step 826 to process an audio input through signals received from the engine application triggers 824 and the toolkit 804.

In particular embodiments, the voice SDK 812 may use step 826 to determine to process an audio input. At step 828, the voice SDK 812 may determine whether or not the platform of the client system running the application 808 is supported. The voice SDK 812 may provide additional features to processing an audio input as described herein. As an example and not by way of limitation, the voice SDK 812 may quickly process audio inputs using customized on-device NLU models. In particular embodiments, if the voice SDK 812 determines that the platform is not supported, then the audio input may be sent to an NLP tool native 835. The NLP tool native may activate a microphone input 850 at step 848. The microphone input 850 may call on an API 854 to process the audio input. In particular embodiments, the API 854 may be to call on an NLP tool to process the audio input. In particular embodiments, the API 854 may send back the results of the NLP tool to the response handler 852. In particular embodiments, the response handler 852 may send the response to a voice SDK response handler 856. If the voice SDK 812 determines that the platform is supported 828, then the voice SDK platform integration 830 may be activated at step 832. In particular embodiments, only certain client systems may be equipped with the right hardware to implement certain features of the voice SDK. The audio input may be passed to the voice SDK service process 816 by the voice SDK integration 830 through the process boundary 814. The voice SDK service process 816 may determine whether the application 808 and/or the client system running the application 808 may have permission to use the voice SDK service process 816. If the application 808 and/or client system does not have permission, then the voice SDK service process 916 may pass the audio input back to the NLP tool native 835 to handle the audio input. In particular embodiments, if the voice SDK service process 816 determines that the application 808 and/or client system has permission, then the audio input gets passed to the NLP platform integration tool 836. In particular embodiments, the voice SDK service process 816 may activate the NLP platform integration tool 836 at step 838. The audio input may be passed to an OVR microphone input 840. The OVR microphone input 840 may pass the audio input to an API 844. In particular embodiments, the API 844 may call an NLP tool to process the audio input. In particular embodiments, the result of the NLP tool may be passed to a response handler 842 of the NLP platform integration tool 836. In particular embodiments, the response handler 842 may send the response through the process boundary 814 to the platform SDK 846 of the voice SDK platform integration 830. In particular embodiments, the results of the response handler 852 and the platform SDK 846 may be sent to the voice SDK response handler 856. In particular embodiments, the voice SDK response handler 856 may generate a response to send back to the application 808 or the toolkit 804. In particular embodiments, the voice SDK response handler 856 may send a response to the engine application callbacks 858 that may activate the attention system module 822 or the application 808 as needed. As an example and not by way of limitation, if the user of the application 808 had called out an NPC in the XR environment, the voice SDK response handler 856 may determine to change an attention state of the NPC using the attention system module 822 and to render a response to the user through the application 808. The engine application callbacks 858 may call both the toolkit and the application 808.

FIG. 9 illustrates an example method 900 for processing an audio input. A client system 130 embodied as an augmented reality headset or virtual reality headset may perform the method 900. The method may begin at step 910, where the client system may receive a user input to place the client system into a listening mode. At step 920, the client system may receive a multimodal input comprising (1) an audio input comprising a voice command and (2) a gesture input corresponding to the voice command. At step 930, the client system may process, using a natural-language model, the audio input to identify one or more intents and one or more entities associated with the voice command. At step 940, client system may determine a gesture performed based on the gesture input. At step 950, client system may execute an action based on the identified one or more intents, the identified one or more entities, and the gesture. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for processing an audio input including the particular steps of the method of FIG. 9, this disclosure contemplates any suitable method for processing an audio input including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
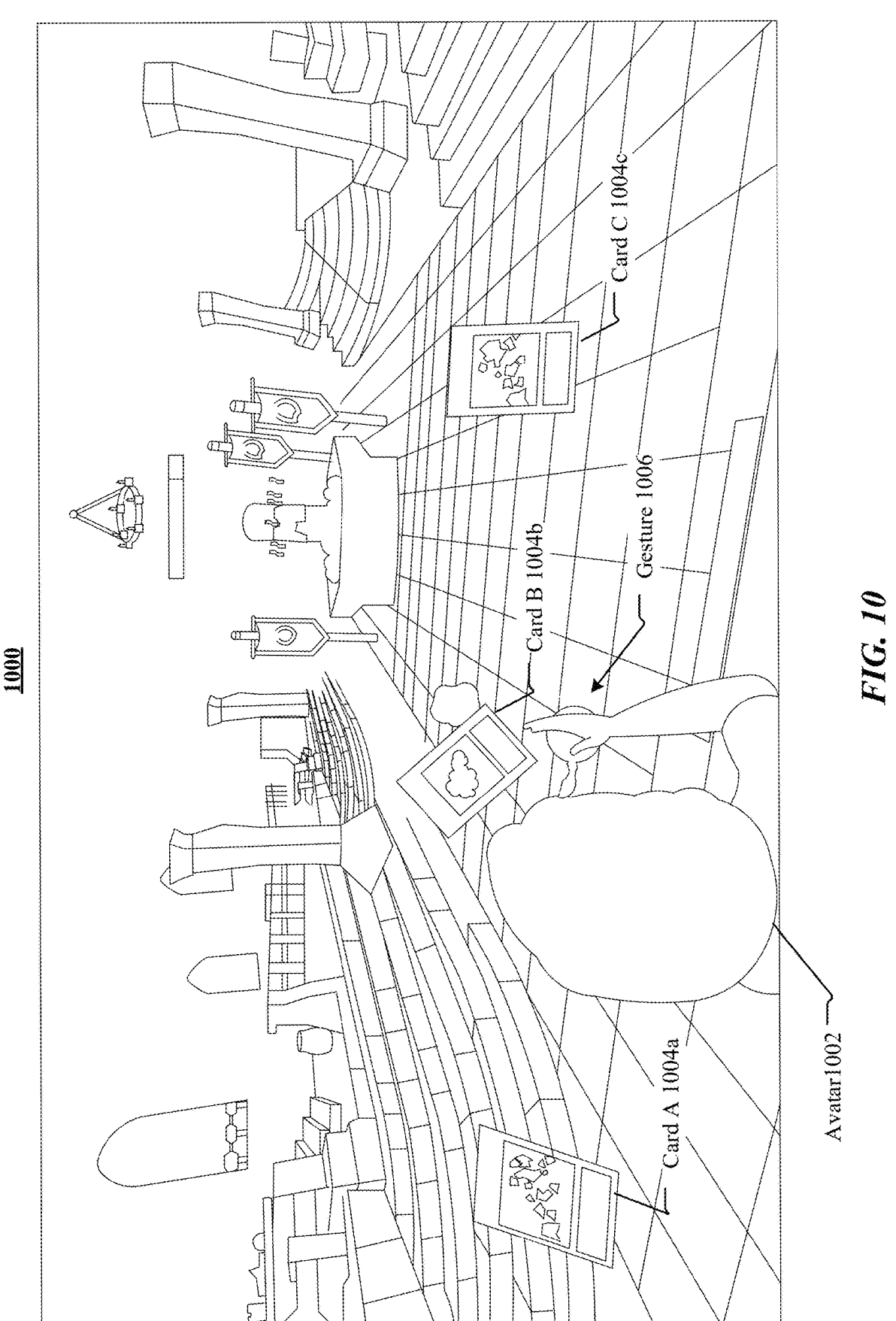
FIG. 10 illustrates an example extended reality (XR) environment of an application.

FIG. 10 illustrates an example XR environment 1000 of an application. In particular embodiments, the XR environment 1000 may represent a wizard dueling game application environment. In particular embodiments, the user represented by the avatar 1002 may be one competitor in the game application. In particular embodiments, the client system (e.g., XR display device) that is rendering the environment 1000 may process audio inputs and other inputs from the user to generate and render elements 1004a-1004c of the environment 1000. In particular embodiments, the user may be required to perform a gesture 1006 to place one or more microphones of the client system into a listening mode to receive an audio input to perform one or more tasks. As an example and not by way of limitation, to conjure a spell, the user may need to perform the gesture 1006 to initiate a listening mode of the microphones of the client system. The gesture 1006 may be reflected by the avatar 1002. The user may then say an audio input to conjure a spell. The application may process the audio input using a voice SDK to determine whether the audio input comprises a voice command as described herein. The application may process the audio input and render an effect as a result of processing the audio input. In particular embodiments, the user may wish to perform a card spell. The user may perform the gesture 1006 and say an audio input that includes a voice command to perform the card spell. As a result, the application may render the elements 1004a-1004c to reflect the successful casting of the card spell. In particular embodiments, the user may need to perform the gesture while simultaneously saying the voice command to perform the card spell. In particular embodiments, the application may require the user to input one or more inputs (in a sequence or simultaneously) to perform a voice command.

FIG. 11 illustrates an example method 1100 for processing a voice command. A client system 130 embodied as an augmented reality headset, virtual reality headset, or extended reality headset may perform the method 1100. The method may begin at step 1110, where the client system may receive a gesture-based input from a first user of the client system. At step 1120, the client system may process, using a gesture-detection model, the gesture-based input to identify a first gesture. At step 1130, the client system may receive an audio input from the first user. In particular embodiments, the audio input comprises a first voice command. At step 1140, client system may process, using a natural-language model, the audio input to identify one or more intents or one or more slots associated with the first voice command. At step 1150, client system may determine whether the identified first gesture matches the first voice command. At step 1160, client system may execute, responsive to the identified first gesture matching the first voice command and by the XR display device, a first task corresponding to the first voice command based on the identified first gesture and the identified one or more intents or one or more slots. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for processing a voice command including the particular steps of the method of FIG. 11, this disclosure contemplates any suitable method for processing a voice command including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Attention System

In particular embodiments, a client system may implement voice commands within an XR environment via a voice SDK, which allows XR applications to easily integrate voice commands on XR devices (e.g., the client system). In particular embodiments, a client system may implement an attention system to provide audio-visual cues to a microphone status in XR environments. There are sometimes issues with users identifying and understanding which entities/objects are interactable by voice within an XR environment. Additionally, users sometimes are not knowledgeable on what voice commands are available to them for certain contexts, such as for assistant experiences on voice-forward and voice-only devices and immersive in-app experiences in XR. To help the user distinguish which objects are interactable via voice command, an attention system may be used to provide audio-visual cues that let users know various attention states of a XR object, such as when the XR object is ready to receive a voice command, when the microphone is active, and when the system is processing the voice command.

In particular embodiments, the attention system may use design components provided by the voice SDK, which may allow third-party application developers to easily incorporate the attention system design into their application. The attention system may be maintained by the XR system using a toolkit that includes an attention system module and invocation module. The toolkit may integrate with the voice SDK. The attention system may be object-based, so each object may have its own attention state, which may be indicated visually (e.g., with an icon over the XR object). As an example, each game object in an VR environment, such as an interactable VR dog and an interactable VR cat, may have its own attention state and corresponding audio-visual cues. The voice SDK may include pre-built design components that allow objects to indicate a change in attention state in response to user interactions (e.g., voice, gesture, gaze, movement, inputs) or application events to indicate, for example, that voice commands can be user to interact with that object, that the system is processing a prior voice command, or that the object is responding. The pre-build design components may include an invocation module, manipulation module, voice-search module, and response module. The invocation module may provide predefined invocation methods including UI affordance, activation zone (with distance tolerance), gaze, time based, gesture, or custom wake word. The invocation module may be used to determine whether to activate the attention system and change an attention state indicator for an object. As an example and not by way of limitation, an attention system may be activated (e.g., audio-visual cues may indicate an active attention state for the object) when a user is within a threshold distance (i.e., activation zone indicates the threshold distance to activate the attention system). The manipulation module may pack basic manipulation voice commands together so application developers can easily apply this module to an existing object within an application. The voice-search module may enable a user to use their voice to find the match data. As an example and not by way of limitation, the user may perform a search within an XR environment using the voice-search module. The response module may allow developers to dynamically register different intents on different objects and return simplified response callbacks.

In particular embodiments, the attention system may provide audio-visual cues to indicate to users the system's current state for receiving voice inputs, on an object-by-object basis, for each XR object within an environment. The understanding of the current attention state may be both at a system-level and an object-level. The attention system may provide audio-visual feedback (i.e., attention state indicators) as to how the user's voice commands are received, including reducing the perception of latency, responding to errors, and indicating that the system is receiving audio input. The attention state indicators may also help users know when the microphone is "active" and "listening", so the users don't feel as if the system is spying on them. The attention state indicators may include visual and/or audio indicators (e.g., highlight, icons, audio feedback, earcons) to indicate the status of the system with respect to a particular XR object. The attention state may include MicOff, MicOn, Listening, Response, and Error. During a MicOff state, the microphone may be closed and voice service may be inactive with respect to a particular XR object. The voice service may be used by the attention system to process any received audio input. When the microphone states change to the MicOff state, the voice service may fire a one-time event. During a MicOn state, the microphone may be open and voice service may become active with respect to a particular XR object. When the microphone states change to the MicOn state, the voice service may fire a one-time event. The MicOn state may be activated for a system-level or object-level attention system based on the invocation module. During a Listening state, the voice service may be listening for user input with respect to a particular XR object. This listening may be a continuous event. The Listening state may pass back the listening data, which includes the microphone level and transcription. During the Response state, the voice service may pass back the [NLUResponseData] which includes the timing and response content, which may be rendered with respect to with the particular XR object the user directed a voice input toward. During the Error state, the voice service may pass back [ErrorData] which may include timing and response content with respect to the particular XR object the user directed a voice input toward. There may be match and non-match indicators to indicate when an XR object in an application understands a user input vs. not understanding the user input (but still provides a response). The match and non-match indicators can further indicate to the user whether the user may need to provide another user input for instance when the XR object does not understand the user input. An instance, in a VR adventure game, where a virtual NPC does not understand a user input may be when the user asks the particular NPC a question that the NPC is not equipped to handle (e.g., does not understand the intents or slots associated with a user input).

In particular embodiments, the attention system may use visual and/or audio feedback to indicate the attention state. Application developers may use visual cues to map with the attention system states to visually guide users to know when their microphone is on/off and when the attention system is ready to receive voice inputs. By visually clarifying when the user is able to input a voice input, the user can more clearly understand when they are able to speak. Additionally, the attention system may also provide visual and/or audio feedback to indicate whether the attention system of an object understands the user input. The indication of whether an object (e.g., an NPC) understands a user input can provide clarity on whether the object is able to properly respond to a user input. The voice SDK can provide a variety of pre-built visual effects that can be applied in the XR environment or used to modify XR objects within the application environment. As an example and not by way of limitation, an XR object that has an active attention system (e.g., in a Listening state) may have a glow surrounding the XR object. Application developers may also use audio feedback (e.g., tones, earcons, other audio feedback) alone or in conjunction with visual feedback to indicate the microphone status. In certain instances, the audio feedback alone can be provided to maintain immersion. The voice SDK can provide a pre-built set of custom crafted earcon sounds that application developers may use.

In particular embodiments, a user-education module may be used to help application developers teach users how to use their application. In particular, the user-education module may help with showing users how and when to use certain voice commands. The user-education module may provide contextual tips for the user based on user context or application state to show the user what voice commands are available at that point. The user-education module may be separated into different categories (e.g., move objects, order attacks, cast spells, navigation, or actions). The voice inputs can be separated into different types of voice inputs, such as commands or questions. The user-education module may implement a dictionary that the user can access to pull up a list of all available voice commands. The user-education module may have a help hub where the user can ask specific questions on how to perform voice commands. As an example, for a wizard dueling application, the user can ask "Hey Assistant, how do I cast the 'fireball' spell?" The help hub may be customized by the developer based on the application. As an example and not by way of limitation, for a fantasy game application, the help hub may be customized to be rendered as a spellbook. Similarly to objects having their own attention system, each object may also have their own respective user education module.

In particular embodiments, the user-education module may differentiate between users based on characteristics. As an example and not by way of limitation, the user-education module may differentiate between new users and returning users. New users may have different needs with respect to user education in comparison to returning users. As such, the user-education module may provide different user education mechanisms for the different users. As an example for a new user, the user may be provided a guided walkthrough, app landing, embedded tips, and voice dictionary pop-up. As example for a returning user, the user may be provided non-embedded tip, voice dictionary, voice dictionary pop-up, and voice search.

In particular embodiments, the attention system may use one or more characteristics of an XR assistant to generate motion and audio cues that are more animated and/or realistic to convey response and emotions. More information on rendering one or more displays of an XR display device may be found in U.S. patent application Ser. No. 17/877,568, filed 29 Jul. 2022, which is incorporated by reference.

In particular embodiments, the assistant system 140 may present different attention states or attention substates to a use in an XR context. In particular embodiments, the attention system may utilize the assistant system to present different attention states or attention substates. More information on presenting different attention states or attention substates to a user may be found in U.S. patent application Ser. No. 17/934,898, filed 23 Sep. 2022, which is incorporated by reference.

In particular embodiments, a client system may be embodied as an XR display device. In particular embodiments, the XR display device may render, for one or more displays of the XR display device, a first output image of an XR object within an XR environment in field of view (FOV) of a first user. As an example and not by way of limitation, the XR display device may render a virtual statue to be displayed in the first output image to the first user. In particular embodiments, the XR object may be interactable by the first user. As an example and not by way of limitation, the first user may be able manipulate the XR object, such as drawing on a virtual statue. In particular embodiments, the XR object may have a first form. As an example and not by way of limitation, the XR object may be rendered to appear as a cat laying down. Although this disclosure describes rendering a first output image of an XR object in a particular manner, this disclosure contemplates rendering a first output image of an XR object in any suitable manner.

In particular embodiments, the XR display device may detect a change in a context of the first user with respect to the XR object. As an example and not by way of limitation, the XR display device may detect the user approaching the XR object. In particular embodiments, the XR display device may use an invocation module to detect a change in the context of the first user with respect to the XR object. The invocation module may use one or more of UI affordance, activation zone (distance tolerance), gaze, time based, gesture, or custom wake word to detect the change in context of the first user. Although this disclosure describes detecting a change in a context of the first user in a particular manner, this disclosure contemplates detecting a change in a context of the first user in any suitable manner.

In particular embodiments, the XR display device may determine whether to invoke an attention system with respect to the XR object. In particular embodiments, the XR display device may determine whether to invoke the attention system with respect to the XR object based on the detected change in the context of the first user. As an example and not by way of limitation, the XR display device may detect that the change in context causes an invocation module to invoke the attention system of an XR object. Although this disclosure describes determining whether to invoke an attention system in a particular manner, this disclosure contemplates determining whether to invoke an attention system in any suitable manner.

In particular embodiments, the XR display device may render a second output image of the XR object responsive to invoking the attention system. In particular embodiments, the XR display device may render a second output image of the XR object for the one or more displays of the XR display device. In particular embodiments, the XR object may be morphed to have a second form indicating a first attention state. The first attention state may indicate a status of the XR object to interact with one or more first voice commands for one or more first functions enabled by the XR display device. As an example and not by way of limitation, if the XR object in its first form is a virtual cat that is laying down, the XR object in its second form may be a virtual cat that is sitting up and looking at the first user. In particular embodiments, the XR display device may render an audio feedback indicative of the XR object morphing to the second form for one or more speakers of the XR display device. The audio feedback may correlate to the XR object or may be a general alert sound. As an example and not by way of limitation, for a virtual cat, the audio feedback may be the virtual cat meowing as it changes to the second form. In particular embodiments, the second output image may comprise an indication identifying the first attention state. As an example and not by way of limitation, the indication may be an open microphone icon to indicate the attention state is in a microphone on state. Although this disclosure describes rendering a second output image of the XR object in a particular manner, this disclosure contemplates rendering a second output image of the XR object in any suitable manner.

In particular embodiments, the first attention state may comprise one or more of a microphone on state, a microphone off state, a listening state, a response state, an error state, and other states. In particular embodiments, the microphone on state may indicate the XR object is active and is ready to interact with the first user. As an example and not by way of limitation, the microphone on state may cause the XR object to appear in an active state, such as a virtual cat sitting up. There may be a virtual open microphone icon appearing near the virtual cat to indicate the microphone on state. In particular embodiments, the microphone off state may indicate the XR object is not active and is not ready to interact with the first user. As an example and not by way of limitation, if the XR object is a virtual dog, the virtual dog may be laying down to represent the microphone off state attention state. In particular embodiments, the listening state may indicate the XR object may be in a continuous state of receiving audio inputs from the first user. As an example and not by way of limitation, if the XR object is in a virtual dog, then the virtual dog may be in a upright listening position to represent the listening state attention state. In particular embodiments, the response state may indicate the XR object is in a state of outputting a response to the first user. As an example and not by way of limitation, if the XR object is an NPC, then the NPC may output audible and visible dialog to respond to the first user. In particular embodiments, the error state may indicate the XR object is unable to understand a received input from the first user. As an example and not by way of limitation, if the XR object is a virtual dog, then the virtual dog may be in an inquisitive state to represent the error state attention state. Although this disclosure describes attention states in a particular manner, this disclosure contemplates attention states in any suitable manner.

In particular embodiments, the XR display device may receive an audio input comprising a first voice command by one or more microphones of the XR display device. In particular embodiments, the XR display device may process, using a natural-language understanding (NLU) model, the audio input to identify one or more intents or one or more slots associated with the first voice command. In particular embodiments, the XR display device may execute the first task corresponding to the first voice command based on the identified one or more intents or one or more slots. Although this disclosure describes receiving an audio input in a particular manner, this disclosure contemplates receiving an audio input in any suitable manner.

In particular embodiments, the XR display device may render, for one or more displays of the XR display device, a user interface overlay in the FOV of the first user. In particular embodiments, the user interface overlay may comprise a search capability to search for the one or more first voice commands for the one or more first functions enabled by the XR display device. As an example and not by way of limitation, the user interface overlay may be a voice search interface. In particular embodiments, the one or more first voice commands may be categorized in a plurality of different categories. The different categories may comprise one or more of avatar movement, avatar actions, object movement, object actions, application settings, or system settings. In particular embodiments, the user interface overlay may comprise one or more activatable user interface elements that may be selectable to search one or more categories of voice commands. In particular embodiments, the first voice commands may be labeled as one type of a plurality of types, wherein the different types may be commands or queries. In particular embodiments, the one or more first voice commands available for search may be based on a characteristic of the first user. As an example and not by way of limitation, the characteristic of the first user may comprise a user's experience with an application (e.g., returning user vs. new user), user's age, user's preferred language, and the like. The voice commands available for a returning user may be different from the voice commands available to a new user. In particular embodiments, the one or more first voice commands available for search may be categorized based on one or more XR objects in the XR environment. As an example and not by way of limitation, the voice commands may be categorized for a first user to select voice commands corresponding to different XR objects in the XR environment. In particular embodiments, the user interface overlay may comprise a help hub to receive one or more queries from the first user. In particular embodiments, the user interface overlay may comprise an index of the one or more first voice commands.

FIG. 12 illustrates example indications of an attention state of an object. In particular embodiments, an application of a client system may render an XR environment. The XR environment may include a plurality of XR objects. For the interactable XR objects, an indicator of the attention state may be presented in conjunction with the interactable XR objects to provide an indication that the user of the application may interact with specific objects. In particular embodiments, the attention state indicators may include a microphone off attention state indicator 1202, a microphone on attention state indicator 1204, listening attention state indicator 1206, an error attention state indicator 1208, a response attention state indicator 1210, a mismatched understanding attention state indicator 1212, and a matched understanding attention state indicator 1214. In particular embodiments, one or more attention state indicators may be presented simultaneously for one or more XR objects. As an example and not by way of limitation, an XR object may have a response attention state indicator 1210 and listening attention state indicator 1206 displayed at the same time. In particular embodiments, the application may determine where to render the attention state indicators for each interactable XR object.

Figure 13:
FIG. 13 illustrates an example XR environment containing an attention system.

FIG. 13 illustrates an example XR environment 1300 containing an attention system. In particular embodiments, the environment 1300 may represent a rendered XR environment for a game application on a client system. In particular embodiments, images may be rendered to one or more displays of the client system to output to a user. In particular embodiments, the environment 1300 may include interactable XR objects 1302, 1304. In particular embodiments, the XR object 1302 may be a stone heading and the XR object 1304 may be a door. In particular embodiments, the XR object 1302 may include text 1306. In particular embodiments, the text 1306 may be text the user needs to say to open the door 1304. In particular embodiments, the XR object 1304 may include an indicator 1308. In particular embodiments, the attention state of the XR object may change when the user approaches the XR object. The developers of the game application may specify one or more invocation methods. As an example and not by way of limitation, the XR object 1302 may invoke an attention system may a user approaches the XR object 1302 within a threshold distance (e.g., three meters). In particular embodiments, the attention state of the XR object 1302 may be reflected by a change in color of the XR object. Additionally, an attention state indicator as described herein may be shown in with the XR object. In particular embodiments, the indicator 1308 may be an attention state indicator. In particular embodiments, the indicator 1308 may specify instructions 1310 for the user to follow to proceed. As an example and not by way of limitation, as illustrated in FIG. 13, the instructions 1310 may instruct the user to "try saying the magic words!", which are inscribed above the virtual door as "lorem ipsum dolor sit amet". Once an audio input is received, the application may process the audio input as described herein. As an example and not by way of limitation, the application may use the voice SDK to process the audio input. In particular embodiments, once the user says the correct audio input to perform a voice command to open the door 1304, the environment 1300 may change to reflect the processed voice command.

Figures 14A, 14B:
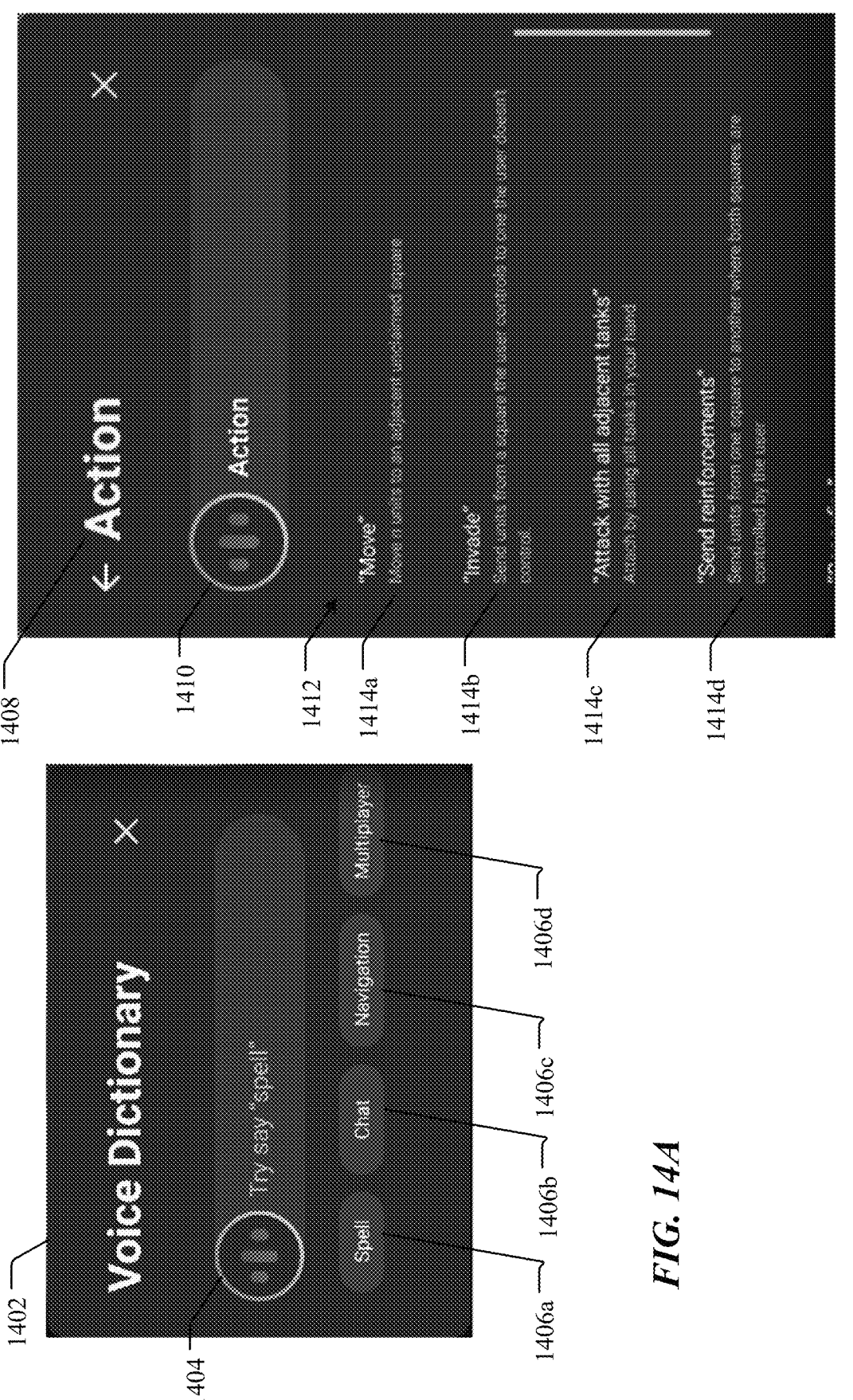
FIGS. 14A-14B illustrate example user interfaces used for a voice dictionary.

FIGS. 14A-14B illustrate example user interfaces 1402, 1408 of a voice dictionary. In particular embodiments, a voice SDK may provide the functionality to quickly search an application for voice commands that are available to the user as described herein. In particular embodiments, the user interface 1402 may include an instruction 1404 to the user to specify a search term. In particular embodiments, the user interface 1402 may also include one or more activatable user interface elements 1406a-1406d that includes search terms corresponding to categories of voice commands available for the user to search. In particular embodiments, the user may specify an action category of voice commands to search and the user interface 1402 may change to the user interface 1408. In particular embodiments, the user interface 1408 may include a category 1410 and a list 1412 of actions 1414a-1414d available for the user. In particular embodiments, the voice dictionary user interfaces 1402, 1408 may show what voice commands the user can perform. In particular embodiments, there may be other user interfaces that the application may render in conjunction with a voice SDK to provide user education. As an example and not by way of limitation, the application may also render a FAQ user interface for user review.

FIG. 15 illustrates an example method 1500 for invoking an attention system of an XR object. A client system 130 embodied as an augmented reality headset, virtual reality headset, or extended reality headset may perform the method 1500. The method may begin at step 1510, where the client system may render, for one or more displays of the client system, a first output image of an XR object within an XR environment in a field of view (FOV) of a first user. In particular embodiments, the XR object may be interactable by the first user. In particular embodiments, the XR object may have a first form. At step 1520, the client system may detect a change in a context of the first user with respect to the XR object. At step 1530, the client system may determine, based on the detected change in the context of the first user, whether to invoke an attention system with respect to the XR object. At step 1540, client system may render, for the one or more displays of the client system, a second output image of the XR object responsive to invoking the attention system. In particular embodiments, the XR object is morphed to have a second form indicating a first attention state. In particular embodiments, the first attention state indicates a status of the XR object to interact with one or more first voice commands for one or more first functions enabled by the client system. Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates an example method for invoking an attention system including the particular steps of the method of FIG. 15, this disclosure contemplates any suitable method for invoking an attention system including any suitable steps, which may include all, some, or none of the steps of the method of FIG. 15, where appropriate. Furthermore, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

On-Device Natural Language Understanding Models

In particular embodiments, a client system may implement voice commands within an XR environment via a voice SDK, which allows XR applications to easily integrate voice commands on XR devices (e.g., the client system). The client system may use a customized on-device natural-language understanding (NLU) models to process voice inputs. Using voice commands in certain XR apps may have issues, such as latency caused by having to send the audio file to a server, process it, and then get a response. Even latency of a few hundred microseconds can be too slow to make certain voice commands usable for particular apps (e.g., most action-based games). As an example and not by way of limitation, for a fast-paced action-based game, a user may request to call in an in-game action to be performed in the middle of an in-game environment. The user may expect to have the in-game action be performed within a reasonable time period (e.g., a few milliseconds). To reduce the latency of processing voice commands for certain situations, the voice SDK may enable app developers to add certain voice interactions onto a customized on-device NLU model for the application so the voice commands may be executed quicker. The voice SDK may enable the voice interactions in applications by using a pattern recognizer that identifies certain phrases that are expected for certain situations.

In particular embodiments, the system implementing the voice SDK (e.g., any assistant-enabled system, such as a smartphone, XR device, smart glasses, etc.) may use customized hardware to store the customized on-device NLU models to process voice inputs. In particular embodiments, the developers may identify certain systems (e.g., particular smartphones or XR devices, etc.) that are equipped and enabled to use customized on-device NLU models for their respective applications. As an example and not by way of limitation, certain devices may not have the processing capability to run an immersive VR environment as well as quickly process voice inputs in real-time. Certain functionality may be reduced for certain systems based on their technical specifications. As an example and not by way of limitation, for smaller devices with less processing power, the developers may identify a subset of voice commands of the total amount of voice commands accessible to the typical user of their application to be enabled for the corresponding smaller devices.

In particular embodiments, application developers can use natural-language processing (NLP) tool to train customized NLU models for their respective applications. By training customized NLU models, the developers can enable voice commands that are executed quickly for their applications. The developers may provide information on a specified voice input and the intents and slots that should correspond to that voice input. The customized NLU model may then be created and stored server-side and downloaded onto the client device when the respective application is installed. The customized NLU model may be trained to bypass the wake word and respond directly to particular words/commands. That is voice inputs other than a wake word may be recognized and trigger in-app actions responsive to the customized on-device NLU model. As an example and not by way of limitation, for a wizard dueling game, voice inputs may trigger certain "spell casting" in-game actions. Application developers may enable an overall set of tasks with voice commands. There may be a subset of tasks set up as normal to be executed via the normal assistant stack (i.e., server-side). There may also be another subset of tasks set up with a customized, compact, on-device NLU model, which enables this subset of tasks to be executed completely on the client device with minimal latency. During runtime, the system may load up a component corresponding to any application that is currently running so that the application may have its customized on-device NLU model ready to process any voice inputs.

In particular embodiments, a dual pipeline may be used to process voice inputs (i.e., dual=client-side and server-side). A subset of quick commands may be recognized by a customized NLU model in parallel with the existing wake word module. The dual pipeline may use a customized on-device NLU model trained to initially detect trigger words based on a pattern-recognition model, where the customized on-device NLU model may use a buffer to receive the entire voice input. The pattern-recognition model may be used to perform a corresponding action based on the identified voice input. As an example and not by way of limitation, the user may say "call in an airstrike at [in-game location]" where the pattern recognizer would identify the voice command the user is attempting to use out of a plurality of possible voice commands. In particular embodiments, the dual pipeline may process each voice input so that a customized on-device NLU model may initially process a voice input in parallel with a server-side process on the assistant backend. After receiving the result from the server-side process, the system (e.g., client system) may use the result from the server-side process to confirm or update the execution of any voice commands corresponding to the voice input. As an example and not by way of limitation, if within an application a voice command initially triggered a spell casting effect from being processed by a customized on-device NLU model, but an assistant backend resulted in a different voice command, then the client system may revise the execution of the response to a voice input. In this instance, a voice input may initially generate a visual effect for the user to see and then the visual effect may transition to a null state or a different state when the initially perceived action is not the intended action. These visual effects may be specified by the developers for each specific in-game action, but the voice SDK enables the ability to apply a corrective action to an in-game action by revising the execution of the response to a voice input.

In particular embodiments, a threshold confidence score for the customized on-device NLU model to trigger an in-game action based on a voice input may be lower than a confidence score required by a server-side process to perform the same in-game action. The processing being done by the customized on-device NLU model may be quicker than the processing done by the server-side process, but the results may be less accurate because of the lower threshold confidence score required to trigger an in-game action. However, by using the server-side process as confirmation step and the customized on-device NLU model for the initial processing, the dual pipeline may reduce any perceived latency of using the server-side process to confirm the action taken is the action intended by the user. The confidence score may be adjusted for certain contexts. As an example and not by way of limitation, a specific voice command may be expected to be used frequently for a specific in-game scenario, and the customized on-device NLU model may use the context of the application to assign a higher confidence score to trigger the specific voice command. In addition to being able to execute voice commands more quickly, the utilization of a customized on-device NLU model for an application may improve upon user privacy and security by filtering out more voice inputs to determine whether the voice input is necessary to be processed by the server-side process.

In particular embodiments, one or more client systems may receive a first audio input comprising a first voice command of a first plurality of voice commands associated with a first application. In particular embodiments, the one or more client systems may receive the first audio input by one or more microphones of the one or more client systems. In particular embodiments, the first audio input may not comprise a wake-word (i.e., the audio input does not have a wake-word). In particular embodiments, the first plurality of voice commands may comprise a first set of commands executable by a customized on-device natural language understanding (NLU) model installed on the one or more client systems and a second set of commands executable by a server-side assistant system. In particular embodiments, the customized on-device NLU model installed on the one or more client systems may correspond to the first application. As an example and not by way of limitation, each application may have a respective customized on-device NLU model that is generated by the respective application developer. In particular embodiments, the one or more client systems may receive, by the one or more microphones of the one or more client systems, a second audio input comprising a second voice command of a second plurality of voice commands associated with a second application. In particular embodiments, the second plurality of voice commands may comprise a third set of commands executable by a second customized on-device natural language understanding (NLU) model installed on the one or more client systems and a fourth set of commands executable by the server-side assistant system. Although this disclosure describes receiving an audio input in a particular manner, this disclosure contemplates receiving an audio input in any suitable manner.

In particular embodiments, the one or more client systems may process the first audio input to determine the first voice command is associated with the first set of voice commands of the first plurality of voice commands. In particular embodiments, the one or more client systems may process the first audio input using the customized on-device NLU model installed on the one or more client systems. In particular embodiments, the customized on-device NLU model may be a pattern recognition model. In particular embodiments, the one or more client systems may process the second audio input to determine the second voice command is associated with the third set of voice commands of the second plurality of voice commands. In particular embodiments, the one or more client systems may process the second audio input using the second customized on-device NLU model installed on the one or more client systems. Although this disclosure describes processing an audio input in a particular manner, this disclosure contemplates processing an audio input in any suitable manner.

In particular embodiments, the one or more client systems may execute a first task corresponding to the first voice command responsive to the first audio input. In particular embodiments, the one or more client systems may execute the first task by the first application. In particular embodiments, the one or more client systems may render, by one or more display of the one or more client systems and responsive to executing the first task, a visual effect corresponding to the first task. In particular embodiments, the one or more client systems may execute, by the second application, a second task corresponding to the second voice command responsive to the second audio input. Although this disclosure describes executing a task in a particular manner, this disclosure contemplates executing a task in any suitable manner.

In particular embodiments, the one or more client systems may send the first audio input to the server-side assistant system. The first audio input may be processed by an NLU model of the server-side assistant system to determine the first voice command is associated with the first set of voice commands of the first plurality of voice commands. In particular embodiments, the one or more client systems may receive, from the server-side assistant system, a confirmation that the first voice command is associated with the first set of voice commands. In particular embodiments, executing the first task corresponding to the first voice command is further responsive to receiving the confirmation. In particular embodiments, the one or more client systems may send the second audio input to the server-side assistant system. In particular embodiments, the server-side assistant system may process the second audio input by an NLU model of the server-side assistant system to determine the second voice command is associated with the third set of voice commands of the second plurality of voice commands. In particular embodiments, the one or more client systems may receive an indication that the second audio input is associated with the fourth set of voice commands of the second plurality of voice commands from the server-side assistant system. In particular embodiments, the one or more client systems may cancel, responsive to receiving the indication, the execution of the second task corresponding to the second voice command. As an example and not by way of limitation, if the second application was generating a visual effect of a fireball, then the second application may cancel the visual effect responsive to receiving the indication. In particular embodiments, the one or more client systems may terminate a visual effect corresponding to the second task responsive to receiving the indication that the second audio input is associated with the fourth set of voice commands of the second plurality of voice commands. Although this disclosure describes sending an audio input to a server-side assistant system in a particular manner, this disclosure describes sending an audio input to a server-side assistant system in any suitable manner.

In particular embodiments, the one or more client systems may determine a first confidence score for the customized on-device NLU model to match the first audio input to the first voice command. In particular embodiments, the first task may be executed responsive to determining the first confidence score exceeds the first threshold confidence score. In particular embodiments, the server-side assistant system may determine a second confidence score for the NLU model of the server-side assistant system to match the second audio input to the second voice command using the NLU model of the server-side assistant system. In particular embodiments, the one or more client systems may receive an indication that the second audio input fails to match the second voice command responsive to the second confidence score falling below a second threshold confidence score. In particular embodiments, the second threshold confidence score is higher than the first threshold score. In particular embodiments, the one or more client systems may receive a confirmation that the second audio input matches the second voice command responsive to the second confidence score exceeding a threshold confidence score.

Figure 16:
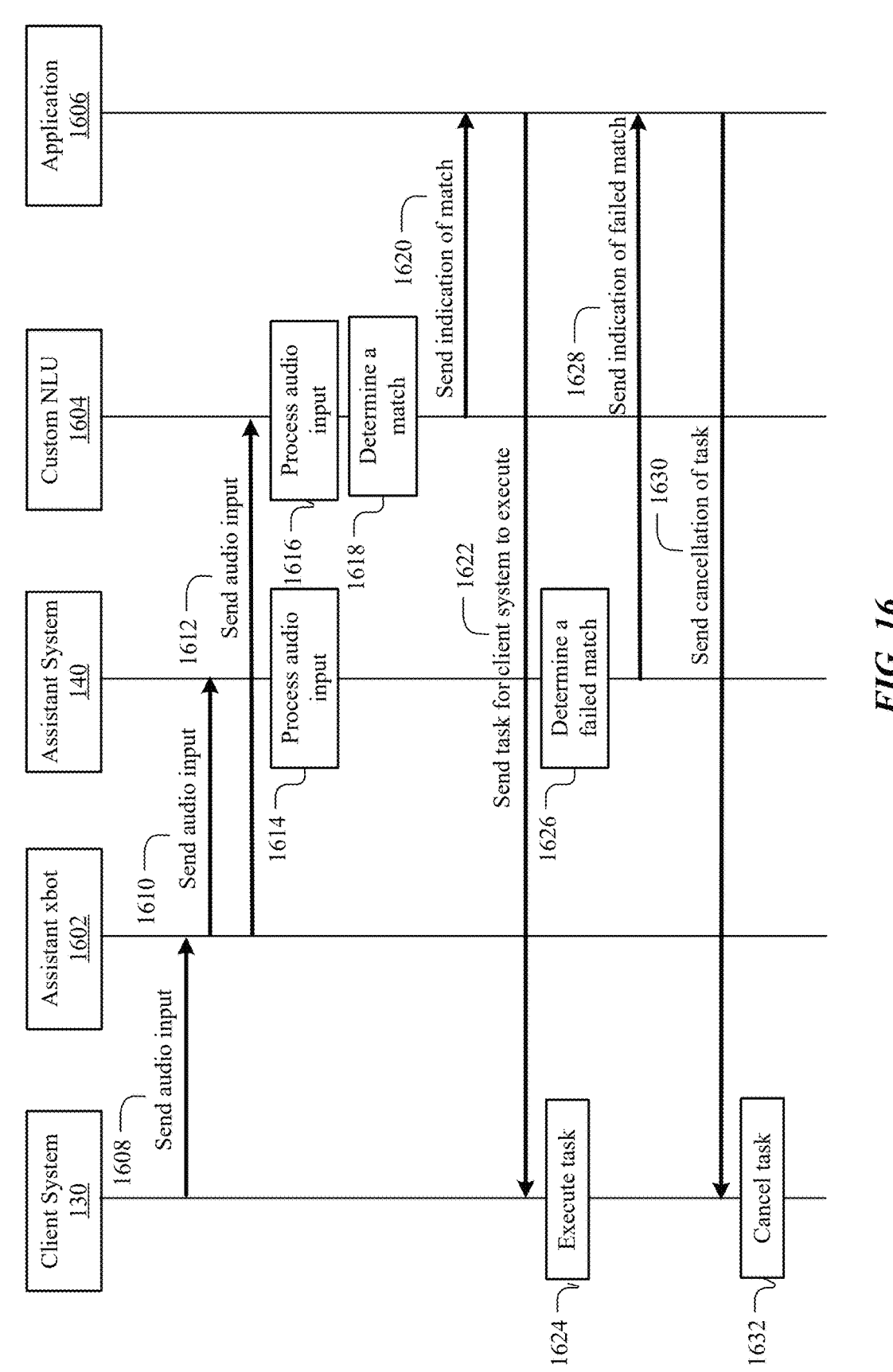
FIG. 16 illustrates an example flow diagram of processing an audio input.

FIG. 16 illustrates an example flow diagram of the process 1600 of processing an audio input. In particular embodiments, the process 1600 may include a client system 130, an assistant xbot 1602, an assistant system 140, a custom NLU model 1604, and an application 1606. In particular embodiments, there may be one or more additional components in the 1600 not shown. In particular embodiments, one or more components of the process 1600 may be combined. As an example and not by way of limitation, the client system 130 may be combined with the assistant xbot 1602. In particular embodiments, the assistant xbot 1602 may be installed on the client system 130 to handle interactions with an assistant system 140. In particular embodiments, the assistant system 140 may be embodied as an NLP tool. In particular embodiments, the custom NLU 1604 may be installed on the client system 130. In particular embodiments, the application 1606 may be installed on the client system 130. In particular embodiments, the application 1606 may correspond to an XR application that renders an XR environment for a user to see. As an example and not by way of limitation, the application 1606 may render one or more images to be displayed on one or more displays of the client system 130 to portray the XR environment to the user. In particular embodiments, the application 1606 may request that one or more microphones of the client system 130 to be set to a listening mode. In particular embodiments, the client system 130 may receive an audio input. In particular embodiments, the client system 130 may send the audio input to the assistant xbot 1602 at step 1608. In particular embodiments, the assistant xbot 1602 may send the audio input to an assistant system 140 at step 1610 and send the audio input to the custom NLU 1604 at step 1612. In particular embodiments, the assistant system 140 may begin to process the audio input at step 1614. In particular embodiments, the custom NLU 1604 may begin to process the audio input at step 1616. In particular embodiments, the custom NLU 1604 may use a pattern-recognition model to quickly process the audio input. In particular embodiments, the custom NLU 1604 may have a lower threshold confidence interval than the assistant system 140 to match the audio input to a voice command. As an example and not by way of limitation, the threshold confidence interval for the custom NLU 1604 may be +0.4 and the threshold confidence interval for the assistant system 140 may be +0.75. In particular embodiments, the custom NLU 1604 may determine a match at step 1618. In particular embodiments, the custom NLU 1604 may send an indication of a match to the application 1606 at step 1620. In particular embodiments, the application 1606 may process the indication of a match to a voice command to perform the task corresponding to the voice command. As an example and not by way of limitation if the application 1606 receives an indication that the custom NLU 1604 received an audio input corresponding to a generating a fireball spell voice command, the application 1606 may begin to render a visual effect corresponding to the fireball spell. In particular embodiments, the application 1606 may send a task for the client system 130 to execute at step 1622. The client system 130 may begin to execute the task at step 1624. The assistant system 140 may subsequently determine a failed match at step 1626. The assistant system 140 may send the indication of a failed match at step 1628. In particular embodiments, the assistant system 140 may determine the audio input does not match a voice command because the threshold confidence interval to match an audio input to a voice command is higher than the custom NLU 1604 threshold confidence interval. In particular embodiments, the application 1606 may process the indication and send a cancellation of the task to the client system 130 at step 1630. In particular embodiments, the client system 130 may process the cancellation request and cancel the task at step 1632. As such, the client system 130 may initially generate a visual effect corresponding to executing the task at step 1624, but may change the visual effect after receiving the cancellation request and cancelling the task at 1632. In particular embodiments, the processing of the audio input through using both an assistant system 140 and the custom NLU 1604 may provide a check on the results of the custom NLU 1604. In that way, the results of the custom NLU 1604 may be processed quicker so that an output may be generated quicker if needed, but the results may be updated if the assistant system 140 sends an indication of a failed match that conflicts with the output of the custom NLU 1604.

Figure 17:
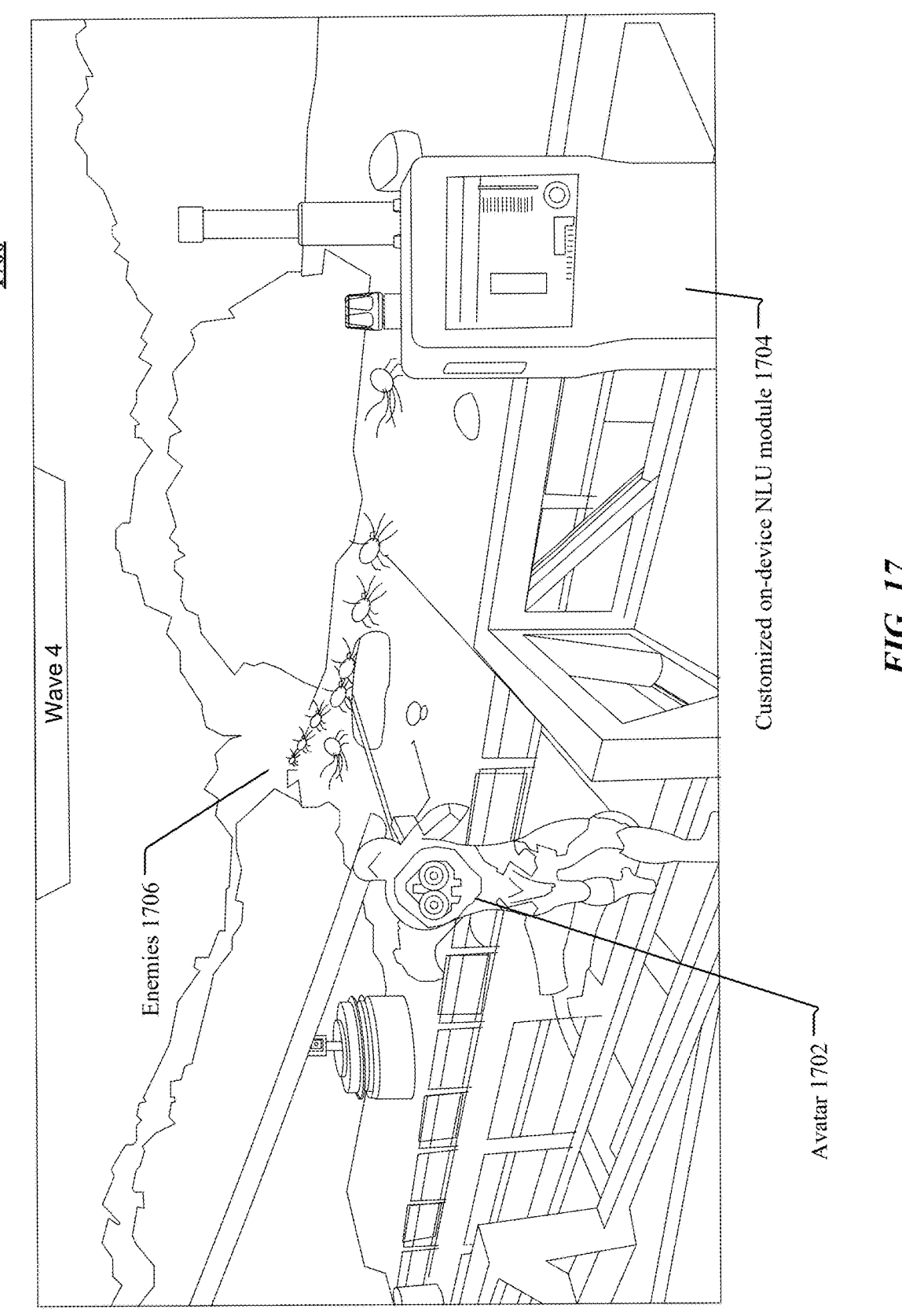
FIG. 17 illustrates an example XR environment processing an audio input using a customized on-device NLU model.

FIG. 17 illustrates an example XR environment processing an audio input using a customized on-device NLU model. In particular embodiments, the environment 1700 may be a game environment of a space shooter game. In particular embodiments, the environment 1700 may include an avatar 1702, a customized on-device NLU module 1704, and enemies 1706. In particular embodiments, the customized on-device NLU module 1704 may be embodied and represented as a walkie talkie for the user to view. In particular embodiments, the visual representation of the customized on-device NLU module 1704 may provide an interface for the user to say voice commands that the application may be able to quickly process using a pattern-recognition model as described herein. In particular embodiments, the application may include various voice commands that are available to be quickly processed by a customized on-device NLU model. The developers of the application may specify a list of voice commands that are available to be executed for the application. The list may include subsets, such as a subset of voice commands that can be quickly processed by a customized on-device NLU model installed on the client system executing the application. The user may say one of the subset of voice commands that can be processed by the customized on-device NLU model by speaking to the customized on-device NLU module 1704 represented as the walkie talkie. As an example and not by way of limitation, a voice command that can be processed by the customized on-device NLU model may be an air strike. In particular embodiments, the user can say "call in an air strike at D20", the customized on-device NLU model may process the audio input to identify the voice command and quickly send instructions to the application to perform the task corresponding to the voice command. The application may send instructions to the client system to execute the task corresponding to the voice command. As an example and not by way of limitation, the execution of the task may initiate the sounds of aircraft coming into the environment 1700. In particular embodiments, an assistant system 140 may also process the audio input and determine the audio input does not match a voice command. The assistant system 140 may send an indication of the no match to the application. As described herein, the application may update instructions and send a cancellation request to the client system to cancel execution of the task. As such, continuing the airstrike example, sounds of aircraft may initially begin to play, but then the client system may update the rendering of the task to play sounds of the aircraft leaving.

FIG. 18 illustrates an example method 1800 for processing an audio input. A client system 130 embodied as an augmented reality headset, virtual reality headset, or extended reality headset may perform the method 1800. The method may begin at step 1810, where one or more clients systems may receive, by one or more microphones of the one or more client systems, a first audio input comprising a first voice command of a first plurality of voice commands associated with a first application. In particular embodiments, the first audio input may not comprise a wake-word. In particular embodiments, the first plurality of voice commands may comprise a first set of commands executable by a customized on-device natural-language understanding (NLU) model installed on the one or more client systems and a second set of commands executable by a server-side assistant system. At step 1820, the one or more client systems may process, using the customized on-device NLU model installed on the one or more client systems, the first audio input to determine the first voice command is associated with the first set of voice commands of the first plurality of voice commands. At step 1830, the one or more client systems may execute, by the first application, a first task corresponding to the first voice command responsive to the first audio input. Particular embodiments may repeat one or more steps of the method of FIG. 18, where appropriate. Although this disclosure describes and illustrates particular steps of the method of FIG. 18 as occurring in a particular order, this disclosure contemplates any suitable steps of the method of FIG. 18 occurring in any suitable order. Moreover, although this disclosure describes and illustrates an example method for processing an audio input including the particular steps of the method of FIG. 18, this disclosure contemplates any suitable method for processing an audio input including any suitable steps, which may include all, some, or none of the steps of the method of FIG. 18, where appropriate. Furthermore, although this disclosure describes and illustrates particular components, devices, or systems carrying out particular steps of the method of FIG. 18, this disclosure contemplates any suitable combination of any suitable components, devices, or systems carrying out any suitable steps of the method of FIG. 18.

Tunable Confidence Intervals for On-device NLU Models

In particular embodiments, a client system may implement voice commands within an XR environment via a voice SDK, which allows XR applications to easily integrate voice commands on XR devices (e.g., the client system). In particular embodiments, one or more computing systems (e.g., a server-side assistant system) may customize the tolerance intervals used by natural-language understanding (NLU) models for processing voice interactions via the voice SDK. Developers may have issues initially adding voice interactions to their applications. To reduce the complexity and improve upon the developer experience, the voice SDK may include voice interactions that allow users to maintain immersion, enable multitasking, and make content more accessible. As an example and not by way of limitation, the voice SDK may provide interactions that allow voice-driven gameplay, such as using voice commands to navigate an XR environment. As another example and not by way of limitation, the voice SDK may provide interactions that allow voice navigation and search, such as a voice command to quickly switch a XR environment to another context (e.g., from one XR generated environment to a new XR generated environment) for an application. As another example and not by way of limitation, the voice SDK may provide discovery and user education, such as providing an interface to quickly navigate possible voice commands available to the user within the application. Voice interfaces can unlock entirely new ways of interacting with an XR environment. The voice SDK gives developers a way to integrate AI-driven voice experiences into XR applications.

In particular embodiments, the voice SDK may include functionality that is implemented client-side, such that a client device may include one or more components generated by the voice SDK installed and operating on the device. The voice SDK may be powered by a NLP tool, which may run a natural-language processing (NLP) service. Using the NLP tool, developers may input a small sample of training utterances (e.g., from a single utterance to a few utterances) for a given interaction, and the NLP tool can expand these input utterances out to hundreds of user utterances for the given interaction. The expansion of input utterances out to hundreds of user utterances may allow the system (e.g., client system or server-side assistant system) to handle variances in voice inputs. As an example and not by way of limitation, if an input utterance included "move the box" the input utterance can be expanded out to include "move the object", "move the item", and the like. By expanding out the input utterances, the system may be able to still handle a voice command the user provides even if it isn't exactly the same initial input utterance specified by the developer. The developer may specify a threshold level of match that needs to be performed for certain user utterances. As an example, the developer may specify that the user utterance needs to match the input utterance with a 0.95 confidence, then the user may be required to say the exact input utterance to perform a voice command.

In particular embodiments, the voice SDK may include a pre-constructed set of over 50 default interactions that application developers can essentially plug-and-play as voice interactions in their application. The pre-constructed set of default interactions may continually be modified (e.g., the set may be added to and changed to remove previous default interactions). Some of the default interactions may include one or more of go_back, go_forward, play/pause/resume, select_item, cancel, confirmation, share, open_resource, increase_volume, decrease_volume, date/time, create_timer, create_playlist, like_music, duration, get_time, create_alarm, and the like. By providing a large set of default interactions, developers may be enabled to use the voice SDK out of the box without further modification. Providing the default interactions may reduce the barrier to implement the voice SDK components into applications. The voice SDK also includes guidelines for how to handle the attention system, microphone states (listening/recording/off), and errors. For other interactions that developers would like to specify, the developers may set up new interactions as follows: (1) set up an application by adding a voice service component to an application, where components are built with simplicity in mind, built for designers and programmers alike; (2) add utterances to the NLP tool, by telling the application what you want it to respond to by entering simple phrases such as "Make the cube blue"; (3) trigger component callbacks, where as long as components in an application have public methods, the user can trigger them via events tied to voice commands using an understanding viewer.

In particular embodiments, the voice SDK may allow a developer to implement a customized on-device NLU model and a general NLU model for the developer's application. The guidelines for implementing an on-device NLU model. Developers may use the voice SDK to customize confidence intervals for matching a voice utterance to an in-application interaction when setting up the NLU models. The confidence interval may specify a range of confidence values that may be accepted for the NLU model to match a voice utterance to a particular voice command. For some voice commands, a higher threshold may be set for the confidence intervals for the voice command, which may make the voice command more difficult to implement for the user. As an example and not by way of limitation, for the final challenge of a game, the user may have to cast a complex spell. For this particular interaction, the developer can set a higher allowable confidence interval (e.g., 0.9+ confidence needed to match), so the spell fails if the user makes minor mispronunciations or errors, thus making the casting of this final spell more of a challenge (and more satisfying when they finally cast it correctly). In particular embodiments, for some voice commands, a lower threshold may be set for the confidence intervals, which may make the voice command easier to implement for the user. As an example and not by way of limitation, when the user approaches a door, perhaps the user needs to say "open sesame" to trigger an [open_door] interaction in the game. However, users may often mispronounce this and instead say, for example, "open says-a-me." With the normal confidence intervals (e.g., 0.7+), the system would likely not match this mispronunciation to the [open_ door] interaction. Thus, for this particular interaction, the developer may set a lower allowable confidence interval (e.g., 0.4+), such that minor variations and mispronunciations might still be considered matches by the NLU model, allowing the desired in-game action to actually happen. These confidence intervals can be tuned for both the client-side NLU models and for server-side NLP tool processing. In particular embodiments, these confidence intervals can also be applied for controlling when to turn on the microphone (i.e., for the no-wake-word use case above). The tuning of these confidence intervals primarily applies to matching of intents/slots by NLU models (either client- or server-side). In particular embodiments, the confidence intervals of ASR models may also be tuned. Similarly, the concept of tuning confidence intervals can be extended out to one-shot language models (which essentially combine ASR and NLU into a single model) used for customizable on-device models. With these models, the audio input is basically pattern-matched by an on-device NLU model. The confidence needed for the on-device NLU model to indicate a match could be tuned up or down as needed by the application developer.

In particular embodiments, there may be several scenarios where the developers may want to customize the confidence level/interval needed for the NLU model to match intents/slots. The several scenarios may include phonetic adjacency, easy vs. challenging tasks, avoiding false wakes/actions, stressful/critical scenarios, non-native speakers, context-based scenarios, and the like. In particular embodiments, for phonetic adjacency, at a high-level, where two or more words accepted by the application (either as intents or slots) are phonetically similar in sound, the developer may want to increase the confidence level needed to indicate a match. As an example and not by way of limitation, for minimal pairs, where pairs of words sound very similar (e.g., bat, pat, rat, vat, etc.), the developer would want to set a higher confidence interval before allowing the model to indicate a match. As another example and not by way of limitation, the more possible words recognized by the model as being similar, the higher the developer would want the confidence level to be prior to a match. So start with a default confidence for distinct commands, and then as the commands get clustered together, start tuning them up. Similarly, for an application where commands are distinct words, can use a default/lower confidence. For easy vs. challenging tasks, developers may desire to turn up (require higher confidence) for tasks (e.g., a voice command) that the developers want to be harder for the user or for a particular code word/phrase that the developers want the user to speak exactly. In particular embodiments, for standard/easy tasks, the developers could tune the voice command to a default/lower confidence level. In particular embodiments, for avoiding false wakes/actions, in some scenarios, developers may want to make sure the system isn't misclassifying an intent/slot because a false execution would lead to a negative experience (e.g., ordering the wrong food, buying the wrong stock). To do so, the developers may raise the confidence level for the NLU model to match intents/slots (e.g., ordering food). Similarly, where false accepts are less problematic, the developer could tune down the confidence level required for the NLU model to match intents/slots. In particular embodiments, for stressful/critical scenarios, developers may want to ensure that voice commands are recognized and executed, even if the user is incorrect in pronunciation. That is, the user may be under a high-stress scenario and incorrectly pronouncing a voice command. To account for the effects of a high-stress scenario, the developers may tune down the confidence level for the NLU model to match intents/slots. In particular embodiments, for non-native speakers, the developers may want to tune down the confidence intervals on the NLU model to allow for variations and mispronunciations due to accents. To enable the feature of adjusting for non-native speakers, the system may analyze the voice inputs of the user to determine whether to apply a non-native speaker adjustment to the confidence intervals on the NLU model. In particular embodiments, the developers may tune confidence levels of the NLU model for certain scenarios based on context. In some scenarios, the system might be expecting certain commands. As an example and not by way of limitation, if the user is standing in front of a door, the system may be expecting the user to say "open the door", then can dynamically tune down the confidence interval for this voice command. Similarly, if the user is far away from the door and looking away, the system could dynamically tune up the confidence interval for the same command (so as to not accidentally open the door). In particular embodiments, the voice SDK may enable applications to activate the microphone without using a wake word or using a manual input. As an example and not by way of limitation, the microphone may be automatically put into a listening mode responsive to in-application events occurring. For example, when the user gazes at a virtual door in a VR game and/or gets close to the door, this can be an event that triggers the microphone to turn on to allow the user to input voice commands with respect to the door.

In particular embodiments, the voice SDK may enable a developer to provide user education in immersive ways for the user. The user education may be different depending on the user. As an example and not by way of limitation, the user education provided to a returning user vs. a new user may be different. Different voice commands may be provided to different users (e.g., based on level of a user within a game application, based on features a user may have paid for within an application). As an example and not by way of limitation, a user may be playing a fantasy VR game and open a spellbook and begin flipping through the pages. The user may find a spell to cast, and begin speaking in Elvish. The user can say "Yal-Sanda", as a shield materializes around the user. The user may turn to an NPC and ask, "What else can I say?". The NPC may respond with instructions for how to cast a couple more spells the user has not done yet.

In particular embodiments, the voice SDK may provide voice-enabled multitasking to various applications. In particular embodiments, for traditional games multitasking while playing a game can be difficult with a standard controller interface. A user may be able to perform multiple tasks using voice commands. As an example and not by way of limitation, in a real-time military strategy game, a user can build things in their base while supervising a firefight elsewhere on a map. As another example and not by way of limitation, in a fantasy role-playing game, the user can instruct an NPC to fetch an item from a store while the user is smithing an axe. As yet another example and not by way of limitation, in an virtual exploration game, the user may query an environment while interacting with an object.

In particular embodiments, the voice SDK may provide voice-enabled search. Typing and searching in XR may be awkward because of the use of controllers to type in an input. Voice may be a natural input method for searching, either through dictation, or by speaking naturally in search of something specific. The application may be able to provide a result quickly and seamlessly when a user knows exactly what to look for. The use of a voice input eliminates the need to tediously raycast letter-by-letter when searching for something within a VR application.

In particular embodiments, one or more computing systems may be embodied as a server-side assistant system, client system, and the like. In particular embodiments, the one or more computing systems may receive an audio input of a user from a XR display device. In particular embodiments, the audio input may comprise a first voice command of a plurality of voice commands associated with a first application, wherein the plurality of voice commands are executable by a NLU model. In particular embodiments, the plurality of voice commands comprise one or more of avatar movement, avatar actions, object movement, object actions, application settings, or system settings. Although this disclosure describes receiving an audio input in a particular manner, this disclosure contemplates receiving an audio input in any suitable manner.

In particular embodiments, the one or more computing systems may determine a first context of the user with respect to an XR environment. As an example and not by way of limitation, the one or more computing systems may determine the context of the user, such as whether the user has previously interacted with the XR environment. As another example and not by way of limitation, the one or more computing systems may determine application context the user is in. For instance, the user may be in a hard level of a game application. Although this disclosure describes determining a context of a user in a particular manner, this disclosure contemplates determining a context of a user in any suitable manner.

In particular embodiments, the one or more computing systems may determine a tunable confidence interval for the NLU model to match the audio input to the first voice command based on the first context. In particular embodiments, the tunable confidence interval varies based on the user context. In particular embodiments the tunable confidence interval is set to a first tunable confidence level based on the first context of the user. In particular embodiments, adjusting the tunable confidence interval to a second tunable confidence level based on content of the first application. In particular embodiments, the second tunable confidence level is higher than the first tunable confidence level. In particular embodiments, the content is a difficult game level and the second tunable confidence level is higher to promote the user to precisely state voice commands. In particular embodiments, determining the audio input matches the first voice command is further based on the second tunable confidence level. In particular embodiments, the second tunable confidence level is different from the first tunable confidence level. In particular embodiments, the one or more computing systems may determine whether the audio input matches the first voice command based on the second tunable confidence level by a customizable NLU model of the XR display device. In particular embodiments, the one or more computing systems may provide instructions to the XR display device to place one or more microphones of the XR display device into a listening mode responsive to determining the first unable confidence level exceeds a threshold tunable confidence level. As an example and not by way of limitation, the XR display device may set one or more microphones into a listening mode when the first tunable confidence level exceeds a threshold tunable confidence level. Although this disclosure describes determining a tunable confidence interval in a particular manner, this disclosure contemplates determining a tunable confidence interval in any suitable manner.

In particular embodiments, the one or more computing systems may determine whether the audio input matches the first voice command based on the first tunable confidence level by the NLU model. In particular embodiments, the one or more computing systems may determine audio input comprises one or more words that are phonetically adjacent to one or more other words. In particular embodiments, the one or more computing systems may adjust the tunable confidence interval to a second tunable confidence level responsive to determining the audio input comprises one or more words that are phonetically adjacent to one or more other words. In particular embodiments, the second tunable confidence level is higher than the first tunable confidence level. In particular embodiments, determining the audio input matches the first voice command is further based on the second tunable confidence level. In particular embodiments, the one or more computing systems may determine a difficult associated with a first task. In particular embodiments, the one or more computing systems may adjust the tunable confidence interval to a second tunable confidence level based on the difficulty associated with the first task. In particular embodiments, the one or more computing systems may access a list of predetermined tasks. In particular embodiments, the one or more computing systems may adjust the tunable confidence interval to a second tunable confidence level based on the first task matching one task out of the list of predetermined tasks. In particular embodiments, the one or more computing systems may receive an indication that the first user has a speech characteristic. In particular embodiments, the one or more computing systems may adjust the tunable confidence interval to a second tunable confidence level based on the speech characteristic. Although this disclosure describes determining whether the audio input matches a first voice command in a particular manner, this disclosure contemplates determining whether the audio input matches a first voice command in any suitable manner.

In particular embodiments, the one or more computing systems may determine whether the audio input matches the first voice command by identifying one or more intents or one or more slots associated with the audio input. In particular embodiments, the one or more computing systems may access one or more first voice command intents or one or more first voice command slots associated with the first voice command. In particular embodiments, the one or more computing systems may determine whether the identified one or more intents or the one or more slots match the one or more first voice command intents or the one or more first voice command slots based on the first tunable confidence level. Although this disclosure describes determining whether an audio input matches a voice command in a particular manner, this disclosure contemplates determining whether an audio input matches a voice command in any suitable manner.

Figure 19:
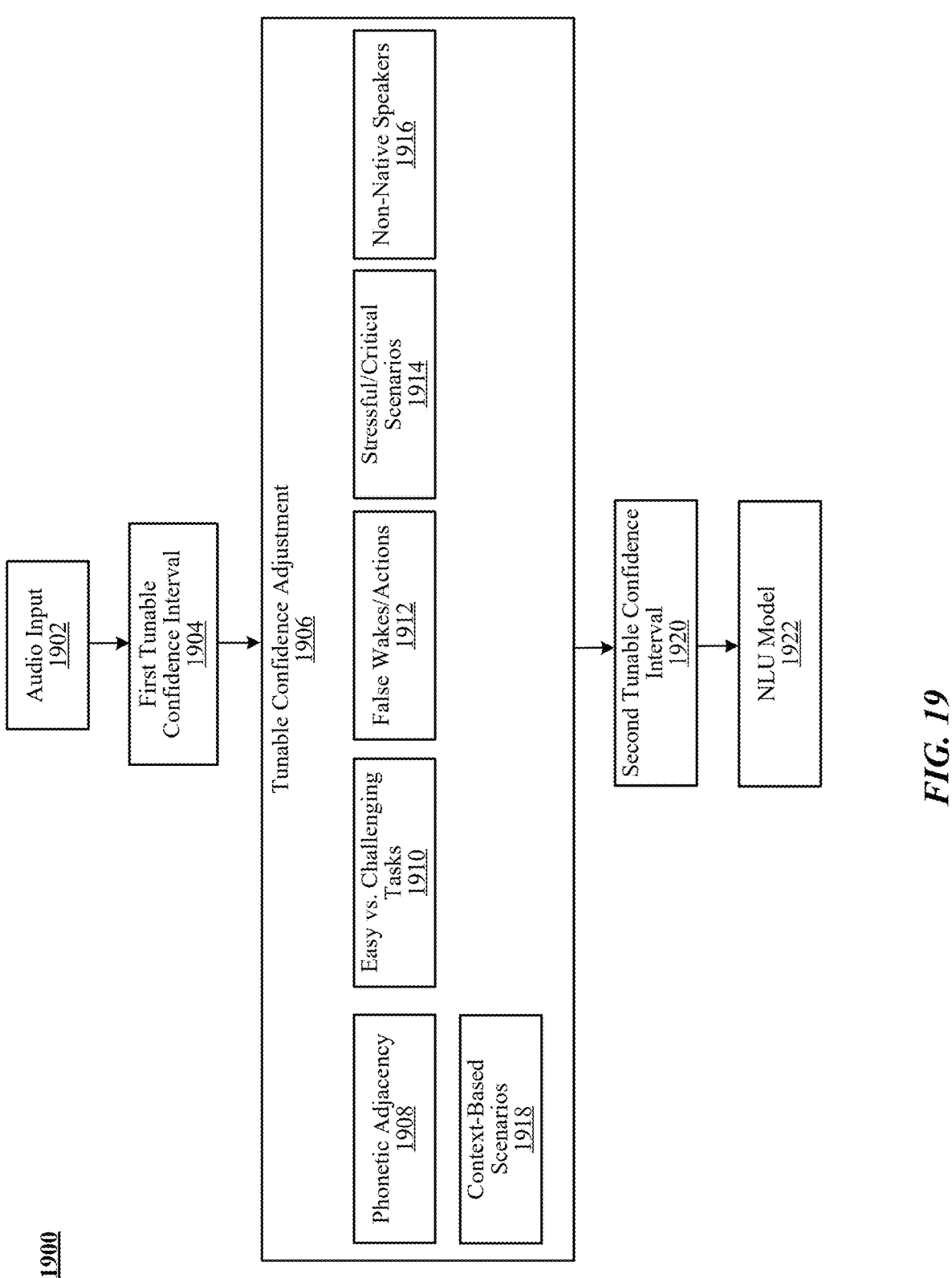
FIG. 19 illustrates an example flow diagram for tuning a confidence interval.

FIG. 19 illustrates an example flow diagram for a process 1900 of tuning a confidence interval. In particular embodiments, one or more computing systems may perform the process 1900. As an example and not by way of limitation, a server-side assistant system may perform the process 1900. In particular embodiments, a client system may perform the process 1900 as described herein. As an example and not by way of limitation, an XR display device may perform the process 1900. In particular embodiments, the one or more computing systems may receive an audio input 1902. In particular embodiments, the one or more computing systems may determine a first tunable confidence interval 1904 to meet to determine an audio input matches a voice command. The first tunable confidence interval 1904 may be a default tunable confidence interval. In particular embodiments, the tunable confidence interval may be set between 0.01 to 1. Although other ranges may be used for the tunable confidence interval. In particular embodiments, the one or more computing systems may send the first tunable confidence interval 1904 to a tunable confidence adjustment 1906. In particular embodiments, the tunable confidence adjustment 1906 may include a plurality of parameters to adjust the first tunable confidence interval 1904. In particular embodiments, the parameters may include phonetic adjacency 1908, easy vs. challenging tasks 1910, false wakes/actions 1912, stressful/critical scenarios 1914, non-native speakers 1916, and context-based scenarios 1918. In particular embodiments, phonetic adjacency 1908 determines whether the audio input 1902 contains one or more words that sound like other words. In particular embodiments, the tunable confidence adjustment 1906 may increase the tunable confidence interval to require a high confidence interval to match the audio input 1902 to a voice command if the audio input 1902 is determined that one or more words is phonetically adjacent to other words. In particular embodiments, the easy vs. challenging tasks 1910 may determine whether an application developer has previously modified the tunable confidence interval for specific voice commands. As an example and not by way of limitation, if the voice command to open a door in a game application is intended to be easy, then the tunable confidence interval for the command may be set low to increase the likelihood of processing the voice command. In particular embodiments, the false wakes/actions 1912 may specify a list of voice commands that an application developer would not want to accidentally occur. As an example and not by way of limitation, placing an order for food may be identified as a voice command that a user would not want to have a false action. As such, the tunable confidence interval to match an audio input to a placing an order for food voice command may be set high. In particular embodiments, stressful/critical scenarios 1914 may specify certain scenarios that may be stressful or critical in an application. As an example and not by way of limitation, in a war field environment, the user may be more stressed than normal. As such, the user may mess up saying voice commands. To account for the effects stress would have on pronunciation of voice commands, the application may identify certain situations or scenarios that the user may be stressed and all tunable confidence intervals may be tuned up to respond better to attempted voice commands. In particular embodiments, non-native speakers 1916 may specify a language of an application and determine when non-native speakers of that language is attempting to say a voice command. The tunable confidence interval may be tuned down to be more accepting of variations of pronunciations of a voice command from a non-native speaker. In particular embodiments, the context-based scenarios 1918 may specify certain scenarios where the tunable confidence intervals may be adjusted. As an example and not by way of limitation, for a tutorial section of an application, the tunable confidence intervals of voice commands may be tuned up so that the application may respond to voice commands better (e.g., process audio inputs as voice commands).

As an example and not by way of limitation, for a boss level, the difficulty of the level may include correctly pronouncing voice commands so the tunable confidence intervals for voice commands may be tuned down to may the difficult of performing voice commands harder. For instance, to cast a spell using a voice command, the user has to be more precise in their pronunciation. In particular embodiments, the tunable confidence adjustment 1906 may consider one or more parameters in adjusting the tunable confidence interval to generate a second tunable confidence interval 1920. The tunable confidence interval 1920 may be sent to the NLU model 1922 to determine whether the audio input matches a voice command. The NLU model 1922 may subsequently identify the intents and slots associated with the audio input after identifying a voice command associated with the audio input. The intents and slots may be sent to an application to process and generate a response to be presented by a client system.

FIG. 20 illustrates an example method 2000 for turning a confidence interval. In particular embodiments, one or more computing systems embodied as server-side assistant system may perform the method of tuning a confidence interval. In particular embodiments, a client system may also perform the method of tuning a confidence interval. The method may begin at step 2010, where one or more computing systems may receive, from an extended reality (XR) display device, an audio input of a user of the XR display device. In particular embodiments, the audio input comprises a first voice command of a plurality of voice commands associated with a first application. In particular embodiments, the plurality of voice commands are executable by a natural-language understanding (NLU) model. At step 2020, the one or more computing systems may determine a first context of the user with respect to an extended reality (XR) environment. At step 2030, the one or more computing systems may determine, based on the first context, a tunable confidence interval for the NLU model to match the audio input to the first voice command. In particular embodiments, the tunable confidence interval may vary based on user context. In particular embodiments the tunable confidence interval may be set to a first tunable confidence level based on the first context of the user. At step 2040, the one or more computing systems may determine, by the NLU model, whether the audio input matches the first voice command based on the first tunable confidence level. At step 2050, the one or more computing systems may execute, by the first application, a first task corresponding to the first voice command responsive to determining the audio input matches the first voice command. Particular embodiments may repeat one or more steps of the method of FIG. 20, where appropriate. Although this disclosure describes and illustrates particular steps of the method of FIG. 20 as occurring in a particular order, this disclosure contemplates any suitable steps of the method of FIG. 20 occurring in any suitable order. Moreover, although this disclosure describes and illustrates an example method for tuning a confidence interval including the particular steps of the method of FIG. 20, this disclosure contemplates any suitable method for tuning a confidence interval including any suitable steps, which may include all, some, or none of the steps of the method of FIG. 20, where appropriate. Furthermore, although this disclosure describes and illustrates particular components, devices, or systems carrying out particular steps of the method of FIG. 20, this disclosure contemplates any suitable combination of any suitable components, devices, or systems carrying out any suitable steps of the method of FIG. 20.

Social Graphs

Figure 21:
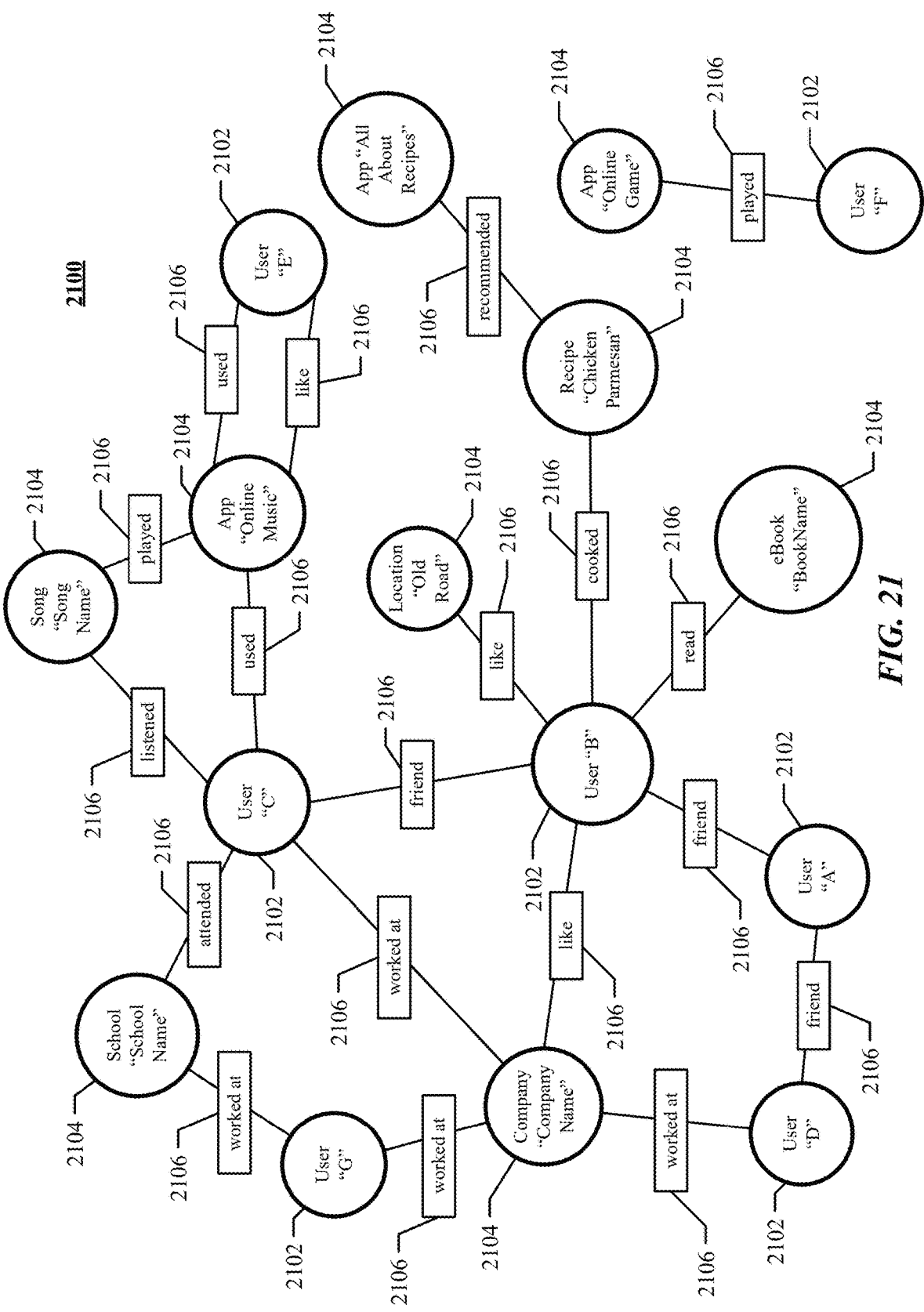
FIG. 21 illustrates an example social graph.

FIG. 21 illustrates an example social graph 2100. In particular embodiments, the social-networking system 160 may store one or more social graphs 2100 in one or more data stores. In particular embodiments, the social graph 2100 may include multiple nodes-which may include multiple user nodes 2102 or multiple concept nodes 2104—and multiple edges 2106 connecting the nodes. Each node may be associated with a unique entity (i.e., user or concept), each of which may have a unique identifier (ID), such as a unique number or username. The example social graph 2100 illustrated in FIG. 21 is shown, for didactic purposes, in a two-dimensional visual map representation. In particular embodiments, a social-networking system 160, a client system 130, an assistant system 140, or a third-party system 170 may access the social graph 2100 and related social-graph information for suitable applications. The nodes and edges of the social graph 2100 may be stored as data objects, for example, in a data store (such as a social-graph database). Such a data store may include one or more searchable or queryable indexes of nodes or edges of the social graph 2100.

In particular embodiments, a user node 2102 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 2102 corresponding to the user, and store the user node 2102 in one or more data stores. Users and user nodes 2102 described herein may, where appropriate, refer to registered users and user nodes 2102 associated with registered users. In addition or as an alternative, users and user nodes 2102 described herein may, where appropriate, refer to users that have not registered with the social-networking system 160. In particular embodiments, a user node 2102 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 2102 may be associated with one or more data objects corresponding to information associated with a user. In particular embodiments, a user node 2102 may correspond to one or more web interfaces.

In particular embodiments, a concept node 2104 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 2104 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 2104 may be associated with one or more data objects corresponding to information associated with concept node 2104. In particular embodiments, a concept node 2104 may correspond to one or more web interfaces.

In particular embodiments, a node in the social graph 2100 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 2104. Profile interfaces may be viewable by all or a selected subset of other users. As an example and not by way of limitation, a user node 2102 may have a corresponding user-profile interface in which the corresponding user may add content, make declarations, or otherwise express himself or herself. As another example and not by way of limitation, a concept node 2104 may have a corresponding concept-profile interface in which one or more users may add content, make declarations, or express themselves, particularly in relation to the concept corresponding to concept node 2104.

In particular embodiments, a concept node 2104 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 2102 corresponding to the user and a concept node 2104 corresponding to the third-party web interface or resource and store edge 2106 in one or more data stores.

In particular embodiments, a pair of nodes in the social graph 2100 may be connected to each other by one or more edges 2106. An edge 2106 connecting a pair of nodes may represent a relationship between the pair of nodes. In particular embodiments, an edge 2106 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 2106 connecting the first user's user node 2102 to the second user's user node 2102 in the social graph 2100 and store edge 2106 as social-graph information in one or more of data stores 164. In the example of FIG. 21, the social graph 2100 includes an edge 2106 indicating a friend relation between user nodes 2102 of user "A" and user "B" and an edge indicating a friend relation between user nodes 2102 of user "C" and user "B." Although this disclosure describes or illustrates particular edges 2106 with particular attributes connecting particular user nodes 2102, this disclosure contemplates any suitable edges 2106 with any suitable attributes connecting user nodes 2102. As an example and not by way of limitation, an edge 2106 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 2100 by one or more edges 2106. The degree of separation between two objects represented by two nodes, respectively, is a count of edges in a shortest path connecting the two nodes in the social graph 2100. As an example and not by way of limitation, in the social graph 2100, the user node 2102 of user "C" is connected to the user node 2102 of user "A" via multiple paths including, for example, a first path directly passing through the user node 2102 of user "B," a second path passing through the concept node 2104 of company "CompanyName" and the user node 2102 of user "D," and a third path passing through the user nodes 2102 and concept nodes 2104 representing school "SchoolName," user "G," company "CompanyName," and user "D." User "C" and user "A" have a degree of separation of two because the shortest path connecting their corresponding nodes (i.e., the first path) includes two edges 2106.

In particular embodiments, an edge 2106 between a user node 2102 and a concept node 2104 may represent a particular action or activity performed by a user associated with user node 2102 toward a concept associated with a concept node 2104. As an example and not by way of limitation, as illustrated in FIG. 21, a user may "like," "attended," "played," "listened," "cooked," "worked at," or "read" a concept, each of which may correspond to an edge type or subtype. A concept-profile interface corresponding to a concept node 2104 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Song-Name") using a particular application (a third-party online music application). In this case, the social-networking system 160 may create a "listened" edge 2106 and a "used" edge (as illustrated in FIG. 21) between user nodes 2102 corresponding to the user and concept nodes 2104 corresponding to the song and application to indicate that the user listened to the song and used the application. Moreover, the social-networking system 160 may create a "played" edge 2106 (as illustrated in FIG. 21) between concept nodes 2104 corresponding to the song and the application to indicate that the particular song was played by the particular application. In this case, "played" edge 2106 corresponds to an action performed by an external application (the third-party online music application) on an external audio file (the song "SongName"). Although this disclosure describes particular edges 2106 with particular attributes connecting user nodes 2102 and concept nodes 2104, this disclosure contemplates any suitable edges 2106 with any suitable attributes connecting user nodes 2102 and concept nodes 2104. Moreover, although this disclosure describes edges between a user node 2102 and a concept node 2104 representing a single relationship, this disclosure contemplates edges between a user node 2102 and a concept node 2104 representing one or more relationships. As an example and not by way of limitation, an edge 2106 may represent both that a user likes and has used at a particular concept. Alternatively, another edge 2106 may represent each type of relationship (or multiples of a single relationship) between a user node 2102 and a concept node 2104 (as illustrated in FIG. 21 between user node 2102 for user "E" and concept node 2104 for "online music application").

In particular embodiments, the social-networking system 160 may create an edge 2106 between a user node 2102 and a concept node 2104 in the social graph 2100. As an example and not by way of limitation, a user viewing a concept-profile interface (such as, for example, by using a web browser or a special-purpose application hosted by the user's client system 130) may indicate that he or she likes the concept represented by the concept node 2104 by clicking or selecting a "Like" icon, which may cause the user's client system 130 to send to the social-networking system 160 a message indicating the user's liking of the concept associated with the concept-profile interface. In response to the message, the social-networking system 160 may create an edge 2106 between user node 2102 associated with the user and concept node 2104, as illustrated by "like" edge 2106 between the user and concept node 2104. In particular embodiments, the social-networking system 160 may store an edge 2106 in one or more data stores. In particular embodiments, an edge 2106 may be automatically formed by the social-networking system 160 in response to a particular user action. As an example and not by way of limitation, if a first user uploads a picture, reads a book, watches a movie, or listens to a song, an edge 2106 may be formed between user node 2102 corresponding to the first user and concept nodes 2104 corresponding to those concepts. Although this disclosure describes forming particular edges 2106 in particular manners, this disclosure contemplates forming any suitable edges 2106 in any suitable manner.

Vector Spaces and Embeddings

Figure 22:
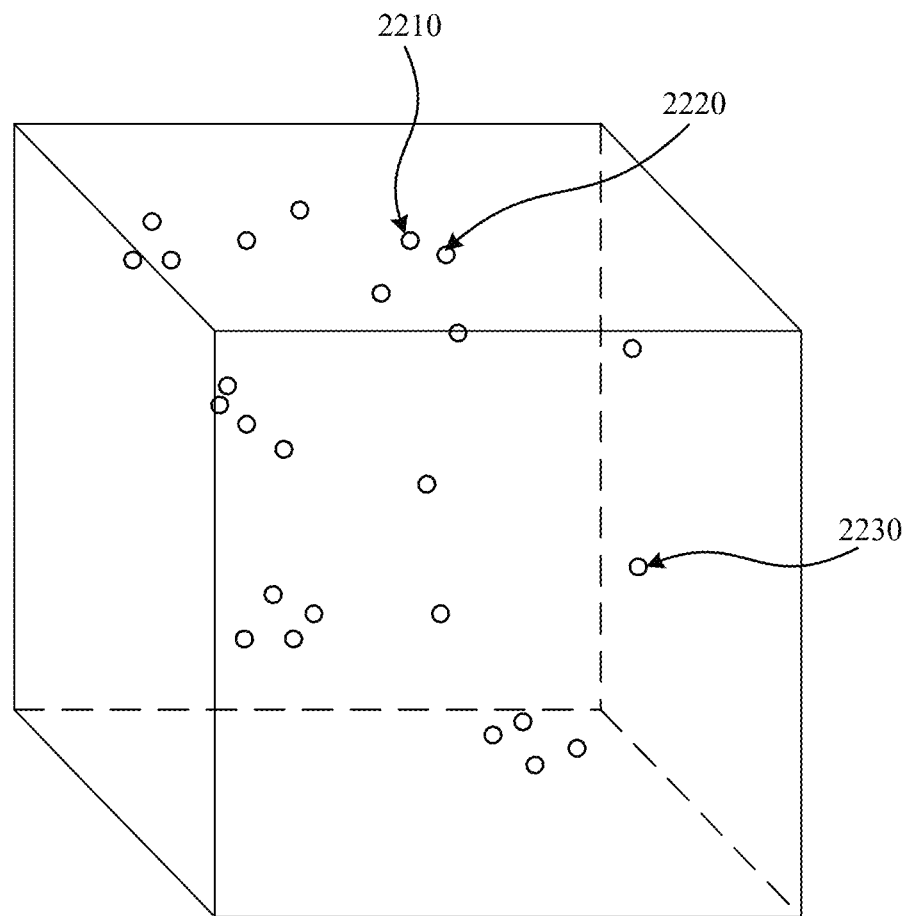
FIG. 22 illustrates an example view of an embedding space.

FIG. 22 illustrates an example view of a vector space 2200. In particular embodiments, an object or an n-gram may be represented in a d-dimensional vector space, where d denotes any suitable number of dimensions. Although the vector space 2200 is illustrated as a three-dimensional space, this is for illustrative purposes only, as the vector space 2200 may be of any suitable dimension. In particular embodiments, an n-gram may be represented in the vector space 2200 as a vector referred to as a term embedding. Each vector may comprise coordinates corresponding to a particular point in the vector space 2200 (i.e., the terminal point of the vector). As an example and not by way of limitation, vectors 2210, 2220, and 2230 may be represented as points in the vector space 2200, as illustrated in FIG. 22. An n-gram may be mapped to a respective vector representation. As an example and not by way of limitation, n-grams $t_1$ and $t_2$ may be mapped to vectors $\vec{v_1}$ and $\vec{v_2}$ in the vector space 2200, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 2200. In particular embodiments, an n-gram may be mapped to a vector representation in the vector space 2200 by using a machine leaning model (e.g., a neural network). The machine learning model may have been trained using a sequence of training data (e.g., a corpus of objects each comprising n-grams).

In particular embodiments, an object may be represented in the vector space 2200 as a vector referred to as a feature vector or an object embedding. As an example and not by way of limitation, objects $e_1$ and $e_2$ may be mapped to vectors $\vec{v_1}$ and $\vec{v_2}$ in the vector space 2200, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 2200. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\|\|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 2200. As an example and not by way of limitation, vector 2210 and vector 2220 may correspond to objects that are more similar to one another than the objects corresponding to vector 2210 and vector 2230, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 23:
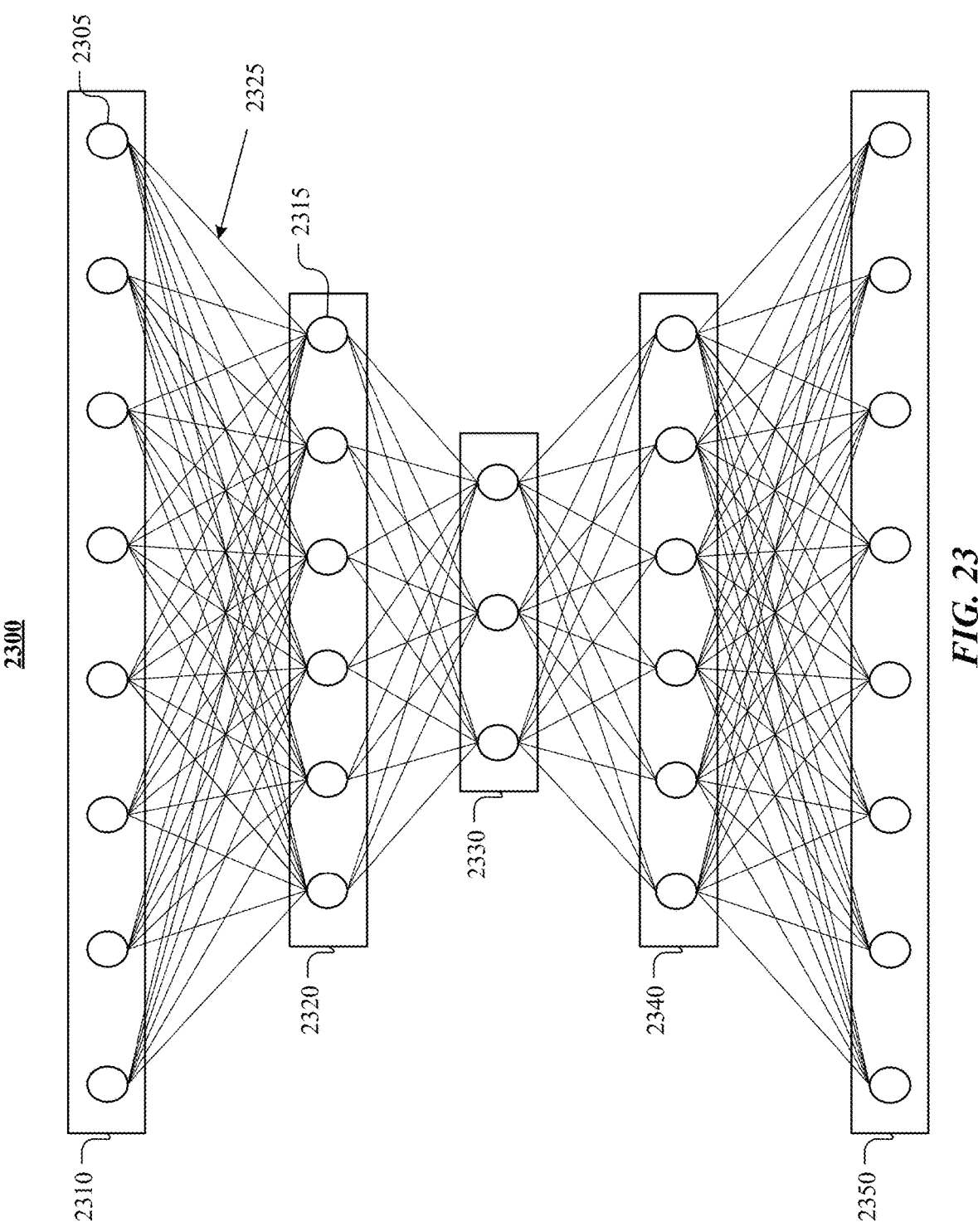
FIG. 23 illustrates an example artificial neural network.

FIG. 23 illustrates an example artificial neural network ("ANN") 2300. In particular embodiments, an ANN may refer to a computational model comprising one or more nodes. Example ANN 2300 may comprise an input layer 2310, hidden layers 2320, 2330, 2340, and an output layer 2350. Each layer of the ANN 2300 may comprise one or more nodes, such as a node 2305 or a node 2315. In particular embodiments, each node of an ANN may be connected to another node of the ANN. As an example and not by way of limitation, each node of the input layer 2310 may be connected to one of more nodes of the hidden layer 2320. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 23 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 23 depicts a connection between each node of the input layer 2310 and each node of the hidden layer 2320, one or more nodes of the input layer 2310 may not be connected to one or more nodes of the hidden layer 2320.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 2320 may comprise the output of one or more nodes of the input layer 2310. As another example and not by way of limitation, the input to each node of the output layer 2350 may comprise the output of one or more nodes of the hidden layer 2340. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k) = \max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 2325 between the node 2305 and the node 2315 may have a weighting coefficient of 0.4, which may indicate that 0.4 multiplied by the output of the node 2305 is used as an input to the node 2315. As another example and not by way of limitation, the output $y_k$ of node k may be $y_k = F_k(s_k)$, where $F_k$ may be the activation function corresponding to node k, $s_k = \Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 2300 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 2100. A privacy setting may be specified for one or more edges 2106 or edge-types of the social graph 2100, or with respect to one or more nodes 2102, 2104 or node-types of the social graph 2100. The privacy settings applied to a particular edge 2106 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 2104 connected to a user node 2102 of the first user by an edge 2106. The first user may specify privacy settings that apply to a particular edge 2106 connecting to the concept node 2104 of the object, or may specify privacy settings that apply to all edges 2106 connecting to the concept node 2104. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client system 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160.

Systems and Methods

Figure 24:
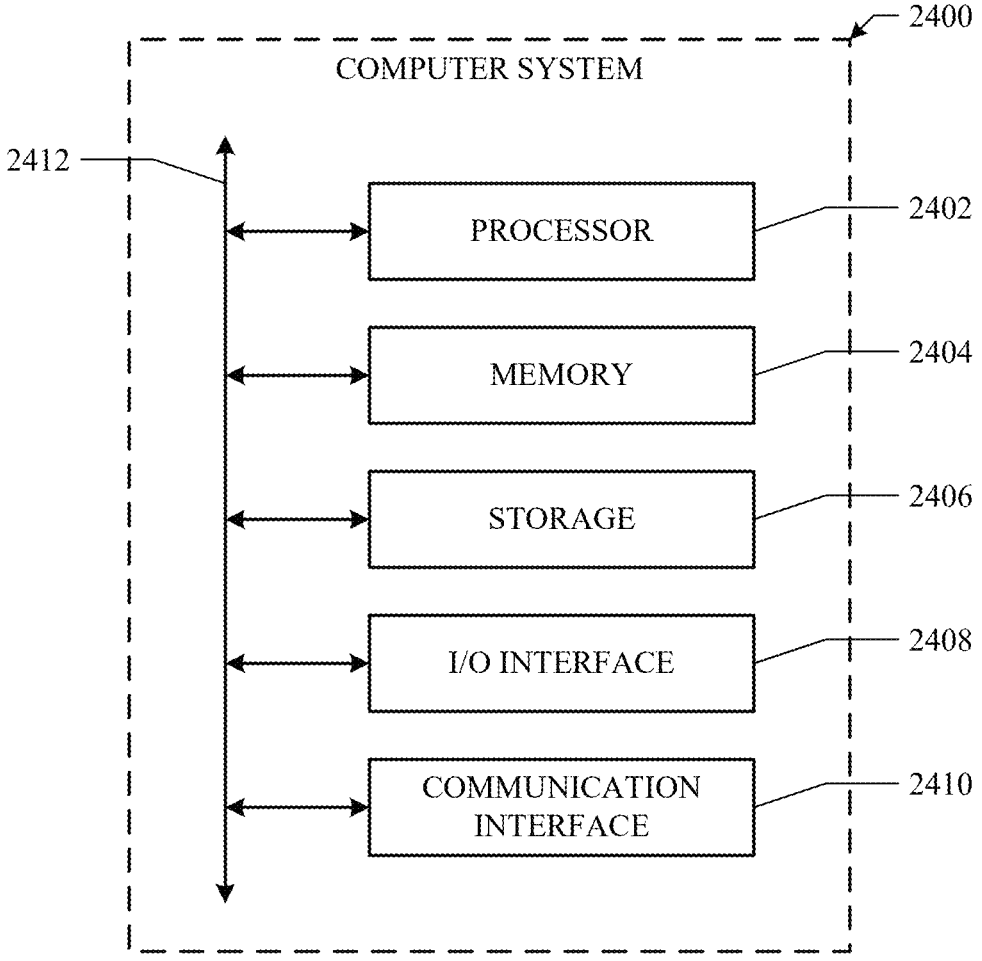
FIG. 24 illustrates an example computer system.

FIG. 24 illustrates an example computer system 2400. In particular embodiments, one or more computer systems 2400 perform one or more steps of one or more methods described or illustrated herein. In particular embodiments, one or more computer systems 2400 provide functionality described or illustrated herein. In particular embodiments, software running on one or more computer systems 2400 performs one or more steps of one or more methods described or illustrated herein or provides functionality described or illustrated herein. Particular embodiments include one or more portions of one or more computer systems 2400. Herein, reference to a computer system may encompass a computing device, and vice versa, where appropriate. Moreover, reference to a computer system may encompass one or more computer systems, where appropriate.

This disclosure contemplates any suitable number of computer systems 2400. This disclosure contemplates computer system 2400 taking any suitable physical form. As example and not by way of limitation, computer system 2400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 2400 may include one or more computer systems 2400; be unitary or distributed; span multiple locations; span multiple machines; span multiple data centers; or reside in a cloud, which may include one or more cloud components in one or more networks. Where appropriate, one or more computer systems 2400 may perform without substantial spatial or temporal limitation one or more steps of one or more methods described or illustrated herein. As an example and not by way of limitation, one or more computer systems 2400 may perform in real time or in batch mode one or more steps of one or more methods described or illustrated herein. One or more computer systems 2400 may perform at different times or at different locations one or more steps of one or more methods described or illustrated herein, where appropriate.

In particular embodiments, computer system 2400 includes a processor 2402, memory 2404, storage 2406, an input/output (I/O) interface 2408, a communication interface 2410, and a bus 2412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2402 includes hardware for executing instructions, such as those making up a computer program. As an example and not by way of limitation, to execute instructions, processor 2402 may retrieve (or fetch) the instructions from an internal register, an internal cache, memory 2404, or storage 2406; decode and execute them; and then write one or more results to an internal register, an internal cache, memory 2404, or storage 2406. In particular embodiments, processor 2402 may include one or more internal caches for data, instructions, or addresses. This disclosure contemplates processor 2402 including any suitable number of any suitable internal caches, where appropriate. As an example and not by way of limitation, processor 2402 may include one or more instruction caches, one or more data caches, and one or more translation lookaside buffers (TLBs). Instructions in the instruction caches may be copies of instructions in memory 2404 or storage 2406, and the instruction caches may speed up retrieval of those instructions by processor 2402. Data in the data caches may be copies of data in memory 2404 or storage 2406 for instructions executing at processor 2402 to operate on; the results of previous instructions executed at processor 2402 for access by subsequent instructions executing at processor 2402 or for writing to memory 2404 or storage 2406; or other suitable data. The data caches may speed up read or write operations by processor 2402. The TLBs may speed up virtual-address translation for processor 2402. In particular embodiments, processor 2402 may include one or more internal registers for data, instructions, or addresses. This disclosure contemplates processor 2402 including any suitable number of any suitable internal registers, where appropriate. Where appropriate, processor 2402 may include one or more arithmetic logic units (ALUs); be a multi-core processor; or include one or more processors 2402. Although this disclosure describes and illustrates a particular processor, this disclosure contemplates any suitable processor.

In particular embodiments, memory 2404 includes main memory for storing instructions for processor 2402 to execute or data for processor 2402 to operate on. As an example and not by way of limitation, computer system 2400 may load instructions from storage 2406 or another source (such as, for example, another computer system 2400) to memory 2404. Processor 2402 may then load the instructions from memory 2404 to an internal register or internal cache. To execute the instructions, processor 2402 may retrieve the instructions from the internal register or internal cache and decode them. During or after execution of the instructions, processor 2402 may write one or more results (which may be intermediate or final results) to the internal register or internal cache. Processor 2402 may then write one or more of those results to memory 2404. In particular embodiments, processor 2402 executes only instructions in one or more internal registers or internal caches or in memory 2404 (as opposed to storage 2406 or elsewhere) and operates only on data in one or more internal registers or internal caches or in memory 2404 (as opposed to storage 2406 or elsewhere). One or more memory buses (which may each include an address bus and a data bus) may couple processor 2402 to memory 2404. Bus 2412 may include one or more memory buses, as described below. In particular embodiments, one or more memory management units (MMUs) reside between processor 2402 and memory 2404 and facilitate accesses to memory 2404 requested by processor 2402. In particular embodiments, memory 2404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2404 may include one or more memories 2404, where appropriate. Although this disclosure describes and illustrates particular memory, this disclosure contemplates any suitable memory.

In particular embodiments, storage 2406 includes mass storage for data or instructions. As an example and not by way of limitation, storage 2406 may include a hard disk drive (HDD), a floppy disk drive, flash memory, an optical disc, a magneto-optical disc, magnetic tape, or a Universal Serial Bus (USB) drive or a combination of two or more of these. Storage 2406 may include removable or non-removable (or fixed) media, where appropriate. Storage 2406 may be internal or external to computer system 2400, where appropriate. In particular embodiments, storage 2406 is non-volatile, solid-state memory. In particular embodiments, storage 2406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2406 taking any suitable physical form. Storage 2406 may include one or more storage control units facilitating communication between processor 2402 and storage 2406, where appropriate. Where appropriate, storage 2406 may include one or more storages 2406. Although this disclosure describes and illustrates particular storage, this disclosure contemplates any suitable storage.

In particular embodiments, I/O interface 2408 includes hardware, software, or both, providing one or more interfaces for communication between computer system 2400 and one or more I/O devices. Computer system 2400 may include one or more of these I/O devices, where appropriate. One or more of these I/O devices may enable communication between a person and computer system 2400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2408 for them. Where appropriate, I/O interface 2408 may include one or more device or software drivers enabling processor 2402 to drive one or more of these I/O devices. I/O interface 2408 may include one or more I/O interfaces 2408, where appropriate. Although this disclosure describes and illustrates a particular I/O interface, this disclosure contemplates any suitable I/O interface.

In particular embodiments, communication interface 2410 includes hardware, software, or both providing one or more interfaces for communication (such as, for example, packet-based communication) between computer system 2400 and one or more other computer systems 2400 or one or more networks. As an example and not by way of limitation, communication interface 2410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2410 for it. As an example and not by way of limitation, computer system 2400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2400 may include any suitable communication interface 2410 for any of these networks, where appropriate. Communication interface 2410 may include one or more communication interfaces 2410, where appropriate. Although this disclosure describes and illustrates a particular communication interface, this disclosure contemplates any suitable communication interface.

In particular embodiments, bus 2412 includes hardware, software, or both coupling components of computer system 2400 to each other. As an example and not by way of limitation, bus 2412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2412 may include one or more buses 2412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

receiving, from an extended reality (XR) display device, an audio input of a user of the XR display device, wherein the audio input comprises a first voice command of a plurality of voice commands associated with a first application, wherein the plurality of voice commands are executable by a natural-language understanding (NLU) model;

determining a first context of the user with respect to an extended reality (XR) environment;

determining, based on the first context, a tunable confidence interval for the NLU model to match the audio input to the first voice command, wherein the tunable confidence interval varies based on user context, and wherein the tunable confidence interval is set to a first tunable confidence level based on the first context of the user;

determining, by the NLU model, whether the audio input matches the first voice command based on the first tunable confidence level; and executing, by the first application, a first task corresponding to the first voice command responsive to determining whether the audio input matches the first voice command.

2. The method of claim 1, wherein the plurality of voice commands comprise one or more of avatar movement, avatar actions, object movement, object actions, application settings, or system settings.

3. The method of claim 1, further comprising:

adjusting the tunable confidence interval to a second tunable confidence level based on content of the first application, wherein the second tunable confidence level is higher than the first tunable confidence level, and wherein determining the audio input matches the first voice command is further based on the second tunable confidence level.

4. The method of claim 1, further comprising:

adjusting the tunable confidence interval to a second tunable confidence level, wherein the second tunable confidence level is different from the first tunable confidence level; and determining, by a customizable NLU model of the XR display device, whether the audio input matches the first voice command based on the second tunable confidence level.

5. The method of claim 1, further comprising:

providing instructions to the XR display device to place one or more microphones of the XR display device into a listening mode responsive determining the first tunable confidence level exceeds a threshold tunable confidence level.

6. The method of claim 1, further comprising:

determining the audio input comprises one or more words that are phonetically adjacent to one or more other words; and adjusting the tunable confidence interval to a second tunable confidence level responsive to determining the audio input comprises one or more words that are phonetically adjacent to one or more other words, wherein the second tunable confidence level is higher than the first tunable confidence level, and wherein determining the audio input matches the first voice command is further based on the second tunable confidence level.

7. The method of claim 1, further comprising:

determining a difficulty associated with the first task; and adjusting the tunable confidence interval to a second tunable confidence level based on the difficulty associated with the first task, wherein determining the audio input matches the first voice command is further based on the second tunable confidence level.

8. The method of claim 1, further comprising:

accessing a list of predetermined tasks; and adjusting the tunable confidence interval to a second tunable confidence level based on the first task matching one task out of the list of predetermined tasks, wherein determining the audio input matches the first voice command is further based on the second tunable confidence level.

9. The method of claim 1, further comprising:

receiving an indication that the first user has a speech characteristic; and adjusting the tunable confidence interval to a second tunable confidence level based on the speech characteristic, wherein determining the audio input matches the first voice command is further based on the second tunable confidence level.

10. The method of claim 1, wherein determining whether the audio input matches the first voice command further comprises:

identifying one or more intents or one or more slots associated with the audio input;

accessing one or more first voice command intents or one or more first voice command slots associated with the first voice command; and determining whether the identified one or more intents or the one or more slots match the one or more first voice command intents or the one or more first voice command slots based on the first tunable confidence level.

11. One or more computer-readable non-transitory storage media embodying software that is operable when executed to:

receive, from an extended reality (XR) display device, an audio input of a user of the XR display device, wherein the audio input comprises a first voice command of a plurality of voice commands associated with a first application, wherein the plurality of voice commands are executable by a natural-language understanding (NLU) model;

determine a first context of the user with respect to an extended reality (XR) environment;

determine, based on the first context, a tunable confidence interval for the NLU model to match the audio input to the first voice command, wherein the tunable confidence interval varies based on user context, and wherein the tunable confidence interval is set to a first tunable confidence level based on the first context of the user;

determine, by the NLU model, whether the audio input matches the first voice command based on the first tunable confidence level; and execute, by the first application, a first task corresponding to the first voice command responsive to determining whether the audio input matches the first voice command.

12. The media of claim 11, wherein the plurality of voice commands comprise one or more of avatar movement, avatar actions, object movement, object actions, application settings, or system settings.

13. The media of claim 11, wherein the software is further operable when executed to:

adjust the tunable confidence interval to a second tunable confidence level based on content of the first application, wherein the second tunable confidence level is higher than the first tunable confidence level, and wherein determining the audio input matches the first voice command is further based on the second tunable confidence level.

14. The media of claim 11, wherein the software is further operable when executed to:

adjust the tunable confidence interval to a second tunable confidence level, wherein the second tunable confidence level is different from the first tunable confidence level; and determine, by a customizable NLU model of the XR display device, whether the audio input matches the first voice command based on the second tunable confidence level.

15. The media of claim 11, wherein the software is further operable when executed to:

provide instructions to the XR display device to place one or more microphones of the XR display device into a listening mode responsive determining the first tunable confidence level exceeds a threshold tunable confidence level.

16. A system comprising:

one or more processors; and a non-transitory memory coupled to the processors comprising instructions executable by the processors, the processors operable when executing the instructions to:

receive, from an extended reality (XR) display device, an audio input of a user of the XR display device, wherein the audio input comprises a first voice command of a plurality of voice commands associated with a first application, wherein the plurality of voice commands are executable by a natural-language understanding (NLU) model;

determine a first context of the user with respect to an extended reality (XR) environment;

determine, based on the first context, a tunable confidence interval for the NLU model to match the audio input to the first voice command, wherein the tunable confidence interval varies based on user context, and wherein the tunable confidence interval is set to a first tunable confidence level based on the first context of the user;

determine, by the NLU model, whether the audio input matches the first voice command based on the first tunable confidence level; and execute, by the first application, a first task corresponding to the first voice command responsive to determining whether the audio input matches the first voice command.

17. The system of claim 16, wherein the plurality of voice commands comprise one or more of avatar movement, avatar actions, object movement, object actions, application settings, or system settings.

18. The system of claim 16, wherein the processors are further operable when executing the instructions to:

adjust the tunable confidence interval to a second tunable confidence level based on content of the first application, wherein the second tunable confidence level is higher than the first tunable confidence level, and wherein determining the audio input matches the first voice command is further based on the second tunable confidence level.

19. The system of claim 16, wherein the processors are further operable when executing the instructions to:

adjust the tunable confidence interval to a second tunable confidence level, wherein the second tunable confidence level is different from the first tunable confidence level; and determine, by a customizable NLU model of the XR display device, whether the audio input matches the first voice command based on the second tunable confidence level.

20. The system of claim 16, wherein the processors are further operable when executing the instructions to:

provide instructions to the XR display device to place one or more microphones of the XR display device into a listening mode responsive determining the first tunable confidence level exceeds a threshold tunable confidence level.

* * * * *